(12) United States Patent
Bandy

(10) Patent No.: US 12,344,332 B2
(45) Date of Patent: Jul. 1, 2025

(54) AUGMENTED RACK AND PINION STEERING SYSTEM

(71) Applicant: Ronald S. Bandy, South Lake Tahoe, CA (US)

(72) Inventor: Ronald S. Bandy, South Lake Tahoe, CA (US)

( * ) Notice: Subject to any disclaimer, the term of this patent is extended or adjusted under 35 U.S.C. 154(b) by 647 days.

(21) Appl. No.: 17/731,641

(22) Filed: Apr. 28, 2022

(65) Prior Publication Data
US 2022/0266899 A1    Aug. 25, 2022

Related U.S. Application Data

(63) Continuation-in-part of application No. 17/115,573, filed on Dec. 8, 2020, now Pat. No. 11,952,049.

(51) Int. Cl.
| | |
|---|---|
| *B62D 5/22* | (2006.01) |
| *B62D 1/16* | (2006.01) |
| *B62D 3/12* | (2006.01) |
| *B62D 5/04* | (2006.01) |
| *B62D 5/06* | (2006.01) |

(Continued)

(52) U.S. Cl.
CPC ............... *B62D 5/22* (2013.01); *B62D 1/16* (2013.01); *B62D 3/12* (2013.01); *B62D 5/0409* (2013.01); *B62D 5/062* (2013.01); *B62D 5/065* (2013.01); *B62D 7/18* (2013.01)

(58) Field of Classification Search
CPC ... B62D 5/22; B62D 1/16; B62D 3/12; B62D 5/0409; B62D 5/062; B62D 5/065; B62D 7/18; B62D 7/08; B62D 5/04; B62D 1/163
See application file for complete search history.

(56) References Cited

U.S. PATENT DOCUMENTS

| | | |
|---|---|---|
| 2,953,324 A | 9/1960 | Barr et al. |
| 3,022,772 A | 2/1962 | Zeigler et al. |

(Continued)

OTHER PUBLICATIONS

University of Chicago, "Rotational Torque and Non-reciprocal phase transitions." Fruchart, Hanai, Littlewood and Vitelli, Nature, Apr. 14, 2021. (Year: 2021).*

(Continued)

*Primary Examiner* — Breffni Baggot
(74) *Attorney, Agent, or Firm* — Gary L. Eastman, Esq.; Eastman IP

(57) ABSTRACT

The present invention is an improved version of the steering system described in U.S. patent application Ser. No. 17/115,573. The prior steering system features effortless steering input from the driver and negligible bumpsteer during suspension operation. Such extraordinary steering performance is realized with the use of costly and complex electric assist devices and control devices. The present steering system includes an alternative electric assist device which allows for the removal of the costly and complex electric assist devices in the prior steering system. The present steering system also includes a novel hydraulic control valve with a solenoid valve-plunger mechanism. The mechanism prevents premature wear or destruction of the rack and pinion gearset. The use of the alternative electric assist device and hydraulic control valve enables the present steering system to preserve the extraordinary steering performance featured in the prior steering system concurrent with a reduction in cost and complexity.

20 Claims, 16 Drawing Sheets

(51) Int. Cl.
  *B62D 5/065* (2006.01)
  *B62D 7/18* (2006.01)

(56) References Cited

U.S. PATENT DOCUMENTS

| | | | |
|---|---|---|---|
| 3,272,142 | A | 9/1966 | Easton |
| 3,753,540 | A | 8/1973 | Renner |
| 3,885,759 | A | 5/1975 | Lear |
| 3,905,728 | A | 9/1975 | Swedberg |
| 3,953,158 | A | 4/1976 | Uppal |
| 4,488,615 | A | 12/1984 | Millard |
| 4,522,371 | A | 6/1985 | Fox et al. |
| 4,796,854 | A | 1/1989 | Ewing |
| 5,119,898 | A | 6/1992 | Eckhardt |
| 5,454,439 | A | 10/1995 | Birsching |
| 5,820,147 | A * | 10/1998 | Rohweder ............... B62D 7/16 280/93.51 |
| 5,934,404 | A | 8/1999 | DeLellis et al. |
| 6,068,236 | A | 5/2000 | Espey |
| 6,189,902 | B1 | 2/2001 | Lenzen et al. |
| 6,505,812 | B1 | 1/2003 | Anastas |
| 7,077,234 | B2 | 7/2006 | Klais et al. |
| 7,401,677 | B2 | 7/2008 | Boyle et al. |
| 7,898,139 | B2 | 3/2011 | Islam et al. |
| 8,042,645 | B2 | 10/2011 | Kurokawa |
| 8,201,656 | B2 | 6/2012 | Archer et al. |
| 8,540,258 | B2 | 9/2013 | Bae et al. |
| 8,893,846 | B2 | 11/2014 | Buchwitz et al. |
| 9,096,110 | B1 * | 8/2015 | Bandy ..................... B60G 9/00 |
| 9,694,676 | B2 * | 7/2017 | Bandy ..................... B60G 3/202 |
| 9,718,353 | B2 * | 8/2017 | Bandy ..................... B60K 17/348 |
| 2006/0169961 | A1 * | 8/2006 | Ledford ................... B66D 1/14 254/342 |

OTHER PUBLICATIONS

Isdtbower, Suspension Geometry-Getin-it-Today; pirate4x4.com/General4x4 Discussion, Oct. 31, 2015.
Running925, Front Triangulated 4-link, no track bar?, pirate4x4.com/Jeep-Hardcore Tech, Feb. 12, 2013.
Simple72cj, Project FIGJAM, pirate4x4.com/Jeep-Hardcore Tech, Feb. 17, 2018.
Tech Tim, Steering For Go-Fast Rigs, pirate4x4.com/General4x4 Discussion, Oct. 13, 2011.
Harry Wagner, Steering Solutions For Linked Suspensions, fourwheeler.com, Jun. 1, 2013.
Buzboom, Straight Axel Rack And Pinion, jalopyjournal.com, Traditional Hot Rods, Dec. 22, 2016.
Products, Manual And Power Rack And Pinions, howeperformance.com/Accessories, 2006.
Details, End-Take-Off Rack, unisteer.com/custom racks, 2019.
Details, Universal Electra-Steer 360w Kit, unisteer.com/Electric Power Steering, 2019.
Eric Hicks, Vivax-Assist Doped Electric Bike, electric-bike.com/gruber-assist, Jan. 25, 2017.
Doug Mahoney, What's So Great About Brushless Motor Power Tools?, popularmechanics.com/home/tools, Jan. 12, 2018.
Servos, Power Steering Servos, sweetmfg.biz, pages.php?pageid=12.
How It Works, Power Steering System Pump and Rotary Valve, bullitautomotive.com, Feb. 22, 2016.
Valves, Technical Principles of Valves, omega.com.en.us, resources, valves-technical-principles, Apr. 17, 2019.
en.wikipedia.org, wiki, Solenoid_valve.
605Markw, trophy truck steering in rock crawler, pirate4x4.com, Forum, General Tech, Desert Racing, Sep. 18, 2010.
Dobsogj, howe rack and pinion steering, pirate4x4.com, Forum, General Tech, General 4x4 Tech, Jun. 24, 2007.
Larry Carley, Servicing Variable-Assist Power Steering Systems, brakeandfrontend.com, Aug. 14, 2013.
Osuagwu Solomon, How To Tell If You Have Variable Assist Power Steering, rxmechanic.com, Jan. 7, 2021.
Dave Vanderwerp, What is Power Steering And How Does It Work, caranddriver.com, Jun. 11, 2019.
Estaff, Ted Smith Aerostar/Superstar/Speedstar, all-aero.com/index.php/contactus/8368-ted-smith-aerostar.
Shafts & Supports, 24" Telescopic Shaft, borgeson.com/xcart/product.php?productid=994&cat=4&page=1, 2020.

* cited by examiner $$A\alpha = \frac{3.0}{2} \quad \text{(eq-1)}$$
$$= 1.5 \text{ turns}$$

$$B\beta = 1.5 \text{ turns} \cdot \left(\frac{360°}{1 \text{ turn}}\right) \quad \text{(eq-2)}$$
$$= 540°$$

$$\Gamma\gamma = 40° \cdot \left(\frac{35°}{540°}\right) \quad \text{(eq-3)}$$
$$= 2.6°$$

$$\Delta\delta = 20° \cdot \left(\frac{35°}{540°}\right) \quad \text{(eq-4)}$$
$$= 1.3°$$

FIG. 10

$$A\alpha = \frac{6.0}{2} \quad \text{(eq-1)}$$
$$= 3.0 \text{ turns}$$

$$B\beta = 3.0 \text{ turns} \cdot \left(\frac{360°}{1 \text{ turn}}\right) \quad \text{(eq-2)}$$
$$= 1080°$$

FIG. 11

$$\Gamma\gamma = 40° \cdot \left[\frac{35°}{1080°}\right] \quad \text{(eq-3)}$$
$$= 1.3°$$

$$\Delta\delta = 20° \cdot \left[\frac{35°}{1080°}\right] \quad \text{(eq-4)}$$
$$= 0.7°$$

FIG. 11 (cont)

$$\varepsilon = \frac{6.0}{3.0} \quad \text{(eq-5)}$$
$$= 2:1$$

FIG. 12

AUGMENTED RACK AND PINION STEERING SYSTEM

CROSS-REFERENCE TO RELATED APPLICATIONS

This application is a continuation-in-part of, and claims the benefit of priority to U.S. patent application Ser. No. 17/115,573, entitled "Augmented Rack And Pinion Steering System" filed on Dec. 8, 2020.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The triangulated 4-link suspension system is the preferred front suspension system for a front solid axle four-wheel drive vehicle. A survey of the winningest, most competitive front solid axle four-wheel drive race vehicles quickly reveals that the front suspension system is based on the triangulated 4-link configuration. Despite such storied success in the off-road environment, the triangulated 4-link front (or rear) suspension system is not offered as a production-based or even as an optional performance-based suspension system by any automobile manufacturer of front solid axle four-wheel drive vehicles, e.g., Jeep, Ford, or Dodge Ram. More telling is that the triangulated 4-link front suspension system is rarely seen on one-off, custom-built front solid axle four-wheel drive vehicles that are driven on the street. In an era of street-legal race-inspired vehicles with sophisticated race-derived suspension systems—e.g., Corvette, Ferrari, Porsche, or even the highly-acclaimed Ford F-150 Raptor—the absence of the triangulated 4-link front suspension system on street-driven front solid axle four-wheel drive vehicles remains a mystery.

One of the challenges of using the triangulated 4-link front suspension system with street-driven four-wheel drive vehicles lies in the steering system. Most front solid axle four-wheel drive vehicles with the triangulated 4-link front suspension system utilize a full-hydraulic steering system. Full hydraulic steering is usually illegal and has a dubious reputation for street use. Instead of full-hydraulic steering, various mechanical alternative steering systems that feature bellcranks, gears and chains, or idler arms have been used to transmit steering input from the steering wheel to the steering knuckle. While the features may be unique, most mechanical alternative steering systems incorporate a draglink positioned in relation to one of the suspension links. The steering relationship between the draglink and suspension link is popularly known as the push/pull design as the draglink is pushed forward towards or pulled backward away from the front axle when the steering wheel is turned. This relationship between the draglink and suspension link gives rise to bumpsteer during articulation.

Bumpsteer during articulation can be visualized by considering the motions of the front axle, draglink, and suspension link during suspension travel and articulation. During suspension travel and articulation, the front axle moves in a vertical plane that is parallel to the lateral axis-hereafter called the lateral vertical plane. During suspension travel, as the axle moves upward and downward within the lateral vertical plane, the axle remains parallel to the ground. During articulation, the axle rotates within the lateral vertical plane about the longitudinal axis. The lateral axis refers to a line passing through the middle of the vehicle from the driver side to the passenger side while the longitudinal axis refers to a line passing through the middle of the vehicle from the front end to the back end.

For the triangulated 4-link suspension configuration, the draglink and suspension link both occupy a vertical plane that is angled to the lateral vertical plane—hereafter called the angled vertical plane; the angle commonly being between 40-90 degrees (40°-90°), depending on the geometry of the suspension links. During suspension travel, the parallel relationship between the front axle and ground enables the draglink to move vertically in concert with the suspension link such that the draglink and suspension link follow similar arcs. The similar arcs define coincident motion that results in zero bumpsteer. During articulation since the angled vertical plane is angled to the lateral vertical plane, then rotation of the front axle within the lateral vertical plane causes the draglink to wrap around the suspension link in a twisting motion (like the double helix of DNA or the twisted shape of licorice). The twisting motion causes the draglink and suspension link to follow dissimilar arcs. The dissimilar arcs define non-coincident motion that results in bumpsteer.

The mechanical alternative steering systems, while being more complicated than a simple steering box and drag link design, have seen duty in some production-based models from Toyota, G M, and Jeep, and also in some solid-axle desert race trucks. The push/pull steering designs are not well-received because the factory versions, such as those by Toyota and GM, were very short and included multiple drag links and tie-rod ends. The short length limited the amount of suspension travel while the multiple ends easily loosened, the combination of which led to sloppy steering that could bind and fail during off-road driving.

A variant of the mechanical alternative steering systems involves a rack and pinion steering system in which the recirculating ball steering gearbox is replaced with a rack and pinion steering gearset. Rack and pinion steering systems have a long history with older straight beam-axle vehicles such as hot rods. Rack and pinion steering systems are less expensive and more precise than their recirculating ball steering system counterparts. The rack and pinion gearset is attached directly to the front solid or beam axle such that the rack is connected directly to the draglink or tie rods. This arrangement of a direct attachment between the rack and pinion gearset and front solid axle defines the steering system that is disclosed in U.S. Pat. No. 5,934,404. Direct attachment offers two distinct benefits over the recirculating ball steering systems:

One, in the rack and pinion steering system, the draglink is located entirely on the front axle, thereby eliminating the requirement of concerted motion between the draglink and triangulated suspension link. The steering shaft, which transmits steering input from the chassis to the rack and pinion gearset on the front axle, rotates rather than pushes and pulls. This way, steering input is transmitted via a rotational motion rather than a push and pull motion. The steering shaft is equipped with a slip-joint thereby enabling the length of the steering shaft to increase and decrease in concert with the forwards and backwards motion of the front axle during suspension travel, respectively. Thus during suspension travel, the change in length of the steering shaft enables the steering shaft to move vertically in concert with the suspension link such that the steering shaft and suspension link follow similar arcs. The similar arcs define coincident motion that results in zero bumpsteer. Therefore when used with a slip-joint equipped steering shaft, the front axle-mounted rack and pinion gearset invokes zero bumpsteer during suspension travel.

Two, the rack undergoes true linear displacement along the lateral axis such that any displacement of the rack causes a likewise displacement of the tie rod and thereby steering arm on the steering knuckle. Conversely, the pitman arm that is attached to the sector shaft of a recirculating ball gearbox undergoes rotational displacement at the draglink end. The rotational displacement defines an angled pitman arm that can be resolved into X- and Y-components. Let the X-component refer to the displacement that occurs along the lateral axis while the Y-component refers to the displacement that occurs along the longitudinal axis. The lateral displacement of the X-component refers to lateral displacement of the draglink end, and causes a likewise displacement of the tie rod and thereby lateral displacement of the steering arm on the steering knuckle. The longitudinal displacement of the Y-component occurs at a right angle to the lateral displacement of the X-component. The longitudinal displacement of the Y-component refers to longitudinal displacement of the draglink end, and has no effect on the lateral displacement of the tie rod and steering arm on the steering knuckle. Therefore, the longitudinal displacement of the Y-component defines useless motion of the pitman arm, thereby reducing the steering precision of the recirculating ball gearbox when compared to the rack and pinion gearset.

Rack and pinion gearsets are available as manual rack and pinion gearsets, electric power assisted rack and pinion gearsets, or hydraulic power assisted rack and pinion gearsets. Manual rack and pinion gearsets are simple mechanical devices comprising a toothed pinion shaft meshing with a toothed rack. The meshing process defines an interaction between the teeth on the pinion shaft and those on the rack such that the rotation of the pinion shaft causes a linear displacement of the rack. That is, the rotational torque of the steering input defines a torque (rotational) force that is exerted on the pinion shaft, which causes the pinion shaft to rotate. The pinion shaft exerts the torque force on the rack during the meshing process, thereby causing the rack to be displaced in a linear fashion. Hereafter, the torque force exerted on the rack by the pinion shaft is known as the pinion shaft force. The displacement of the rack causes the pinion shaft force to be exerted on the draglink (or tie rods) thereby displacing the draglink (or tie rods). The displacement of the draglink (or tie rods) causes the pinion shaft force to be exerted on the steering arms thereby displacing the steering arms and turning the vehicle. The manual rack and pinion gearset defines the basic construction of any rack and pinion gearset. Electric power assisted rack and pinion gearsets are manual gearsets whose pinion shaft is connected to an electric motor. The electric motor multiplies the rotational torque of the pinion shaft. The multiplied rotational torque of the pinion shaft defines a multiplied pinion shaft force, which facilitates displacement of the rack and greatly eases the turning of the vehicle with the steering wheel. Hydraulic power assisted rack and pinion gearsets utilize hydraulic fluid to generate a hydraulic pressure force. The hydraulic pressure force is exerted on the rack, which facilitates displacement of the rack and greatly eases the turning of the vehicle with the steering wheel.

For hydraulic power assisted rack and pinion gearsets, a control valve regulates the flow of hydraulic fluid. The hydraulic fluid refers to hydraulic pressure while the hydraulic pressure defines a force. Hereafter, the force defined by the hydraulic pressure is known as the hydraulic pressure force. The hydraulic fluid regulating function in the control valve varies the fluid flow, which varies the hydraulic pressure, which in turn varies the hydraulic pressure force. The hydraulic pressure force is exerted on the rack which displaces the rack. Two versions of the hydraulic power assisted rack and pinion gearset are described:

In one version, the control valve is an integral part of the gearset. The hydraulic fluid regulating function in the control valve occurs in the housing comprising the rack. Therefore, the hydraulic pressure and hydraulic pressure force are generated in the housing comprising the rack. The hydraulic pressure force is exerted on the rack, which displaces the rack.

In a second version, a hydraulic ram is connected to the rack and the control valve is not an integral part of the gearset; i.e., the control valve is an independent device that may or may not be attached to the gearset. Hydraulic fluid passes from the control valve to the ram such that the hydraulic pressure is generated in the ram. The hydraulic pressure in the ram defines the hydraulic pressure force that is exerted on the rack, which displaces the rack.

In either version, the control valve and rack and pinion gearset are constructed in a manner such that the hydraulic fluid regulating function in the control valve is activated by and responds to the displacement of the rack, i.e. the hydraulic fluid regulating function in the control valve is coordinated with the displacement of the rack. This way, the hydraulic pressure variance in the housing/ram is coordinated with the displacement of the rack. Since the rack is able to be displaced by the pinion shaft force, then the displacement of the rack due to the hydraulic pressure force is coordinated with the displacement of the rack due to the pinion shaft force. Therefore, the hydraulic pressure force is coordinated with the pinion shaft force. Coordination between the hydraulic pressure force and pinion shaft force defines a combined hydraulic pressure force and pinion shaft force that is greater than either the hydraulic pressure force or pinion shaft force alone. The combined hydraulic pressure force and pinion shaft force refer to a multiplied force that is exerted on the rack and thereby effortlessly displaces the rack. The effortless displacement of the rack exerts the multiplied force onto the draglink (or tie rods) and then on the steering arms, which effortlessly turn the vehicle.

Currently, all rack and pinion steering systems comprise features unsuitable for use on a front solid axle four wheel drive vehicle. Front solid axle four wheel drive vehicles, especially those targeted for off-road driving, comprise heavy duty drivetrains with large oversized wheels. The front wheels are the first vehicle components that contact a road obstruction, and thereby endure the brunt of the impact; the impact including extreme vibration, jarring shocks, and sudden and rapid vertical or articulating motion. Since the front wheels are connected to the front solid axle, then the front solid axle is also subject to extreme vibration, jarring shocks, and sudden and rapid vertical or articulating motion.

The manual rack and pinion gearsets and electric power assisted rack and pinion gearsets are constructed with light-weight, low-strength materials designed for vehicles weighing 4500 lbs or less and rolling on 32" or smaller wheels. The light-weight, low-strength materials cannot withstand the intense workloads from the heavy duty drivetrains and large oversized wheels of front solid axle four wheel drive vehicles.

The one version of the hydraulic power assisted rack and pinion gearset is constructed such that the control valve is an integral part of the gearset and hydraulic fluid passes through the housing comprising the rack. The control valve is a highly-machined hydraulic fluid regulating device that defines the precise response of the steering system. Since the gearset is attached to the front axle, the control valve is also subject to extreme vibration, jarring shocks, and sudden and rapid vertical or articulating motion. Such adverse conditions erode steering precision and quickly ruin the control valve. This deficiency represents a key issue that is addressed in U.S. Pat. No. 6,189,902.

The second version of the hydraulic power assisted rack and pinion gearset, such as that offered by performance steering manufacturers, is constructed with a quick steering ratio of 1.5:1 or 1.0:1. The quick steering ratio defines a quick steering response from the front wheels, and thereby steering precision. The quick steering ratio also means that the displacement of the rack is magnified. A small turn of the steering wheel causes a small rotation of the pinion shaft. Then the small rotation of the pinion shaft is magnified by the quick steering ratio and thereby causes a large displacement of the rack. When the steering wheel is not turned, then during articulation as the axle rotates about the longitudinal axis, the gearset also rotates about the longitudinal axis but not the pinion shaft. The rotating gearset simulates the rotation of the pinion shaft. The simulated rotation of the pinion shaft causes an unintended displacement of the rack, which leads to an unintended turn of the front wheels. In short during articulation when driving straight ahead, the rotating gearset simulates the rotation of the pinion shaft which causes an unintended displacement of the rack. During articulation when driving straight ahead, the unintended displacement of the rack is the single greatest deficiency of the axle mounted rack and pinion gearset—it results in bumpsteer. Any small amount of articulation refers to a small simulated rotation of the pinion shaft. The small simulated rotation of the pinion shaft is magnified by the quick steering ratio and thereby causes a large unintended displacement of the rack, which leads to a large unintended turn of the front wheels. Since the articulation of the axle, and NOT the turning of the steering wheel, led to the large turn of the front wheels, then the large turn of the front wheels is unintended and thereby defines bumpsteer.

Clearly, the historical record and U.S. Pat. Nos. 5,934,404 and 6,189,902 demonstrate that the rack and pinion steering system represents a viable steering system for front solid axle vehicles. By resolving the deficiencies cited above, the rack and pinion steering system also represents a viable steering system for front solid axle four wheel drive vehicles. U.S. patent application Ser. No. 14/115,573 discloses a rack and pinion steering system devoid of the cited deficiencies. The disclosure represents a power assisted variant of the rack and pinion steering system introduced in our related U.S. Pat. No. 9,096,110, and can operate in conjunction with the well-known triangulated link-style suspension system with negligible if any bumpsteer.

The triangulated 4-link front suspension system is the preeminent suspension system for a front solid axle equipped four wheel drive vehicle. Yet, operational challenges with known steering systems render the triangulated 4-link front suspension system unfeasible for street-driven front solid axle equipped four wheel drive vehicles. Pursuant to our on-going investigation into solid axle-based steering systems, we have concentrated on an integrated steering quickener-slow steering ratio design. The design represents the foundation for a steering system that's compliant with the triangulated 4-link front suspension system. In U.S. Pat. No. 9,096,110, we introduced a steering quickener-slow steering ratio steering system. In U.S. patent application Ser. No. 17/115,573, we disclosed a power assist steering quickener-slow steering ratio steering system.

The steering system disclosed in U.S. patent application Ser. No. 14/115,573 is comprised of an augmented chain and sprocket assembly and ram assist rack and pinion gearset. The augmented chain and sprocket assembly includes an electric motor while the ram assist rack and pinion gearset operates in conjunction with a hydraulic control valve. In the present invention, we introduce previously undisclosed details about the electric motor and hydraulic control valve. The details lead to an improved version of the steering system disclosed in U.S. patent application Ser. No. 17/115,573.

The electric motor serves a vital function for the steering system by multiplying the rotational torque derived from the steering input supplied by the driver. The multiplied rotational torque aids in making steering input effortless. However, the electric motor also burdens the steering system with increased manufacturing cost, complexity, and maintenance of the augmented chain and sprocket assembly. Accordingly, a desirable option would include the removal of the electric motor from the augmented chain and sprocket assembly while also preserving the electric motor's vital function of multiplying the rotational torque from the steering input. The present invention addresses the option by disclosing a design that removes the electric motor from the augmented chain and sprocket assembly while also preserving the vital function of multiplying the rotational torque from the steering input. In effect, the design removes the burden from the steering system while also making the steering input supplied by the driver effortless. To preserve the multiplication of the rotational torque from the steering input, an electric assist motor box is attached to the steering column. The electric assist motor box can be attached at any point along the length of the steering column. The combination of the steering column and electric assist motor box defines the electric assist steering column, the electric assist steering column being known in the art.

Hydraulic control valves for steering systems are designed to regulate the flow of hydraulic fluid that passes through the hydraulic power assist device. Regulation of the flow occurs when the hydraulic control valve is activated. In the steering system disclosed in U.S. patent application Ser. No. 17/115,573, no distinction is made between known hydraulic control valves and our hydraulic control valve, thereby implying that our hydraulic control valve is a known device. Further, the (known) hydraulic control valve and ram assist rack and pinion gearset are said to be constructed in a manner such that the (known) hydraulic control valve is activated by the displacement of the rack. This statement is incorrect since all known hydraulic control valves are activated by steering input only. The principle of the hydraulic control valve being activated by the displacement of the rack is unprecedented and applies strictly to our hydraulic control valve, thereby indicating that our hydraulic control valve is novel. This principle is one of the hallmark disclosures of the present invention, and is emphasized by noting the differences between known hydraulic control valves and our hydraulic control valve.

All known hydraulic control valves are activated by and respond to steering input. Hydraulic control valves have an input shaft that is connected to the steering wheel via a steering column and other linkages such as a steering shaft. The connection enables steering input to activate the control valve. Activation of the control valve by steering input causes a variance in the flow of hydraulic fluid. The variance in the hydraulic fluid generates a hydraulic pressure which defines a hydraulic pressure force in the hydraulic power assist device. The hydraulic power assist device is able to be a hydraulic ram. Upon activation by steering input, the known control valve causes the variance of the hydraulic fluid that passes through the hydraulic ram. The hydraulic fluid variance creates the hydraulic pressure which defines the hydraulic pressure force in the hydraulic ram, which then acts to displace the rack.

Known control valves generate the hydraulic pressure force that displaces the rack only when the driver turns the steering wheel. This way with known control valves, the displacement of the rack due to the hydraulic pressure force is coordinated with the displacement of the rack due to the pinion shaft force. The coordination refers to a combined hydraulic pressure force and pinion shaft force such that the combined force is exerted on the rack which displaces the rack. The rack is connected to the steering knuckles such that the rack exerts the combined force on the steering knuckles, which turns the steering knuckles and thereby turns the front wheels.

However, known control valves are not coordinated with the simulated rotation of the pinion shaft. During articulation of the front axle when the driver does not turn the steering wheel, known control valves will not be activated to displace the rack while the simulated rotation of the pinion shaft will act to displace the rack. This non-coordination of rack displacement between known control valves and simulated rotation of the pinion shaft will prematurely wear out or destroy the gearset depending on the design of the gearset.

Our hydraulic control valve is activated by and responds to the displacement of the rack. That is, our control valve is not activated by steering input; instead it's activated by the displacement of the rack. Our control valve is activated when the rack is displaced due to either the pinion shaft force or simulated pinion shaft force. The activation causes the hydraulic fluid variance in the hydraulic ram. The hydraulic fluid variance creates the hydraulic pressure which defines the hydraulic pressure force in the hydraulic ram, which then acts to displace the rack. In short, the displacement of the rack due to either the pinion shaft force or simulated pinion shaft force activates our control valve, which generates a hydraulic pressure force, which then simultaneously displaces the rack. The displacement of the rack due to the hydraulic pressure force is coordinated with the displacement of the rack due to both the pinion shaft force and simulated pinion shaft force. Our control valve is coordinated with both the intended and unintended displacements of the rack. The coordination refers to a combined hydraulic pressure force and pinion shaft force or combined hydraulic pressure force and simulated pinion shaft force. Either combined hydraulic pressure force and pinion shaft force or combined hydraulic pressure force and simulated pinion shaft force refers to a combined force. The rack is connected to the steering knuckles such that the rack exerts the combined force on the steering knuckles, which turns the steering knuckles and thereby turns the front wheels.

The coordination between our control valve and simulated rotation of the pinion shaft indicates that during articulation of the front axle when the steering wheel is not turned our control valve is activated to displace the rack such that our gearset operates as designed without any possibility of wearing out prematurely or self-destructing.

BRIEF SUMMARY OF THE INVENTION

Particular arrangements of U.S. patent application Ser. No. 17/115,573 define a steering system that includes a rack and pinion gearset, augmented chain and sprocket assembly 11, electric and hydraulic power assist devices, and linkages, the system governing the steering for a front solid axle equipped vehicle.

Components of the steering system and properties of the components include the following:

The rack and pinion gearset is known in the art, and is constructed with a slow steering ratio. The basic operation of the rack and pinion gearset involves a toothed pinion shaft meshing with a toothed rack. During the meshing process, the pinion shaft interacts with the rack such that the rotation of the pinion shaft causes a linear displacement of the rack. The slow steering ratio means that for a small rotation of the pinion shaft, the displacement of the rack is very small. This way, a small rotation of the pinion shaft causes a very small displacement of the rack, which leads to a very small turn of the front wheels. Articulation of the front axle during ordinary driving conditions (street or mild off-road driving conditions) renders a small rotation of the rack and pinion gearset. Then when the steering wheel is not turned, the small rotation of the rack and pinion gearset simulates a small rotation of the pinion shaft. The small simulated rotation of the pinion shaft is reduced by the slow steering ratio and thereby causes a very small unintended displacement of the rack, which leads to a very small unintended turn of the front wheels. The very small unintended turn of the front wheels is due to articulation and thereby defines negligible bumpsteer.

The augmented chain and sprocket assembly 11 quickens the steering input that is supplied by the driver. The augmented chain and sprocket assembly 11 is a type of steering quickener. The quickening property acts to multiply steering input and is called augmentation. For every rotation of the steering wheel, rotation of the pinion shaft is multiplied by the amount of the augmentation. The multiplied rotation of the pinion shaft causes an increased displacement of the rack, which leads to an increased turn of the front wheels. The augmented chain and sprocket assembly 11 has input and output shafts whereby the augmentation makes the rotation of the output shaft by the input shaft more difficult. The augmented chain and sprocket assembly 11 is able to include an electric motor. The electric motor is located next to the input shaft or output shaft such that the electric motor can exert a torque force on the input shaft or output shaft, respectively. The torque force multiplies the rotational torque from the steering input, thereby facilitating the rotation of the input shaft or output shaft.

The electric power assist device is an electric assist motor box 22. The electric assist motor box 22 is known in the art, and is able to be connected, via steering shaft, to the pinion shaft of the manual rack and pinion gearset. The electric assist motor box 22 multiplies the rotational torque of the pinion shaft. The multiplied rotational torque of the pinion shaft defines a multiplied pinion shaft force. The multiplied pinion shaft force is exerted on the rack during the meshing process, and thereby results in effortless displacement of the rack.

The rack and pinion gearset is able to be a known manual rack and pinion gearset with the slow steering ratio. The manual rack and pinion gearset defines a simple mechanical device comprising a toothed pinion shaft meshing with a toothed rack, the meshing process is common to any rack and pinion gearset. The gearset can reliably withstand the adverse off-road conditions experienced by the front solid axle of light-weight four wheel drive vehicles, light-weight referring to vehicles with a gross weight up to 4500 lbs and rolling on wheels up to 32" in diameter—e.g., Jeep Wrangler.

The rack and pinion gearset is able to be a known ram assist rack and pinion gearset with the slow steering ratio. The hydraulic power assist device is the ram, and the hydraulic fluid is governed by a control valve 29. The control valve 29 is remotely located from the gearset; specifically, the control valve 29 is attached to the chassis and NOT to the gearset. The remote location isolates the control valve 29 from the front axle and removes the hydraulic fluid regulating function from the gearset. By remotely locating the control valve 29, the ram assist rack and pinion gearset is converted into a simple mechanical device that includes a toothed pinion shaft that meshes with a toothed rack and a ram that is attached to the rack and tie rod bar. The hydraulic pressure force of the ram combines with the pinion shaft force to define a multiplied force that is exerted on the tie rod bar. The multiplied force of the tie rod bar effortlessly displaces the tie rod bar, which leads to the effortless turning of the vehicle with the steering wheel. The hydraulic pressure force of the ram makes the ram assist rack and pinion gearset a very robust type of rack and pinion gearset. The ram assist rack and pinion gearset defines a mechanically actuated analog of the full hydraulic steering ram commonly used on front solid axle four wheel drive vehicles. The ram assist rack and pinion gearset is ideally suited to handle the heavy duty drivetrains and large oversized wheels characteristic of four wheel drive vehicles; vehicles with a gross weight greater than 4500 lbs and rolling on wheels greater than 33" in diameter—e.g., Ford Super Duty trucks or Ram Heavy Duty trucks.

A first particular arrangement of U.S. patent application Ser. No. 17/115,573 defines a steering system that includes the manual rack and pinion gearset, augmented chain and sprocket assembly 11, electric assist motor box 22, and associated linkages. The linkages include a coupler shaft, steering shaft, draglink, and tie rod. The manual rack and pinion gearset has a slow steering ratio while the augmented chain and sprocket assembly 11 has an electric motor. The electric assist motor box 22 is remotely located away from the gearset, thereby removing the electric power assist motor box 22 from the front axle and preserving precise steering response during adverse driving conditions. Steering input is transmitted from the steering column to the augmented chain and sprocket assembly 11, from the augmented chain and sprocket assembly 11 to the electric assist motor box 22, from the electric assist motor box 22 to the manual rack and pinion gearset, and from the manual rack and pinion gearset to the front wheels. Rotational torque that is derived from the steering input is multiplied by both the electric motor and electric assist motor box 22. The multiplied rotational torque from the electric motor is exerted on the output shaft of the augmented chain and sprocket assembly 11, thereby resulting in effortless rotation of the output shaft. The multiplied rotational torque from the electric assist motor box 22 is exerted on the pinion shaft, which defines a multiplied pinion shaft force. The multiplied pinion shaft force is exerted on the rack during the meshing process, and thereby results in effortless displacement of the rack. The combination of the effortless rotation of the output shaft and effortless displacement of the rack facilitates the turning of the vehicle with the steering wheel. The combined effects of the steering quickener augmented chain and sprocket assembly 11 and slow ratio manual rack and pinion gearset results in a steering system with quick steering response with negligible if any bumpsteer during ordinary driving conditions.

A second particular arrangement of U.S. patent application Ser. No. 14/115,573 defines a steering system that includes the ram assist rack and pinion gearset, augmented chain and sprocket assembly 11, and associated linkages. The linkages include a coupler shaft, steering shaft, draglink, and tie rod. The ram assist rack and pinion gearset has a slow steering ratio, control valve 29, and tie rod bar while the augmented chain and sprocket assembly 11 has an electric motor. The control valve 29 is remotely located away from the gearset, thereby removing the hydraulic fluid regulating function from the front axle and preserving precise steering response during adverse driving conditions. Steering input is transmitted from the steering column to the augmented chain and sprocket assembly 11, from the augmented chain and sprocket assembly 11 to the control valve 29, from the control valve 29 to the ram assist rack and pinion gearset, and from the ram assist rack and pinion gearset to the front wheels. Rotational torque that is derived from the steering input is multiplied by the electric motor at the output shaft of the augmented chain and sprocket assembly 11, thereby resulting in effortless rotation of the output shaft. The ram exerts a hydraulic pressure force on the tie rod bar, which in coordination with the pinion shaft force defines a multiplied force that results in effortless displacement of the tie rod bar. The combination of the effortless rotation of the output shaft and effortless displacement of the tie rod bar facilitates the turning of the vehicle with the steering wheel. The combined effects of the steering quickener augmented chain and sprocket assembly 11 and slow ratio ram assist rack and pinion gearset results in a steering system with quick steering response with negligible if any bumpsteer during ordinary driving conditions.

The present invention and U.S. patent application Ser. No. 17/115,573 both define steering systems that include the augmented chain and sprocket assembly, electric assist motor box, and hydraulic control valve. Different referential symbols are used to distinguish between the augmented chain and sprocket assembly, electric assist motor box, and hydraulic control valve in the present invention and those in U.S. patent application Ser. No. 17/115,573; i.e., the present invention includes the augmented chain and sprocket assembly 63, electric assist motor box 61, and hydraulic control valve 62 while U.S. patent application Ser. No. 17/115,573 includes the augmented chain and sprocket assembly 11, electric assist motor box 22, and hydraulic control valve 29.

Two particular arrangements of the present invention are disclosed, each arrangement defines a steering system that includes an electric assist steering column, rack and pinion gearset, augmented chain and sprocket assembly 63, and linkages.

Attributes of the electric assist steering column, augmented chain and sprocket assembly 63, hydraulic control valve 62, and two particular arrangements include the following:

The electric assist steering column refers to the combination of the steering column and electric assist motor box 61, the electric assist steering column being known in the art. The front end of the steering column is connected to the input shaft of the electric assist motor box 61 while the back end of the steering column is connected to the steering wheel. The electric assist motor box 61 multiplies the rotational torque from the steering input that is supplied by the driver turning the steering wheel. The electric assist motor box 61 is connected to the augmented chain and sprocket assembly 63 such that the multiplied rotational torque is transmitted from the electric assist motor box 61 to the input shaft of the augmented chain and sprocket assembly 63 and then to the output shaft of the augmented chain and sprocket assembly 63.

The augmented chain and sprocket assembly 63 is a type of steering quickener. The augmented chain and sprocket assembly 63 does not have an electric motor. The input shaft of the augmented chain and sprocket assembly 63 is connected to the output shaft of the electric assist motor box 61, thereby enabling the multiplied rotational torque from the electric assist motor box 61 to be exerted on the input shaft of the augmented chain and sprocket assembly 63. The input shaft of the augmented chain and sprocket assembly 63 is connected via a chain to the output shaft of the augmented chain and sprocket assembly 63, thereby enabling the multiplied rotational torque from the electric assist motor box 61 to be transmitted to the output shaft of the augmented chain and sprocket assembly 63. The multiplied rotational torque that is transmitted to the output shaft defines a multiplied rotational force that is exerted on the output shaft, and results in effortless rotation of the output shaft.

The hydraulic control valve 62 is a type of linear actuated solenoid valve. The control valve 62 regulates the flow of hydraulic fluid to the hydraulic ram in the ram assist rack and pinion gearset. Regulation occurs when the control valve 62 is activated. Activation is based on a solenoid valve-plunger mechanism, and occurs when the rack is displaced either by the pinion shaft force or simulated pinion shaft force. The gearset includes a sensor while the hydraulic control valve includes a programmable electronic control module (ECM) such that the sensor signals the ECM when the rack is displaced. The ECM transforms the signal into an electric current that generates a magnetic field in a solenoid coil. The magnetic field defines a magnetic force which causes the plunger to slide within the solenoid coil, the slide being proportional to the displacement of the rack. The sliding plunger governs the flow of hydraulic fluid from the control valve 62 to the ram, the flow creates a hydraulic pressure force in the ram that acts to displace the rack simultaneously with the displacement of the rack due to the pinion shaft force or simulated pinion shaft force. The ECM can be programmed with a variable steering response such that feedback can be tuned to the driver's preference.

A first particular arrangement of the present invention defines a steering system that includes the manual rack and pinion gearset, augmented chain and sprocket assembly 63, electric assist steering column, and associated linkages. The linkages include a steering shaft, draglink, and tie rod. The manual rack and pinion gearset has a slow steering ratio while the augmented chain and sprocket assembly 63 does not have an electric motor. Steering input is transmitted from the steering column to the electric assist motor box 61, from the electric assist motor box 61 to the augmented chain and sprocket assembly 63, from the augmented chain and sprocket assembly 63 to the manual rack and pinion gearset, and from the manual rack and pinion gearset to the front wheels. Rotational torque that is derived from the steering input is multiplied by the electric assist motor box 61 at the steering column. The multiplied rotational torque of the electric assist motor box 61 is exerted on the output shaft of the augmented chain and sprocket assembly 63 and on the pinion shaft. The multiplied rotational torque that is exerted on the output shaft of the augmented chain and sprocket assembly 63 results in effortless rotation of the output shaft of the augmented chain and sprocket assembly 63. The multiplied rotational torque that is exerted on the pinion shaft refers to a multiplied pinion shaft force. The multiplied pinion shaft force is exerted on the rack during the meshing process, thereby resulting in effortless displacement of the rack. The effortless displacement of the rack results in an effortless turning of the front wheels with the steering wheel. The combination of the effortless rotation of the output shaft and effortless turning of the front wheels results in a steering system with effortless steering response, i.e. in an effortless steering system. The combined effects of the steering quickener augmented chain and sprocket assembly 63 and slow ratio manual rack and pinion gearset results in a steering system with quick steering response with negligible if any bumpsteer during ordinary driving conditions.

A second particular arrangement of the present invention defines a steering system that includes the ram assist rack and pinion gearset, augmented chain and sprocket assembly 63, electric assist steering column, hydraulic control valve 62, and associated linkages. The linkages include a steering shaft, draglink, and tie rod. The ram assist rack and pinion gearset has a slow steering ratio and tie rod bar while the augmented chain and sprocket assembly 63 does not have the electric motor. Steering input is transmitted from the steering column to the electric assist motor box 61, from the electric assist motor box 61 to the augmented chain and sprocket assembly 63, from the augmented chain and sprocket assembly 63 to the ram assist rack and pinion gearset, and from the ram assist rack and pinion gearset to the front wheels. Rotational torque that is derived from the steering input is multiplied by the electric assist motor box 61 at the steering column. The multiplied rotational torque of the electric assist motor box 61 is exerted on the output shaft of the augmented chain and sprocket assembly 63. The multiplied rotational torque that is exerted on the output shaft of the augmented chain and sprocket assembly 63 results in effortless rotation of the output shaft of the augmented chain and sprocket assembly 63. The rotational torque from the steering input that is exerted on the pinion shaft refers to a pinion shaft force. The ram exerts a hydraulic pressure force on the tie rod bar which, in coordination with the pinion shaft force, defines a combined force that results in effortless displacement of the tie rod bar. The effortless displacement of the tie rod bar results in an effortless turning of the front wheels with the steering wheel. The combination of the effortless rotation of the output shaft and effortless turning of the front wheels results in a steering system with effortless steering response, i.e. in an effortless steering system. The combined effects of the steering quickener augmented chain and sprocket assembly 63 and slow ratio ram assist rack and pinion gearset results in a steering system with quick steering response with negligible if any bumpsteer during ordinary driving conditions.

BRIEF DESCRIPTION OF THE SEVERAL VIEWS OF THE DRAWING

Brief Description of the Drawings

Figure 1:
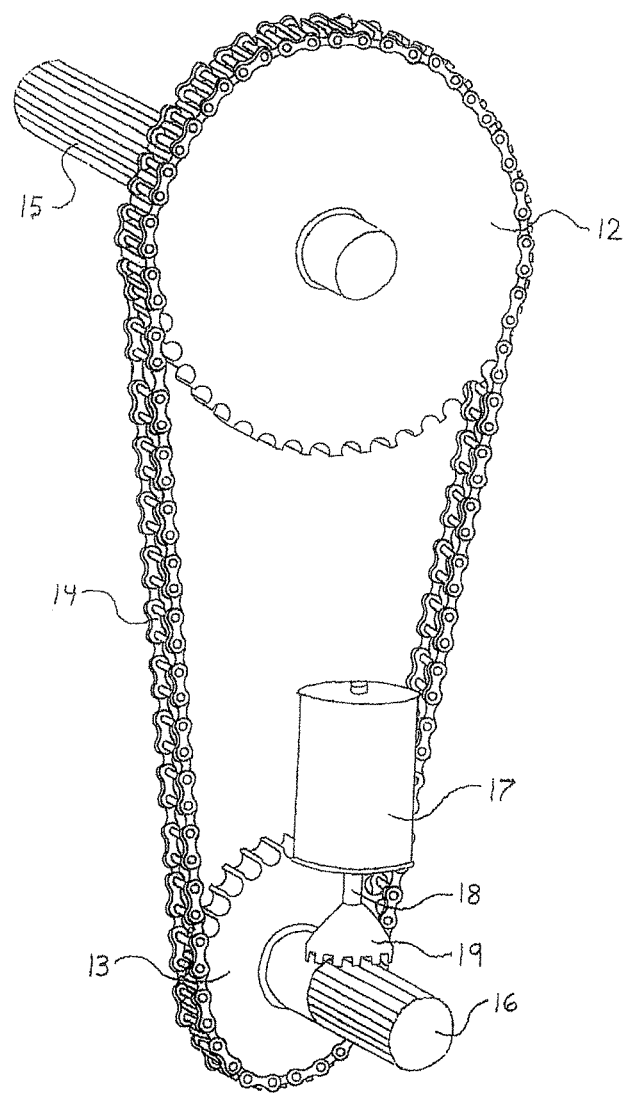
Figure 2:
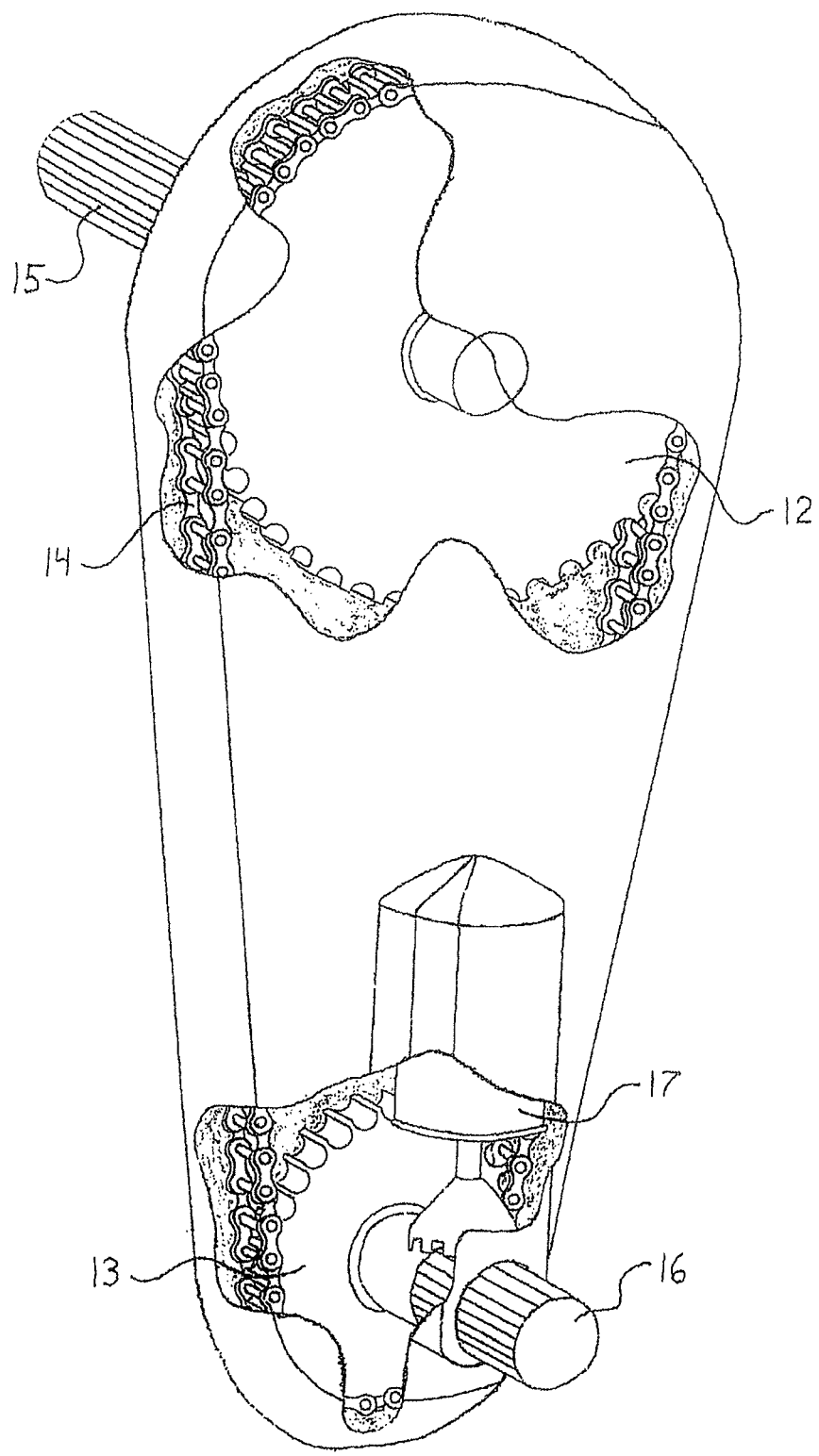
Figure 3:
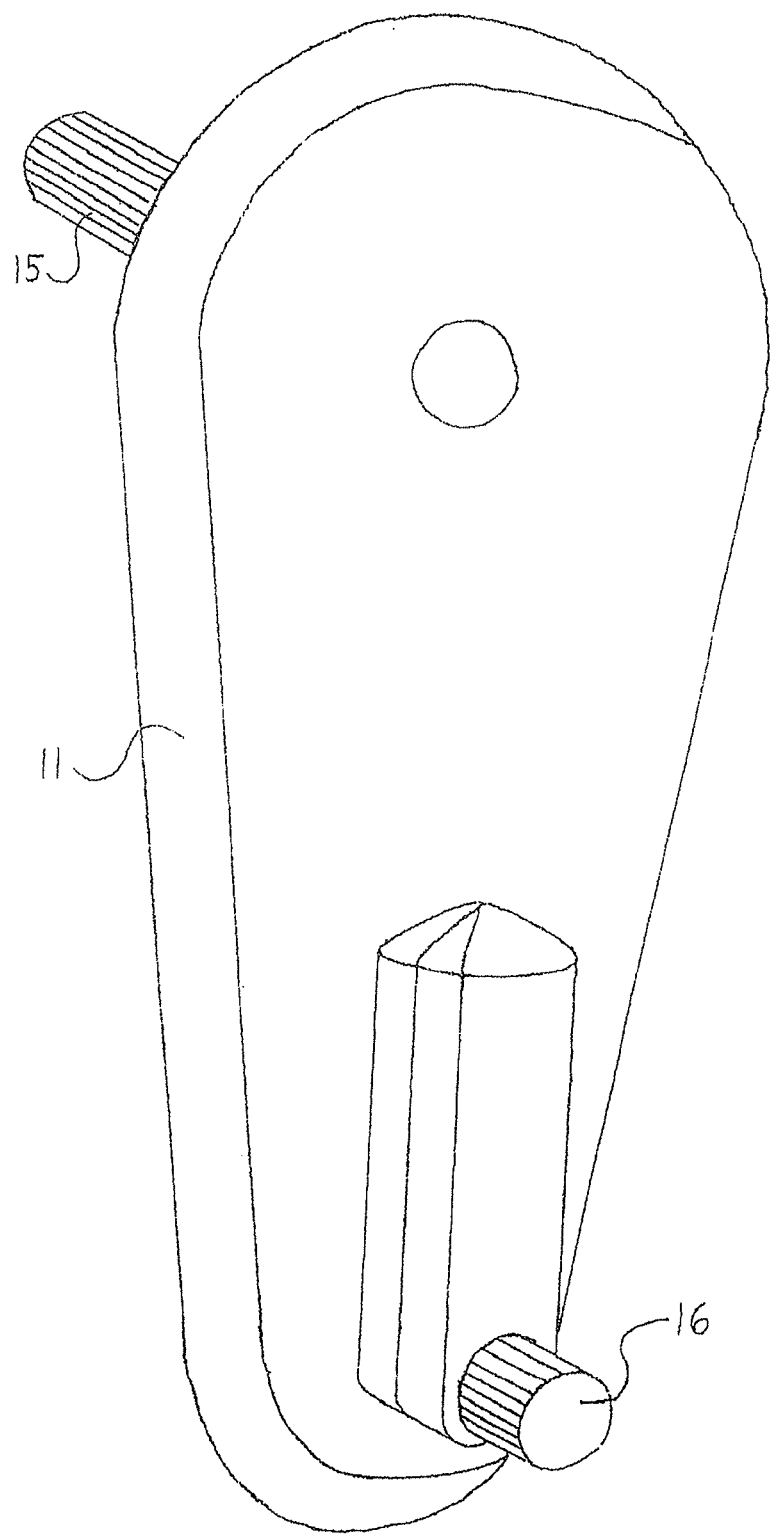
Figure 4:
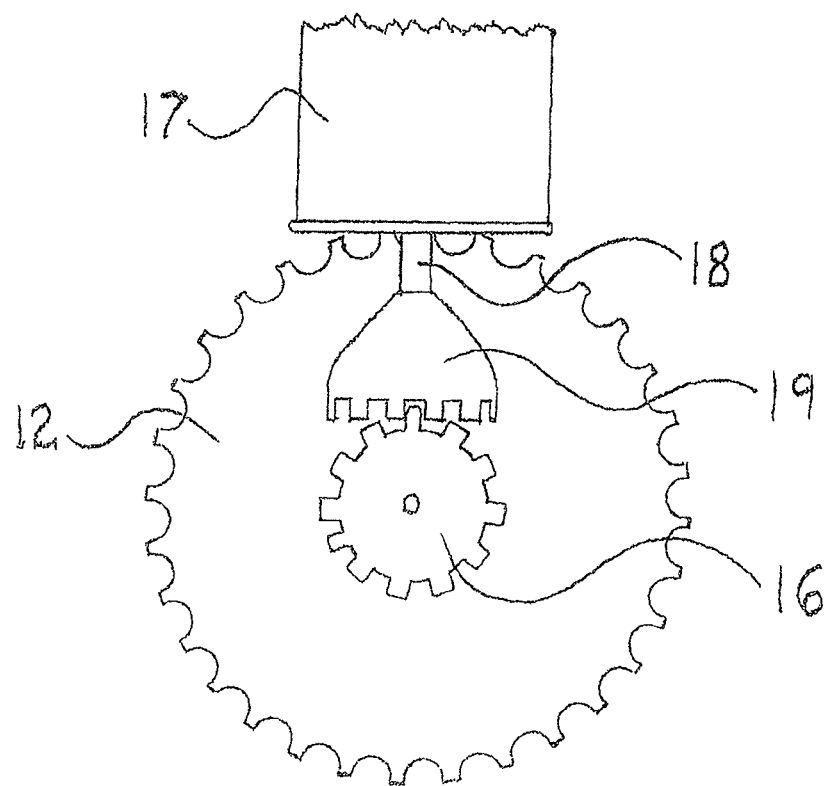
Figure 5:
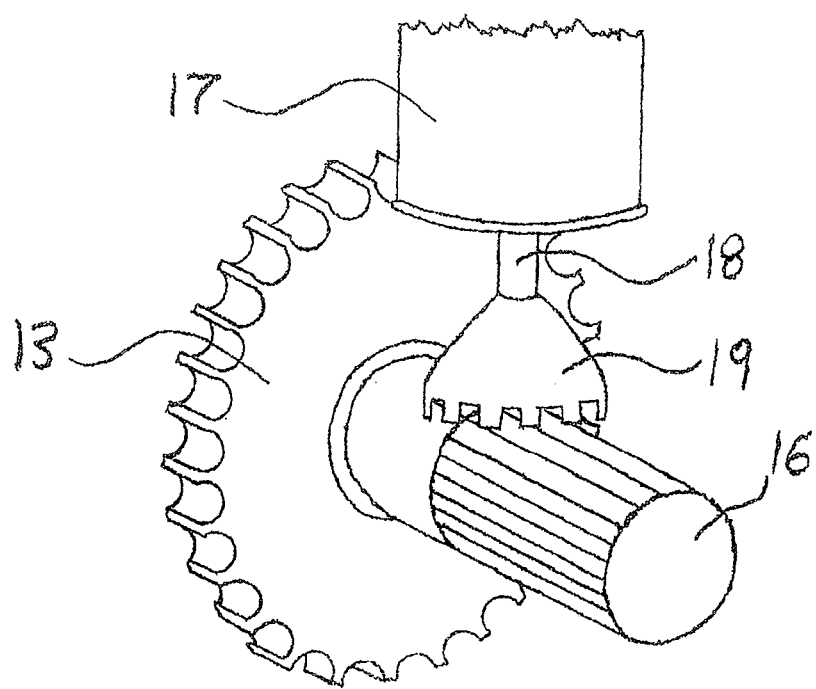
Figure 6:
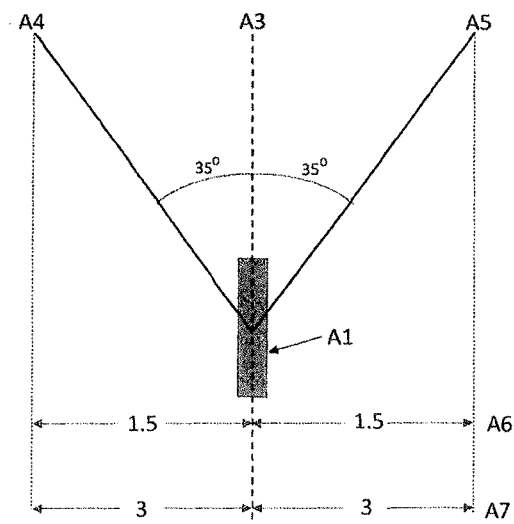
Figure 7:
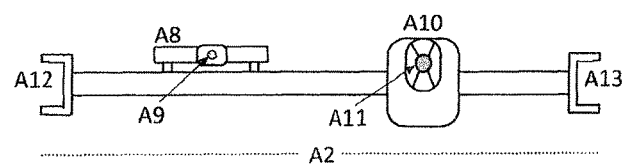
Figure 8:
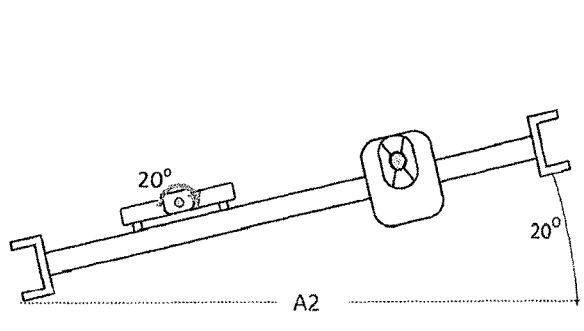
Figure 9:
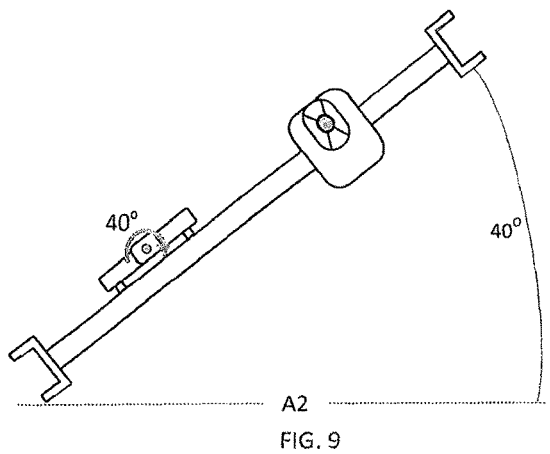
Figure 13:
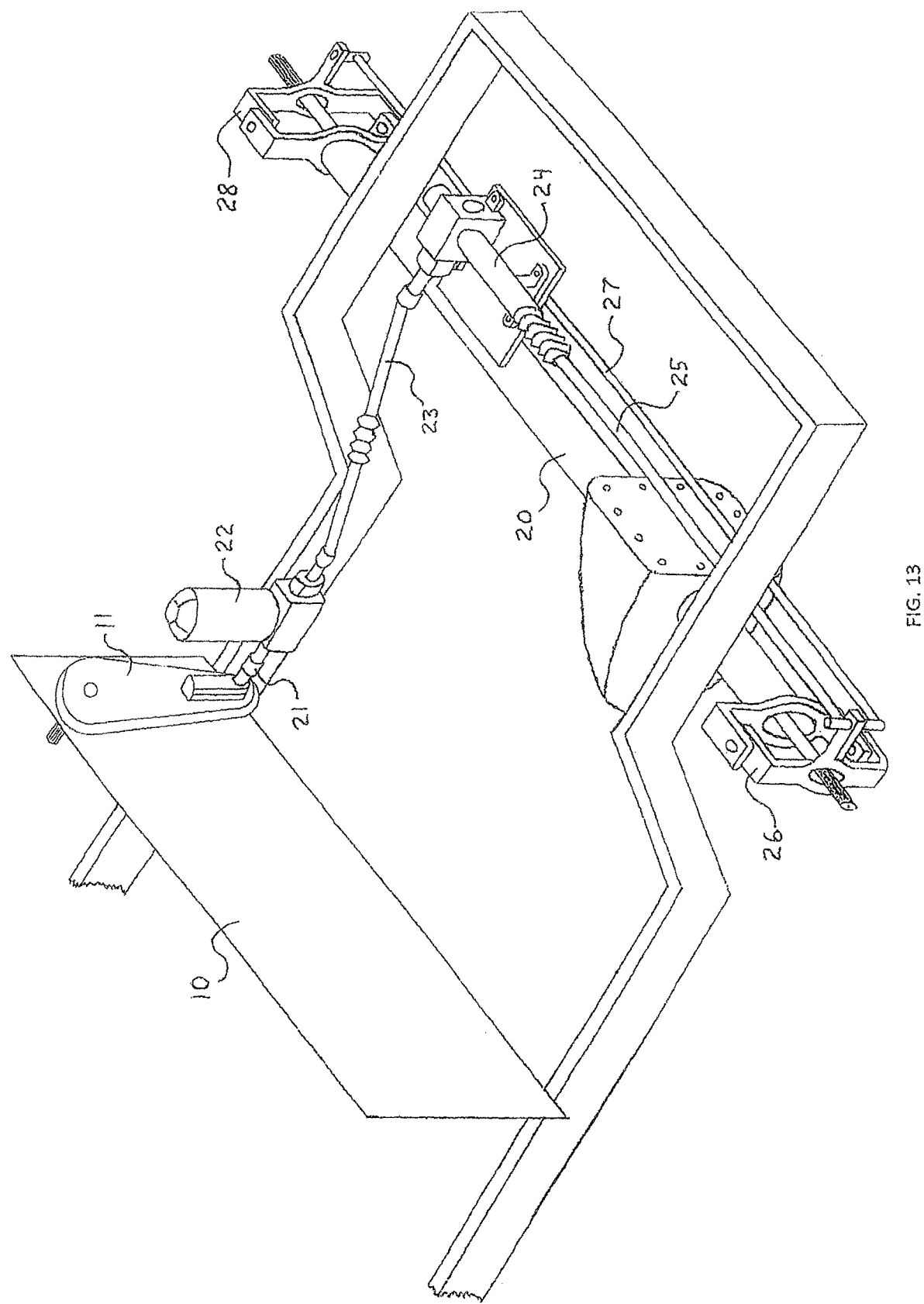
Figure 14:
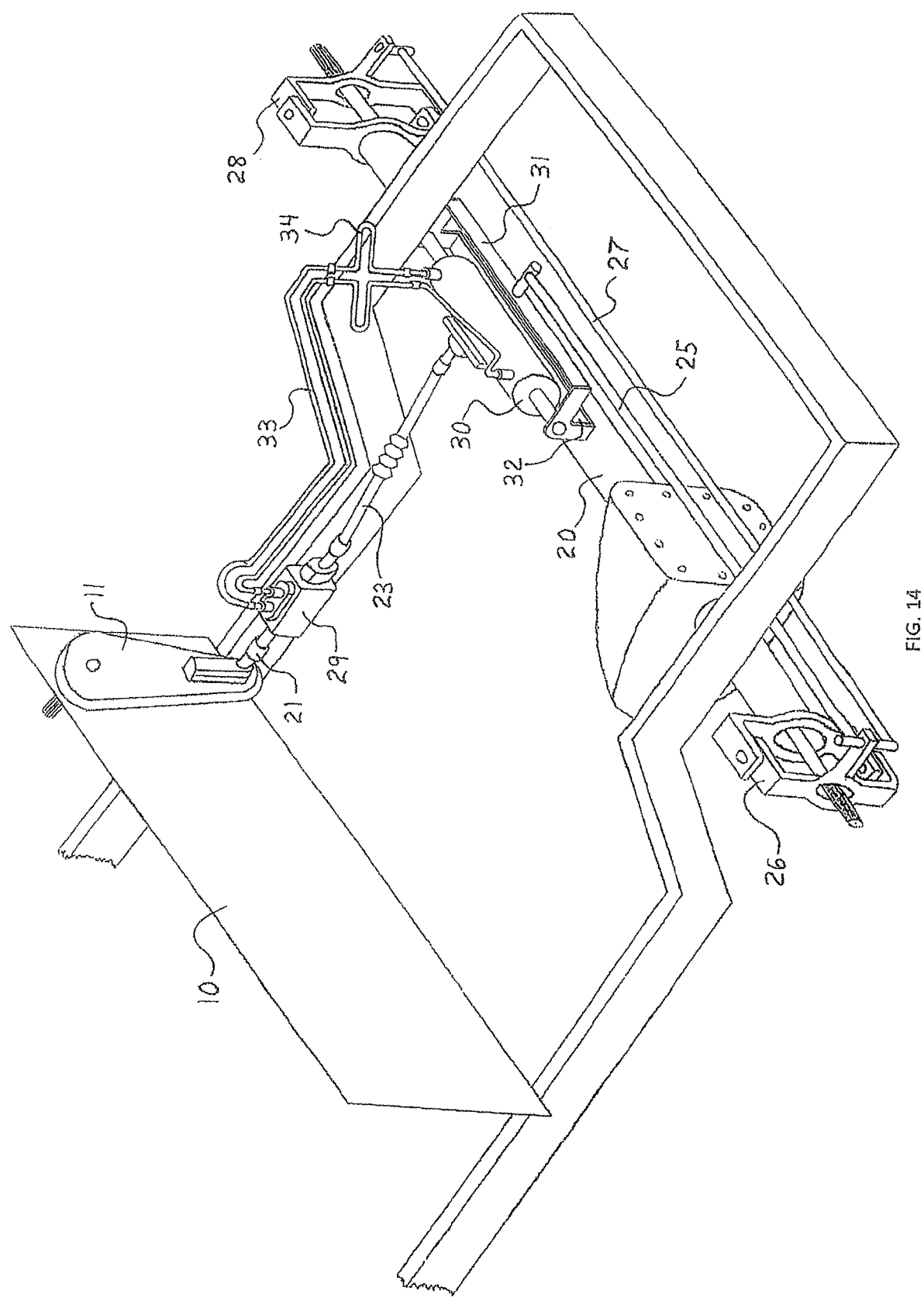

It is appreciated that these drawings depict only illustrated embodiments of the invention and are therefore not limited to the precise arrangements and instrumentalities shown:

FIG. 1 is a front side perspective view of the internal components for the augmented chain and sprocket assembly 11;

FIG. 2 is a front side perspective view of the cut-away augmented chain and sprocket assembly 11;

FIG. 3 is a front side perspective view of the augmented chain and sprocket assembly 11;

FIG. 4 is a front view of the output shaft and electric motor for the augmented chain and sprocket assembly 11;

FIG. 5 is a side perspective view of the output shaft and electric motor for the augmented chain and sprocket assembly 11;

FIG. 6 is a top down view of the turning radius of one of the front wheels;

FIG. 7 is a backside view of the front axle that is parallel to the ground;

FIG. 8 is a backside view of the front axle that is articulated 20 degrees;

FIG. 9 is a backside view of the front axle that is articulated 40 degrees;

FIG. 10 is an algorithm for computing bumpsteer for a steering ratio of 3:1;

FIG. 11 is an algorithm for computing bumpsteer for a steering ratio of 6:1;

FIG. 12 is equation 6 that is used to compute the augmentation of the augmented chain and sprocket assembly 11;

FIG. 13 is a front side perspective view of the first particular arrangement of the steering system in U.S. patent application Ser. No. 17/115,573;

FIG. 14 is a front side perspective view of the second particular arrangement of the steering system in U.S. patent application Ser. No. 17/115,573.

Figure 15:
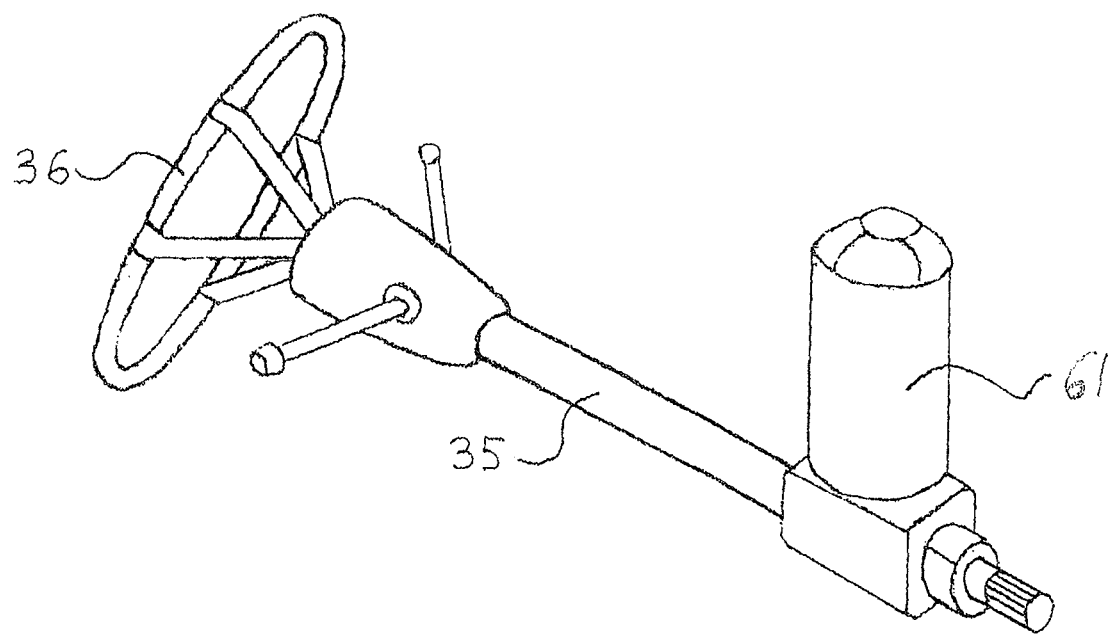
Figure 16:
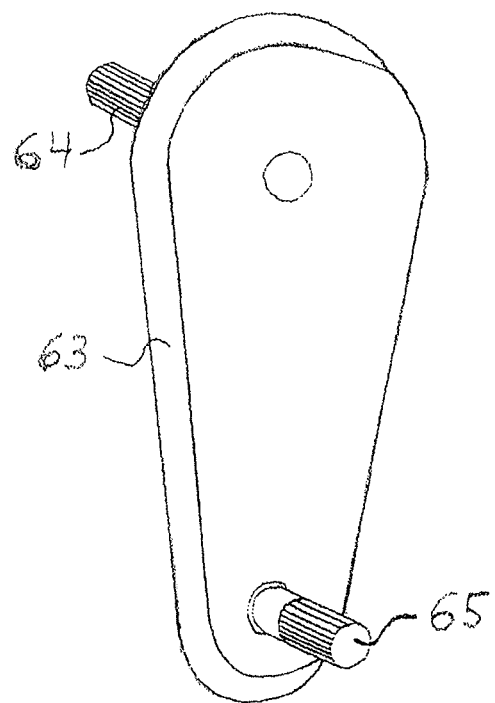
Figures 17, 18:
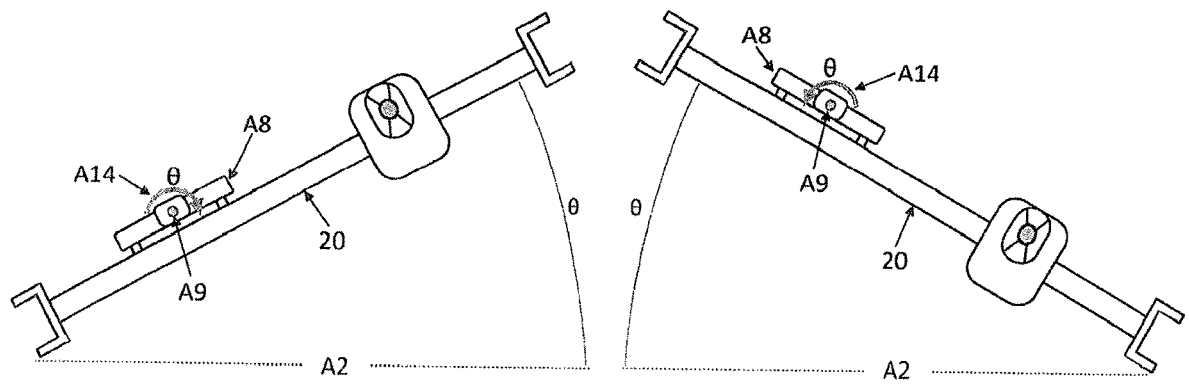
Figure 19:
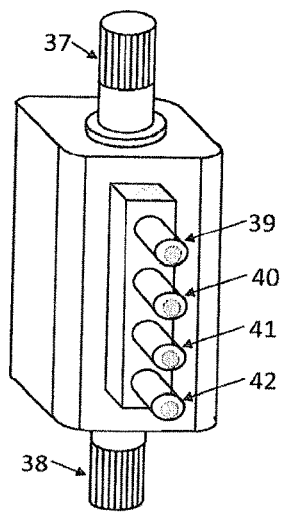
Figure 20:
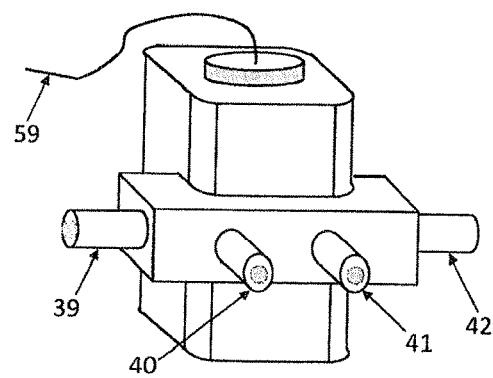
Figure 21:
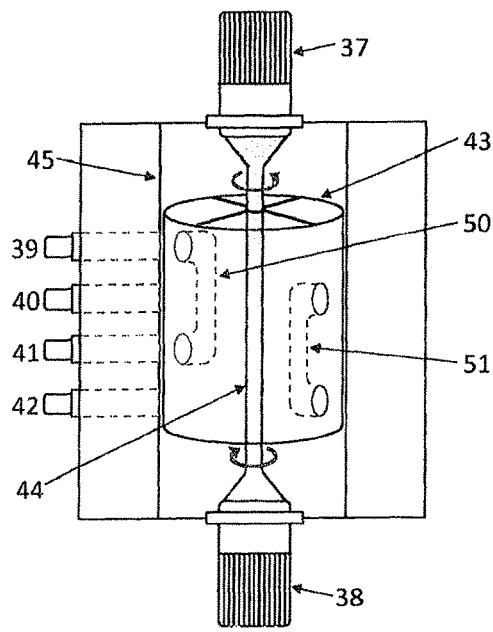
Figure 22:
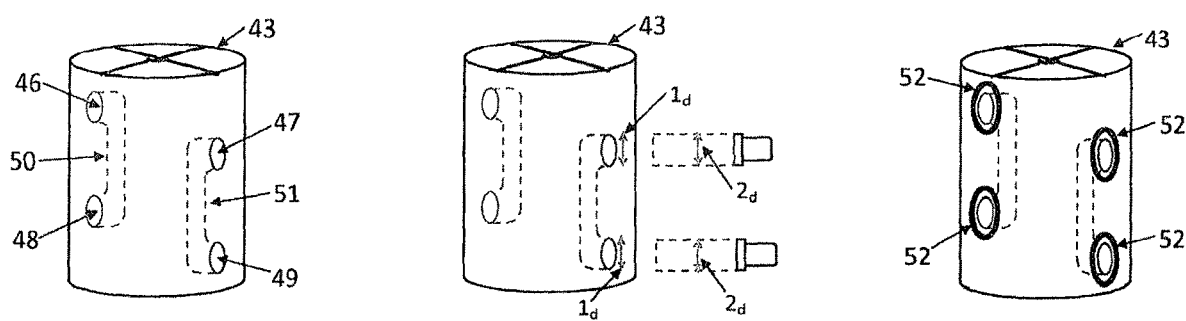
Figure 23:
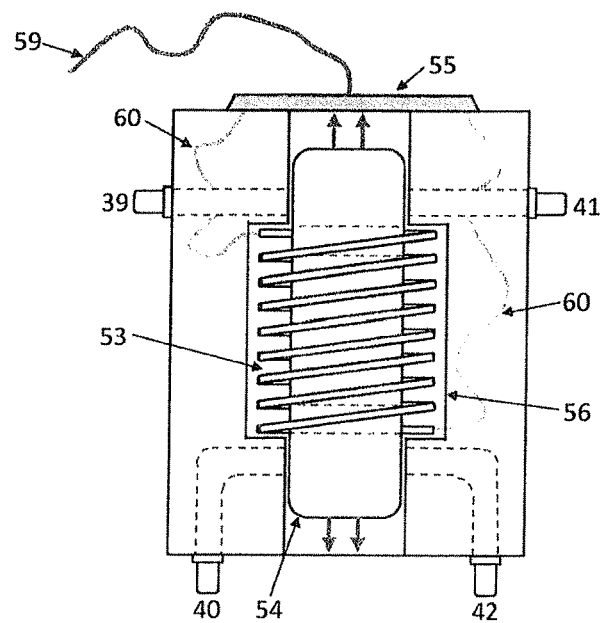
Figure 24:
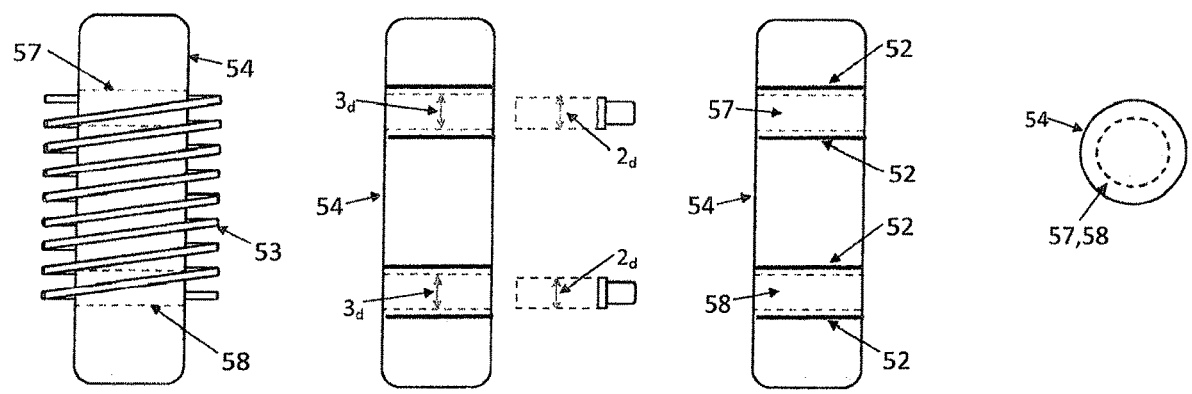
Figure 25:
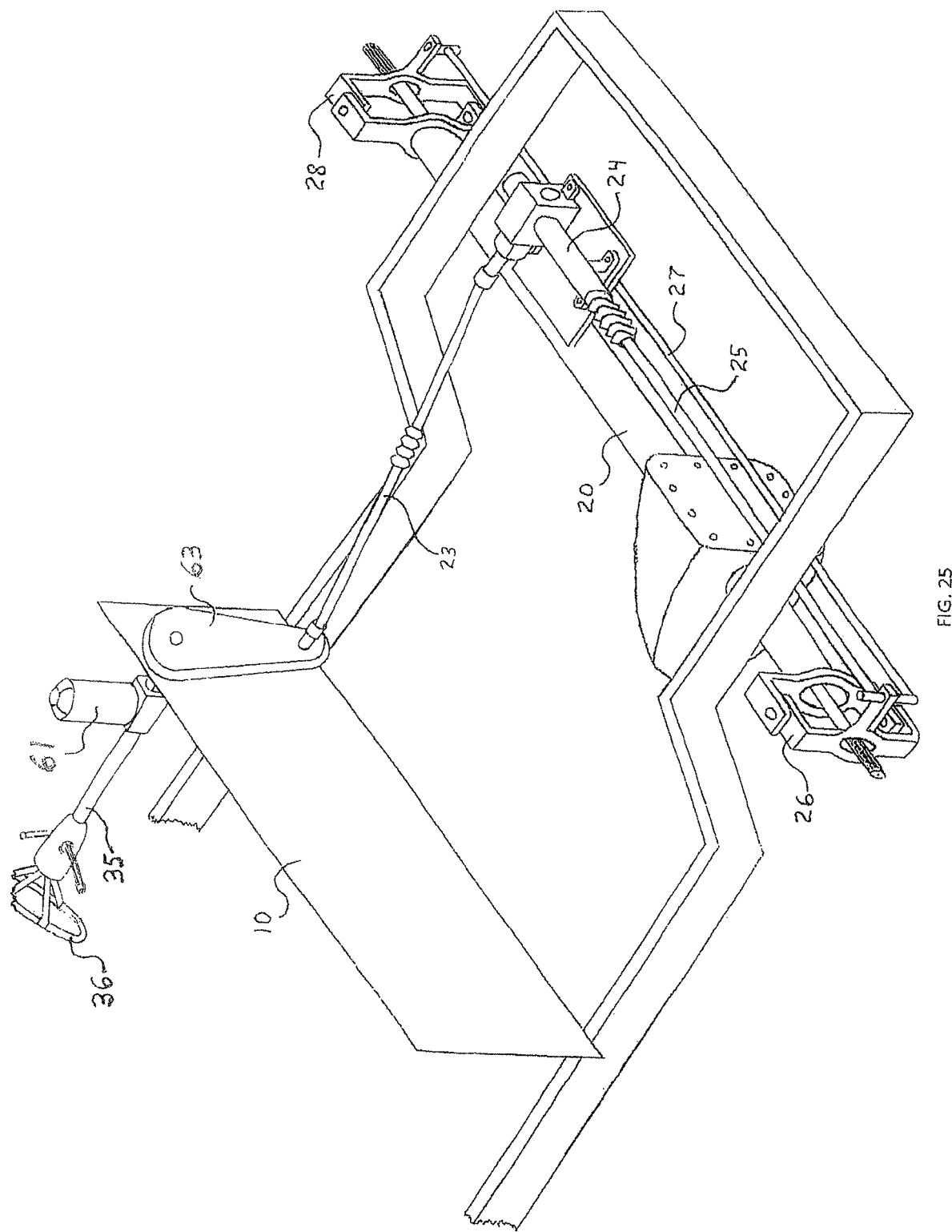
Figure 26:
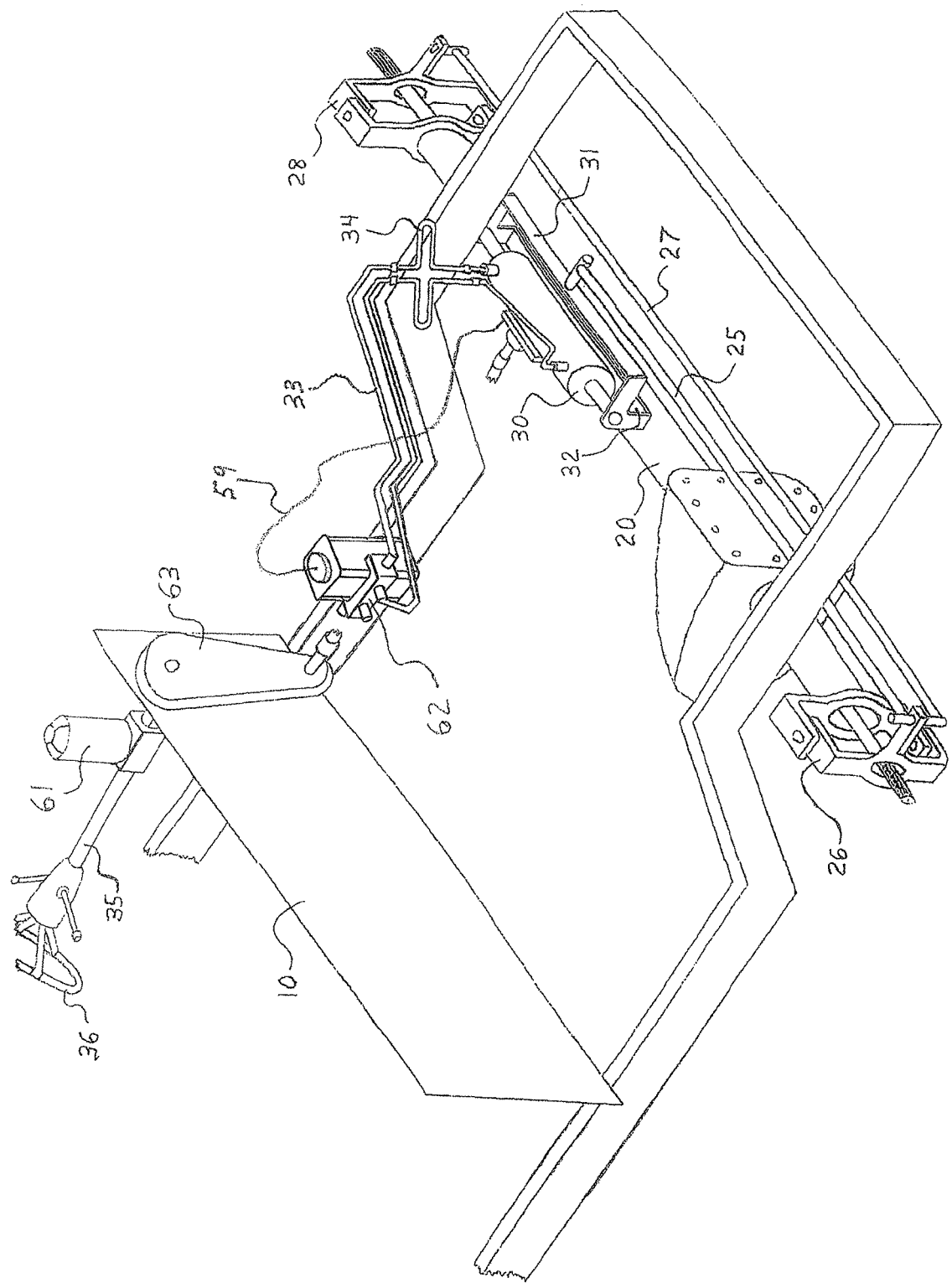
Figure 26:
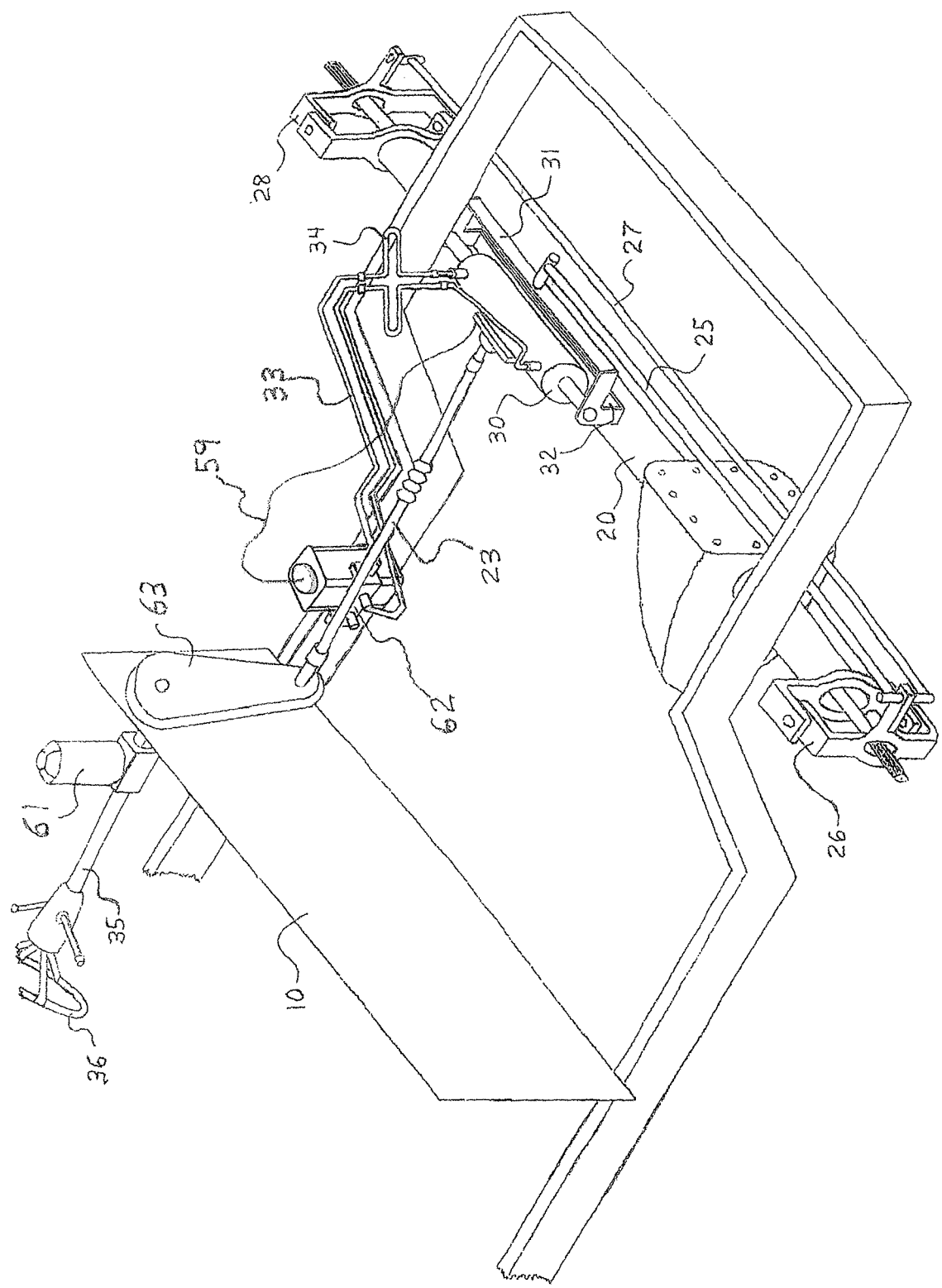

FIG. 15 is a front side perspective view of the electric assist steering column;

FIG. 16 is a front side perspective view of the augmented chain and sprocket assembly 63;

FIG. 17 is a view of the simulated rotation of the pinion shaft due to the counterclockwise articulation of the front axle;

FIG. 18 is a view of the simulated rotation of the pinion shaft due to the clockwise articulation of the front axle;

FIG. 19 is a front side perspective view of the known hydraulic control valve 29;

FIG. 20 is a front side perspective view of our hydraulic control valve 62;

FIG. 21 is a plan view of the rotary valve-torsion bar mechanism for the known hydraulic control valve 29;

FIG. 22 is a plan view of the components for the rotary valve;

FIG. 23 is a plan view of the solenoid valve-plunger mechanism for our hydraulic control valve 62;

FIG. 24 is a plan view of the components for solenoid valve-plunger bar mechanism;

FIG. 25 is a front side perspective view of the first particular arrangement of the steering system in the present invention;

FIG. 26 is a front side perspective view of the second particular arrangement of the steering system in the present invention;

DETAILED DESCRIPTION OF THE INVENTION

U.S. patent application Ser. No. 17/115,573 represents a steering system designed to function with a vehicle whose frame is suspended above front and rear solid or beam type axles, the front axle being steerable. The steering system utilizes mechanical linkages and is specifically designed to operate in conjunction with a triangulated link-style suspension system.

For discussion purposes: One, only the front portion of a chassis is shown in the drawings, and includes part of the driver and passenger frame sides, front end of the frame, and firewall 10. Two, the front suspension system is not shown in the drawings. While a front solid axle is disposed beneath the chassis as appropriate, the axle is not connected to the chassis via suspension control links. Three, the electric motor 17 that is able to be oriented adjacent to either the input shaft 15 or output shaft 16 of the augmented chain and sprocket assembly 11 is oriented adjacent to the output shaft 16 only. Four, maximum articulation of the front axle during off-road driving is 40 degrees (40° max) while that during street driving is 20 degrees (20° max). Five, rotation or turning of the steering wheel (not shown) by the driver refers to steering input, and generates a rotational torque.

U.S. patent application Ser. No. 17/115,573 utilizes a known rack and pinion gearset with a slow steering ratio. The known rack and pinion gearset is able to be a manual rack and pinion gearset 24 or ram assist rack and pinion gearset 30. For each gearset, a toothed pinion shaft meshes with a toothed rack. The meshing process defines an interaction between the teeth on the pinion shaft and those on the rack such that the rotation of the pinion shaft causes a linear displacement of the rack. The interaction involves: The rotational torque of the steering input defines a torque (rotational) force that is exerted on the pinion shaft, which causes the pinion shaft to rotate. By causing the pinion shaft to rotate, the torque force of the steering input is transmitted to the pinion shaft such that the torque force now becomes the rotational torque or torque force of the pinion shaft. The pinion shaft exerts the torque force on the rack during the meshing process, thereby causing the rack to be displaced in a linear fashion. The torque force of the pinion shaft is known as the pinion shaft force.

For the manual rack and pinion gearset 24, the rack is connected to the draglink 25 and the draglink 25 is connected to the passenger-side steering knuckle 26. The passenger-side steering knuckle 26 is connected to the driver-side steering knuckle 28 via the tie rod 27. The displacement of the rack displaces the draglink 25 which displaces the passenger-side steering knuckle 26, and driver-side steering knuckle 28 via the tie rod 27, thereby causing the front wheels (not shown) to turn.

For the ram assist rack and pinion gearset 30, the hydraulic fluid generates hydraulic pressure in the ram which defines a hydraulic pressure force of the ram. The hydraulic fluid regulating function in the control valve 29 varies the hydraulic pressure in the ram which in turn varies the hydraulic pressure force of the ram. The ram exerts the hydraulic pressure force on the rack 32, which displaces the rack 32. The rack 32 can be displaced in three ways; by the hydraulic pressure force, pinion shaft force, and simulated rotation of the pinion shaft. Since the simulated rotation of the pinion shaft refers to the rack and pinion gearset rotating while the pinion shaft does not rotate and since the rotation of the pinion shaft defines the pinion shaft force, then the pinion shaft force does not exist during the simulated rotation of the pinion shaft—meaning the rack 32 is displaced by either the pinion shaft force or simulated rotation of the pinion shaft but not both at the same time. Further since the rack 32 cannot undergo two different displacements at the same time (obviously physically impossible), then the displacement of the rack 32 due to the hydraulic pressure force must be the same as that due to the pinion shaft force or simulated rotation of the pinion shaft. That is, the displacement of the rack 32 due to the hydraulic pressure force must be coordinated with that due to the pinion shaft force or simulated rotation of the pinion shaft. In effect, the displacement of the rack 32 due to the hydraulic pressure force must be coordinated with the intended or unintended displacement of the rack 32.

The ram assist rack and pinion gearset 30 (specifically, control valve 29 and ram assist rack and pinion gearset 30) are constructed in a manner such that the hydraulic fluid regulating function in the control valve 29 is activated by and responds to the intended or unintended displacement of the rack 32. This means that the hydraulic fluid regulating function in the control valve 29 is coordinated with the intended or unintended displacement of the rack 32, i.e., the hydraulic pressure variance in the ram is coordinated with the intended or unintended displacement of the rack 32—as the displacement of the rack 32 varies, the hydraulic pressure varies. This way, the displacement of the rack 32 due to the hydraulic pressure force is coordinated with that due to the pinion shaft force or simulated rotation of the pinion shaft, thereby establishing that the hydraulic pressure force is coordinated with the pinion shaft force. Problems can arise when a hydraulic assist rack and pinion gearset is constructed in a manner such that the rotation of the input shaft for the control valve governs the hydraulic fluid regulating process. Such a hydraulic pressure management system fails to coordinate with the displacement of the rack due to the pinion shaft force during articulation of the axle when driving straight ahead. During articulation of the axle when driving straight ahead, the input shaft and pinion shaft do not rotate and yet the rack is displaced due to the rotation of the rack and pinion gearset, i.e., simulated rotation of the pinion shaft. Since the input shaft does not rotate while the rack is displaced, then the hydraulic pressure variance is not coordinated with the displacement of the rack due to the pinion shaft force; i.e., the hydraulic pressure force is not coordinated with the pinion shaft force.

Coordination between the hydraulic pressure force and pinion shaft force defines a combined hydraulic pressure force and pinion shaft force that is greater than either the hydraulic pressure force or pinion shaft force alone. The combined hydraulic pressure force and pinion shaft force refer to a multiplied force that is exerted on the rack 32. The ram is connected to the rack 32 and tie rod bar 31 while the tie rod bar 31 is connected to the draglink 25. This way, the rack 32 is connected to the tie rod bar 31 such that the multiplied force that is exerted on the rack 32 refers to the multiplied force being exerted on the tie rod bar 31. The multiplied force that is exerted on the tie rod bar 31 results in the effortless displacement of the tie rod bar 31 and refers to the multiplied force of the tie rod bar 31. The multiplied force of the tie rod bar 31 is exerted on the draglink 25 and then on the passenger-side steering knuckle 26, and driver-side steering knuckle 28 via the tie rod 27, which effortlessly turn the vehicle.

Steering input passes through the steering shaft 23 and then the pinion shaft. Since the steering shaft 23 is connected to the pinion shaft, then the rotational motion of the steering input refers to the rotational motion of the steering shaft 23 while the rotational motion of the steering shaft 23 defines the rotational motion of the pinion shaft. This way, the steering shaft 23 and pinion shaft each transmit steering input via a rotational motion. The steering shaft 23 is equipped with a slip-joint thereby enabling the length of the steering shaft 23 to increase and decrease. The rotational motions of the steering shaft 23 and pinion shaft occur at a right angle to the length of the steering shaft 23 such that the rotations of the steering shaft 23 and pinion shaft are independent of and not influenced by the change in length of the steering shaft 23. This way during suspension travel, the change in length of the steering shaft 23 does not cause any unintended rotation of the pinion shaft. Specifically, during suspension travel, the change in length of the steering shaft 23 does not cause any unintended displacement of the rack—does not cause any bumpsteer.

In other words during suspension travel, the motion of the steering shaft 23 is coincident with that of the front suspension links, thereby resulting in zero bumpsteer. Consider: The front suspension links and steering shaft 23 each comprise one and the other ends. This way, the front suspension links are attached to the chassis at one end and the front axle 20 at the other end such that during suspension travel, the front suspension links move in an arc thereby causing the front axle 20 to also move in an arc. The arc followed by the front suspension links defines the arc followed by the front axle 20, which involves forwards and backwards motion as well as up and down motion. Likewise in effect, the steering shaft 23 is attached to the chassis at one end and the front axle 20 at the other end such that during suspension travel, the steering shaft 23 moves in an arc. The change in length of the steering shaft 23 enables the arc followed by the steering shaft 23 to be similar to the arc followed by the front suspension links. That is, the change in length of the steering shaft 23 enables the steering shaft 23 to move forwards, backwards, up, and down in concert with the front suspension links such that the steering shaft 23 and front suspension links follow similar arcs. The similar arcs define coincident motion that results in zero bumpsteer.

This means any rack and pinion gearset that is connected to a slip-joint equipped steering shaft can operate without invoking any bumpsteer during suspension travel. That is, the front axle-mounted rack and pinion gearset invokes zero bumpsteer during suspension travel. Therefore, the manual rack and pinion gearset 24 and ram assist rack and pinion gearset 30 invoke zero bumpsteer during suspension travel.

Driving without turning the steering wheel refers to driving straight ahead. When driving straight ahead, the articulation of the axle defines a rotation of the axle while the pinion shaft does not rotate. That is when driving straight ahead, the articulation of the axle defines a rotation of the rack and pinion gearset while the pinion shaft does not rotate. Rotation of the rack and pinion gearset while the pinion shaft does not rotate is functionally identical to rotation of the pinion shaft while the rack and pinion gearset does not rotate, which defines the normal operation of a rack and pinion gearset. Therefore, rotation of the rack and pinion gearset while the pinion shaft does not rotate refers to the simulated normal operation of a rack and pinion gearset. Specifically, the rotation of the rack and pinion gearset while the pinion shaft does not rotate refers to the simulated rotation of the pinion shaft. When driving straight ahead, the articulation of the axle causes a rotation of the rack and pinion gearset while the pinion shaft does not rotate, and thereby refers to the simulated rotation of the pinion shaft, i.e., when driving straight ahead, the articulation of the axle causes a rotation of the rack and pinion gearset and thereby refers to the simulated rotation of the pinion shaft. The simulated rotation of the pinion shaft causes an unintended displacement of the rack. When driving straight ahead, the articulation of the axle causes a rotation of the rack and pinion gearset while the pinion shaft does not rotate, and thereby refers to the simulated rotation of the pinion shaft, which causes an unintended displacement of the rack. In short when driving straight ahead, the articulation of the axle causes a rotation of the rack and pinion gearset and thereby refers to a simulated rotation of the pinion shaft, which causes the unintended displacement of the rack. The unintended displacement of the rack leads to an unintended turn of the front wheels. The unintended turn of the front wheels defines bumpsteer. Conclusion—the single greatest deficiency of the axle mounted rack and pinion gearset is: when driving straight ahead, the articulation of the axle causes the unintended displacement of the rack, which leads to an unintended turn of the front wheels, i.e., bumpsteer.

The slow steering ratio is essential because it negates the single greatest deficiency of a rack and pinion gearset that's attached to the front axle—propensity for bumpsteer during articulation. The steering ratio refers to the displacement of the rack for a given rotation of the pinion shaft. A quick steering ratio refers to an increased displacement of the rack for a given rotation of the pinion shaft while a slow steering ratio refers to a decreased displacement of the rack for a given rotation of the pinion shaft. Consider a small turn of the steering wheel that causes a small rotation of the pinion shaft. The small rotation of the pinion shaft is magnified by the quick steering ratio and thereby causes a large displacement of the rack, which leads to a large turn of the front wheels. Conversely, the small rotation of the pinion shaft is reduced by the slow steering ratio and thereby causes a very small displacement of the rack, which leads to a very small turn of the front wheels. Hereafter for discussion purposes, a given rotation of the pinion shaft refers to a small rotation of the pinion shaft. This way a given rotation of the pinion shaft refers to a small rotation of the pinion shaft, which is reduced by a rack and pinion gearset with a slow steering ratio and thereby causes a very small displacement of the rack; i.e., a rack and pinion gearset with a slow steering ratio refers to a small rotation of the pinion shaft, which causes a very small displacement of the rack.

Since articulation of the axle when driving straight ahead refers to a simulated rotation of the pinion shaft, which causes an unintended displacement of the rack and since a rack and pinion gearset with a slow steering ratio refers to a small rotation of the pinion shaft, which causes a very small displacement of the rack, then by using a rack and pinion gearset with a slow steering ratio, the articulation of the axle when driving straight ahead refers to a small simulated rotation of the pinion shaft, which causes a very small unintended displacement of the rack. That is, by using a rack and pinion gearset with a slow steering ratio, the articulation of the axle when driving straight ahead causes a very small unintended displacement of the rack. Thus during articulation when driving straight ahead, as the steering ratio of the rack and pinion gearset slows down, the unintended displacement of the rack decreases. Since bumpsteer is the unintended turning of the front wheels, then by using a rack and pinion gearset with a slow steering ratio, the articulation of the axle when driving straight ahead causes a very small unintended displacement of the rack which leads to a very small unintended turn of the front wheels, and thereby very small bumpsteer. This way by using a rack and pinion gearset with a slow steering ratio, the articulation of the axle when driving straight ahead causes a very small unintended displacement of the rack, which leads to a very small unintended turn of the front wheels. The very small unintended turn of the front wheels defines very small bumpsteer—bumpsteer is negligible.

In conclusion: Any slow ratio rack and pinion gearset that is connected to a slip-joint equipped steering shaft can operate with zero bumpsteer during suspension travel and negligible bumpsteer during articulation. That is, the front axle-mounted slow ratio rack and pinion gearset invokes zero bumpsteer during suspension travel and negligible bumpsteer during articulation. Therefore, the manual rack and pinion gearset 24 and ram assist rack and pinion gearset 30 invoke zero bumpsteer during suspension travel and negligible bumpsteer during articulation; i.e., the manual rack and pinion gearset 24 and ram assist rack and pinion gearset 30 invoke zero bumpsteer during suspension travel and negligible articulation-induced bumpsteer.

Referring to FIGS. 1-5, there are various illustrations of the augmented chain and sprocket assembly 11. The augmented chain and sprocket assembly 11 is a gearbox constructed of light-weight material such as aluminum, plastic, plastic composite, or related material. The material is machined in a manner such that the housing has the oval-like shape of a stadium, the one rounded end being larger than the second rounded end. The housing comprises internal and external components. The internal components include a large sprocket 12, small sprocket 13, chain 14, input shaft 15, and output shaft 16. The input and output shafts 15 and 16 protrude through opposite sides of the housing, thereby the input and output shafts 15 and 16 define the external components. The input and output shafts 15 and 16 are machined with serrations, the serrations being like the teeth on a gear. The large sprocket 12 is adapted to the input shaft 15 while the small sprocket 13 is adapted to the output shaft 16, the combination of each sprocket and shaft acts as a single unit, and is rotationally affixed to the inside of the housing. The large sprocket 12 and input shaft 15 unit is located at the one rounded end of the housing while the small sprocket 13 and output shaft 16 unit is located at the second rounded end of the housing such that the teeth on the large sprocket 15 do not contact those on the small sprocket 16. The chain 14 is positioned around the large and small sprockets 12 and 13 such that the links on the chain 14 are able to contact the teeth on the large and small sprockets 12 and 13. The contact between the links on the chain 14 and teeth on the large and small sprockets 12 and 13 depicts a rotational interaction between the chain 14 and large and small sprockets 12 and 13. The rotational interaction is caused by the rotational torque from the steering input and thereby enables steering input to be transmitted internally from the large sprocket 12 and input shaft 15 unit to the small sprocket 13 and output shaft 16 unit; i.e., from the input shaft 15 to the output shaft 16.

The augmented chain and sprocket assembly 11 quickens steering input. The quickening property acts to multiply steering input, and the multiplication of steering input is called augmentation. The augmentation enables the augmented chain and sprocket assembly 11 to function as a steering quickener. In order to function as a steering quickener, the augmented chain and sprocket assembly 11 is constructed in a manner such that the diameter of the large sprocket 12 is greater than that of the small sprocket 13. The differing diameters of the large and small sprockets 12 and 13 indicate that for every one rotation of the input shaft 15, the output shaft 16 undergoes more than one rotation. In effect, the rotation of the steering wheel is multiplied such that the rotation of the pinion shaft is greater than that of the steering wheel. For every rotation of the steering wheel, rotation of the pinion shaft is multiplied by the amount of the augmentation.

Common augmentations include: 1.5:1 and 2:1. One revolution of the steering wheel is 360 degrees (360°). At 1.5:1, for every one revolution of the steering wheel, the pinion shaft rotates one and a half revolutions, or 540 degrees (540°). At 2:1, for every one revolution of the steering wheel, the pinion shaft rotates two revolutions, or 720 degrees (720°). Steering input is transmitted from the input shaft 15 to the output shaft 16 such that the rotation of the input shaft 15 causes the output shaft 16 to rotate. The greater rotation of the output shaft 16 relative to the input shaft 15 means that the rotational torque that is exerted on the input shaft 15 must be increased in order to cause the output shaft 16 to rotate—the driver must exert more "muscle" to turn the steering wheel. That is, augmentation of the augmented chain and sprocket assembly 11 makes rotation of the output shaft 16 by the input shaft 15 (or steering input) more difficult. The increase in rotational torque is proportional to the augmentation. As the diameter of the sprocket attached to the input shaft 15 increases relative to that attached to the output shaft 16, the rotational torque needed to rotate the output shaft 16 increases.

The internal components are able to include an electric motor 17. One end of the rotor 18 protrudes through the electric motor 17, and is connected to a cup-shaped gear 19 such that the teeth on the cup-shaped gear 19 point in the same direction as the rotor 18. The electric motor 17 is attached to the inside of the housing in a manner such that the rotor 18 is oriented adjacent to and perpendicular to the input or output shaft 15 or 16. Referring particularly to FIGS. 16 and 17, the adjacent perpendicular orientation enables the teeth on the cup-shaped gear 19 to mesh with the serrations on the input shaft 15 (meshing not shown) or output shaft 16 (meshing shown). The meshing between the teeth and serrations defines a rotational interaction between the electric motor 17 and output shaft 16. The electric motor 17 generates a rotational torque which defines a torque (rotational) force. The rotational interaction between the electric motor 17 and output shaft 16 enables the torque force to be exerted on the output shaft 16. The torque force multiplies the rotational torque from the steering input, thereby resulting in effortless rotation of the output shaft 16. The electric motor 17 is connected via 2-3 small wires to an electronic control module (wires and module not shown). The electronic control module responds to steering input by supplying power to and governing the direction and rotational speed of the electric motor 17. This way, the electric motor 17 facilitates rotation of the output shaft 16 at the same speed and direction as does steering input, thereby helping the front wheels to turn left or right. The electronic control module can be mounted to any convenient surface; e.g., firewall, dash panel, or inner fender well. The electric motor 17 is a brushless variant of the small, powerful electric motors manufactured by Vivax Assist®. Vivax Assist® motors are commonly built into the frames of bicycles and facilitate the turning of the petal crank by the rider. The brushless design is a state-of-the-art feature introduced to electric motors. While the design has not been incorporated into the Vivax Assist® motor, a brushless Vivax Assist® motor promises two qualities for the electric motor 17: One, it enables the electric motor 17 to exert variable torque force on the output shaft 16. The variability refers to the torque force being exerted in proportion to the rotational torque supplied by the driver turning the steering wheel. Two, the variability means that just the right amount of torque force is exerted on the output shaft 16 at any given time, and thereby improves the durability of the electric motor 17.

As a steering quickener, the augmented chain and sprocket assembly 11 quickens (speeds up) the steering input by the driver. The quickening (speeding up) of the steering input refers to the quickening (speeding up) of the rotation of the steering wheel, in effect, the multiplication of the rotation of the steering wheel. The multiplied rotation of the steering wheel is transmitted to all components downstream of the augmented chain and sprocket assembly 11, particularly the pinion shaft; meaning that the pinion shaft rotates at a faster rate than does the steering wheel.

The faster rotation of the pinion shaft causes the front wheels to turn faster than they do when steering input is not multiplied. The net effect of the front wheels turning faster with the augmented chain and sprocket assembly 11 than they do without the augmented chain and sprocket assembly 11 is that, in order to turn the front wheels a given amount, the driver turns the steering wheel less with the augmented chain and sprocket assembly 11 than they do without the augmented chain and sprocket assembly 11. That is, the multiplication of the rotation of the steering wheel has the effect of reducing the turns that the driver must do to the steering wheel in order to turn the front wheels a given amount—the quicker (faster) the steering input, the greater is the multiplication of the rotation of the steering wheel, and the less the driver must turn the steering wheel in order to turn the front wheels a given amount. For example, consider a steering system without the augmented chain and sprocket assembly 11 in which the driver must do a half turn of the steering wheel (180 degrees) in order to make the front wheels turn 10 degrees. Now include the augmented chain and sprocket assembly 11 with a 2:1 augmentation to the steering system. The 2:1 augmentation has the effect of doubling the rate of rotation of the steering wheel, which has the effect of cutting in half the amount that the driver needs to turn the steering wheel in order to make the front wheels turn 10 degrees. Thus, the half turn of the steering wheel (180 degrees) is cut in half to only a quarter turn of the steering wheel (90 degrees) in order to make the front wheels turn 10 degrees.

The turns that the driver does to the steering wheel in order to turn the front wheels a given amount define the vehicle's steering response. For a given turn of the front wheels, the less the driver turns the steering wheel, the quicker/faster the vehicle's steering response. Since turning the steering wheel can be a fatiguing process, a steering system is preferably designed in order to minimize the turning of the steering wheel by the driver. For example, sports cars and race cars are designed to have quick steering response in order to maximize performance and handling and minimize driver fatigue.

The augmented chain and sprocket assembly 11 has a direct effect on the steering ratios of the manual rack and pinion gearset 24 and ram assist rack and pinion gearset 30. The steering ratio defines the number of times the steering wheel must be turned in order to turn the front wheels from lock to lock. One turn of the steering wheel refers to one 360 degree rotation of the steering wheel; whereas turning from lock to lock refers to the front wheels being turned from a full left turn to a full right turn or vice versa. For example, a 3:1 steering ratio indicates that the steering wheel is turned three times in order to turn the front wheels from lock to lock; and, a 6:1 steering ratio indicates that the steering wheel is turned six times in order to turn the front wheels from lock to lock. The smaller the steering ratio, the less times the steering wheel is turned to make the front wheels turn from lock to lock, and the quicker (faster) is the vehicle's steering response.

The multiplied rotation of the steering wheel, which is transmitted to the pinion shaft, acts to multiply the rotation of the pinion shaft. The multiplied rotation of the pinion shaft increases the displacement of the rack during the meshing process. The increased displacement of the rack leads to a quicker (faster) turn of the front wheels, which has the effect of quickening (speeding up) the steering ratio of the manual rack and pinion gearset 24 or ram assist rack and pinion gearset 30. For example: First consider that the manual rack and pinion gearset 24 or ram assist rack and pinion gearset 30 has a 6:1 steering ratio such that the driver must do six turns of the steering wheel (6×360 degrees) in order to make the front wheels turn from lock to lock. Second, now include the augmented chain and sprocket assembly 11 with a 2:1 augmentation to the manual rack and pinion gearset 24 or ram assist rack and pinion gearset 30. The 2:1 augmentation has the effect of doubling the rate of rotation of the pinion shaft which doubles the displacement of the rack.

The doubling of the displacement of the rack doubles the speed at which the front wheels turn from lock to lock. The doubling of the speed at which the front wheels turn from lock to lock cuts in half the required number of turns of the steering wheel in order to make the front wheels turn from lock to lock. Thus, the six turns of the steering wheel (6×360 degrees) is cut in half to only three turns of the steering wheel (3×360 degrees) in order to make the front wheels turn from lock to lock. The reduction of the six turns to three turns effectively transforms the 6:1 steering ratio into a 3:1 steering ratio, i.e., the manual rack and pinion gearset 24 or ram assist rack and pinion gearset 30, with a 6:1 steering ratio operates as though it has a 3:1 steering ratio.

Conclusion: When combined with the 2:1 augmented chain and sprocket assembly 11, the 6:1 steering ratio manual rack and pinion gearset 24 or ram assist rack and pinion gearset 30 operates as though it has a 3:1 steering ratio. For discussion purposes, let the 6:1 steering ratio refer to a slow steering ratio while a 3:1 steering ratio refers to a quick steering ratio: The inclusion of the 2:1 augmented chain and sprocket assembly 11 into a steering system comprised of the 6:1 steering ratio manual rack and pinion gearset 24 or ram assist rack and pinion gearset 30 transforms a slow steering system into a quick steering system, thereby quickening (speeding up) the vehicle's steering response. In other words: The combination of the augmentation and slow steering ratio causes a quick turn of the front wheels for a given rotation of the steering wheel, and defines quick steering response; the quick steering response being analogous to an ordinary steering system comprised of a quick ratio rack and pinion gearset. The net result of the combined augmentation and slow steering ratio is quick steering response with zero bumpsteer during suspension travel and negligible bumpsteer during articulation, i.e., negligible articulation-induced bumpsteer.

Referring to FIGS. 6-11, there are shown a method for computing articulation-induced bumpsteer as a function of the steering ratio of the rack and pinion gearset. The relationship between bumpsteer and steering ratio during articulation is based on ten assumptions. The ten assumptions lead to the derivation of four mathematical equations. The four mathematical equations define an algorithm. The algorithm computes bumpsteer for a selected steering ratio. For discussion purposes, two different steering ratios, 3:1 and 6:1, are selected. Bumpsteer for the steering ratio of 3:1 is computed with a first algorithm while bumpsteer for the steering ratio of 6:1 is computed with a second algorithm. The ten assumptions are described below, followed by the first and second algorithms, each algorithm referring to the same four mathematical equations. Key terms and interrelationships among the ten assumptions are shown in the FIGS. 6-9 while the bumpsteers for the steering ratios of 3:1 and 6:1 are shown in FIGS. 10 and 11, respectively.

Ten Assumptions

1. The turning of the front wheels refers to the front wheels rotating about a vertical axis that passes through the middle of wheel, and is reported in degrees of rotation about the vertical axis. This way, centered front wheels refer to zero degrees (0°). A full left or right turn of the front wheels refers to the front wheels being turned from center to lock, and refers to 35 degrees (35°). Referring to FIG. 6: one of the front wheels is specified by A1; centered front wheels are specified by A3; and, a full left turn, full right turn of the front wheels are specified by A4, A5, respectively.
2. One full turn of the steering wheel refers to one full rotation of the pinion shaft or front axle about the longitudinal axis. One full turn or rotation refers to a 360 degree (360°) turn or rotation, respectively.
3. A centered steering wheel refers to centered front wheels such that the vehicle is traveling straight ahead.
4. The turning of the steering wheel from center to lock refers to the turn of the front wheels from center to lock.
5. The steering ratio refers to the number of turns of the steering wheel or number of rotations of the pinion shaft in order for the front wheels to go from a full left turn to a full right turn or vice versa; i.e., to go from lock-to-lock.
6. A steering ratio of 3:1 defines the steering wheel being turned 3 times or 3 full turns in order for the front wheels to go from lock to lock, which also refers to the steering wheel being turned 1.5 times or 1.5 full turns in order for the front wheels to go from center to lock, i.e., a full left turn or a full right turn. A steering ratio of 3:1 is a quick steering ratio. Referring to FIG. 6: a steering ratio of 3:1 is specified by A6, which indicates that the steering wheel is turned 1.5 times in order for the front wheels to undergo a full left turn or a full right turn.
7. A steering ratio of 6:1 defines the steering wheel being turned 6 times or 6 full turns in order for the front wheels to go from lock to lock, which also refers to the steering wheel being turned 3 times or 3 full turns in order for the front wheels to go from center to lock, i.e., a full left turn or a full right turn. A steering ratio of 6:1 is a slow steering ratio. Referring to FIG. 6: a steering ratio of 6:1 is specified by A7, which indicates that the steering wheel is turned 3 times in order for the front wheels to undergo a full left turn or a full right turn.
8. Referring to FIG. 7, a front axle is shown and includes a rack and pinion gearset A8 with a pinion shaft A9, differential housing A10 with a front drive shaft A11, driver side inner-C end forging A12, and passenger side inner-C end forging A13.
9. Articulation refers to rotation of the front axle about the longitudinal axis, and is reported in degrees of rotation about the longitudinal axis. For reference, articulation is 0° when the axle is parallel to the ground; referring to FIGS. 7-9, the ground is specified by A2. Maximum articulation during off-road driving is 40 degrees (40°) while maximum articulation during street driving is 20 degrees (20°). Referring to FIGS. 7, 8 and 9, the front axle is parallel to the ground, articulated 20°, and articulated 40°, respectively.
10. Articulation, i.e. rotation of the front axle about the longitudinal axis, causes rotation of the rack and pinion gearset and refers to the simulated rotation of the pinion shaft. The rotation of the front axle about the longitudinal axis or simulated rotation of the pinion shaft is reported in degrees. Referring to FIG. 8 or 9, the thick curved arrow around the pinion shaft indicates that the pinion shaft is undergoing a simulated rotation of 20° or 40°, respectively.

First, Second Algorithms

(1) Assumed Terms a. steering ratio=3:1, 6:1
b. maximum turn of front wheels from center to lock=35°
c. maximum off-road articulation=40°
d. maximum street articulation=20°
e. rotation of pinion shaft per one full turn of steering wheel=360°
f. simulated rotation of pinion shaft at maximum off-road articulation=40°
g. simulated rotation of pinion shaft at maximum street articulation=20°

1. Equation 1 computes the number of turns of the steering wheel for front wheels to go from center to lock for a given steering ratio. The computation involves dividing the first number in the steering ratio by two. Turns of steering wheel from center to lock is specified as Aα in the drawings.

$$\frac{\text{turns of steering wheel}}{\text{from center to lock}} = \frac{\text{first number in}}{\text{steering ratio}} \div 2 \quad (\text{eq-1})$$

2. Equation 2 computes the rotation of the pinion shaft for front wheels to go from center to lock for a given steering ratio. The computation involves multiplying the number of turns of the steering wheel for front wheels to go from center to lock by a conversion factor comprising the rotation of the pinion shaft per one full turn of the steering wheel. Rotation of pinion shaft from center to lock is specified as Bβ in the drawings.

$$\frac{\text{rotation of pinion shaft}}{\text{from center to lock}} = \frac{\text{turns of steering wheel from}}{\text{center to lock}} \cdot \left[\frac{\text{Rotation of}}{\text{pinion shaft}} \div \frac{\text{one full turn of}}{\text{steering wheel}}\right] \quad (\text{eq-2})$$

3. Equation 3 computes the bumpsteer during maximum off-road articulation. The computation involves multiplying the simulated rotation of the pinion shaft during maximum off-road articulation by a conversion factor comprising the turn of the front wheels from center to lock per the rotation of the pinion shaft for front wheels to go from center to lock. Bumpsteer at maximum off-road articulation is specified as Γγ in the drawings.

$$\begin{aligned}\text{bumpsteer at maximum} \\ \text{off-road articulation}\end{aligned} = \begin{aligned}\text{simulated rotation of pinion} \\ \text{shaft at maximum off-road} \\ \text{articulation}\end{aligned} \quad (\text{eq-3})$$

$$\left[\frac{\text{turn of front}}{\text{wheels from}} \div \frac{\text{rotation of pinion}}{\text{shaft from}}\right]$$
$$\text{center to lock} \quad \text{center to lock}$$

$$= \frac{\text{unintended turns of front wheels}}{\text{at maximum off-road articulation}}$$

4. Equation 4 computes the bumpsteer during maximum street articulation. The computation involves multiplying the simulated rotation of the pinion shaft during maximum street articulation by a conversion factor comprising the turn of the front wheels from center to lock per the rotation of the pinion shaft for front wheels to go from center to lock. Bumpsteer at maximum street articulation 4 is specified as Δδ in the drawings.

$$\begin{aligned}\text{bumpsteer at maximum} \\ \text{street articulation}\end{aligned} = \begin{aligned}\text{simulated rotation of pinion} \\ \text{shaft at maximum street} \\ \text{articulation}\end{aligned} \cdot \quad (\text{eq-4})$$

$$\left[\frac{\text{turn of front}}{\text{wheels from}} \div \frac{\text{rotation of pinion}}{\text{shaft from}}\right]$$
$$\text{center to lock} \quad \text{center to lock}$$

$$= \frac{\text{unintended turns of front wheels}}{\text{at maximum street articulation}}$$

FIG. 10 illustrates the computation of bumpsteer when the steering ratio is 3:1 while FIG. 11 illustrates the computation of bumpsteer when the steering ratio is 6:1. Comparison of the results shown in FIGS. 10, 11 clearly reveal two conclusions: One, bumpsteer due to the quick steering ratio is greater than that due to the slow steering ratio, thereby indicating that bumpsteer is related to the "quickness" of the steering ratio—the quicker the steering ratio, the greater the bumpsteer. Two, bumpsteer due to off-road articulation is greater than that due to street articulation, thereby indicating that bumpsteer is related to the articulation of the front axle—the greater the articulation, the greater the bumpsteer.

The steering ratio of 6:1 is a slow steering ratio and results in a bumpsteer of 0.7 degrees (0.7°) for maximum articulation during street driving; i.e., a slow steering ratio results in a maximum articulation-induced bumpsteer of 0.7° when driving on the street. For discussion purposes: a bumpsteer of 0.7° is very small and defines negligible bumpsteer; maximum articulation during street driving is simply called articulation during street driving; and ordinary driving conditions refer to street or mild off-road driving. This way, a slow steering ratio results in a maximum articulation-induced bumpsteer of 0.7° during ordinary driving conditions. Maximum articulation during street driving refers to articulation of the axle while maximum articulation during off-road driving refers to large articulation of the axle. A slow steering ratio results in negligible articulation-induced bumpsteer (max of 0.7°) during ordinary driving conditions.

Referring to FIG. 12, there is shown equation 5 for computing the augmentation of the augmented chain and sprocket assembly 11. Augmentation of the augmented chain and sprocket assembly 11 can be determined from a simple computation involving the current steering ratio and the desired steering ratio. Given that the current steering ratio is different, and likely slower, than the desired steering ratio, then the augmentation of the augmented chain and sprocket assembly 11 is computed as the quotient found by dividing the first number in the current steering ratio by the first number in the desired steering ratio. For example, given that the current steering ratio is 6:1 while the desired steering ratio is 3:1, then the augmentation of the augmented chain and sprocket assembly 11 is 2:1 (6/3), meaning that for every one rotation of the input shaft 15, the output shaft 16 undergoes two rotations. Augmentation of chain and sprocket assembly is specified as EE in the drawings.

$$\frac{\text{Augmentation of chain}}{\text{and sprocket assembly}} = \frac{\text{current steering}}{\text{ratio}} \div \frac{\text{desired steering}}{\text{ratio}} \quad (\text{eq-5})$$

Referring to FIG. 13, there is an illustration of the first particular arrangement of the steering system in U.S. patent application Ser. No. 17/115,573. The steering system includes the manual rack and pinion gearset 24, augmented chain and sprocket assembly 11, electric assist motor box 22, and associated linkages. The linkages include a coupler shaft 21, steering shaft 23, draglink 25, and tie rod 27. Secured to the firewall 10 is the augmented chain and sprocket assembly 11, the augmented chain and sprocket assembly 11 being vertically oriented such that the one rounded end is at the top while the second rounded end is at the bottom. The input shaft 15 is directed backward towards the steering wheel and is pivotally connected to the end of the steering column (not shown) while the output shaft 16 is directed forward towards the front axle 20 and is pivotally connected to the back end of the coupler shaft 21. The front end of the coupler shaft 21 is pivotally connected to the input shaft of the electric assist motor box 22. The output shaft of the electric assist motor box 22 is pivotally connected to the back end of the steering shaft 23 while the front end of the steering shaft 23 is pivotally connected to the pinion shaft of the manual rack and pinion gearset 24.

Cooperation among the augmented chain and sprocket assembly 11, coupler shaft 21, electric assist motor box 22, and steering shaft 23 enables steering input to be transmitted from the steering column to the manual rack and pinion gearset 24. The manual rack and pinion gearset 24 is attached to the front axle 20 between the differential housing and driver side inner-C end forging. The end of the rack is pivotally connected to the first end of the draglink 25 while the second end of the draglink 25 is pivotally connected to the passenger-side steering knuckle 26. The passenger-side steering knuckle 26 is pivotally connected to the first end of the tie rod 27 while the second end of the tie rod 27 is pivotally connected to the driver-side steering knuckle 28. Cooperation among the manual rack and pinion gearset 24, draglink 25, and tie rod 27 enables steering input to be transmitted from the manual rack and pinion gearset 24 to the driver-side and passenger-side steering knuckles 28 and 26. Transmission of steering input to the driver-side and passenger-side steering knuckles 28 and 26 enable the driver-side and passenger-side steering knuckles 28 and 26 to turn, and thereby turn the vehicle.

The electric assist motor box 22 is attached to the inner part of the driver frame side rather than to the manual rack and pinion gearset 24. Attachment to the inner part of the driver frame side defines a remote location that removes the electric power assist motor box 22 from the manual rack and pinion gearset 24, and isolates the electric assist motor box 22 from the adverse conditions experienced by the manual rack and pinion gearset 24. The isolation maintains the precise electric power assist function during operation of the vehicle over rough terrain. The electric assist motor box 22 multiplies the rotational torque of the pinion shaft. The multiplied rotational torque of the pinion shaft defines a multiplied pinion shaft force. The multiplied pinion shaft force is exerted on the rack, and thereby results in effortless displacement of the rack. The torque force from the electric motor 17 that is exerted on the output shaft 16 results in effortless rotation of the output shaft 16.

The combined effects of the effortless rotation of the output shaft 16 and effortless displacement of the rack lead to effortless turning of the front wheels by the steering system comprising the manual rack and pinion gearset 24, augmented chain and sprocket assembly 11, electric assist motor box 22. The effortless turning of the front wheels by the steering system comprising the manual rack and pinion gearset 24, augmented chain and sprocket assembly 11, electric assist motor box 22 is similar to that by a steering system comprising a hydraulic assist rack and pinion gearset.

The steering quickener effect of the augmented chain and sprocket assembly 11 quickens the slow ratio of the manual rack and pinion gearset 24 such that the cooperation between the augmented chain and sprocket assembly 11 and manual rack and pinion gearset 24 provides the steering system with quick steering response, the same quick steering response provided by a steering system with a quick ratio manual rack and pinion gearset.

Given that a slow steering ratio results in negligible articulation-induced bumpsteer (max of) 0.7° during ordinary driving conditions (street or mild off-road driving conditions), then the use of the slow ratio manual rack and pinion gearset 24 results in negligible articulation-induced bumpsteer (max of 0.7°) during ordinary driving conditions (street or mild off-road driving conditions). Also, the manual rack and pinion gearset 24 invokes zero bumpsteer during suspension travel.

This way during ordinary driving conditions, the combined effects of the steering quickener augmented chain and sprocket assembly 11 and slow ratio manual rack and pinion gearset 24 results in a steering system with quick steering response with negligible if any bumpsteer during all phases of operation by the front suspension system.

Conclusion: during ordinary driving conditions, the combined effects of the multiplied force capabilities of the electric motor 17 and electric assist motor box 22, steering quickener augmented chain and sprocket assembly 11, and slow ratio manual rack and pinion gearset 24 result in a steering system comprising effortless and quick steering response with negligible if any bumpsteer during all phases of operation by the front suspension system.

Referring to FIG. 14, there is an illustration of the second particular arrangement of the steering system in U.S. patent application Ser. No. 17/115,573. The steering system includes the ram assist rack and pinion gearset 30, augmented chain and sprocket assembly 11, and associated linkages. The linkages include a coupler shaft 21, steering shaft 23, draglink 25, and tie rod 27. Components of the ram assist rack and pinion gearset 30 include the rack 32, control valve 29, and tie rod bar 31. Secured to the firewall 10 is the augmented chain and sprocket assembly 11, the augmented chain and sprocket assembly 11 being vertically oriented such that the one rounded end is at the top while the second rounded end is at the bottom. The input shaft 15 is directed backward towards the steering wheel and is pivotally connected to the end of the steering column while the output shaft 16 is directed forward towards the front axle 20 and is pivotally connected to the back end of the coupler shaft 21. The front end of the coupler shaft 21 is pivotally connected to the input shaft of the control valve 29. The output shaft of the control valve 29 is pivotally connected to the back end of the steering shaft 23 while the front end of the steering shaft 23 is pivotally connected to the pinion shaft of the ram assist rack and pinion gearset 30.

Cooperation among the augmented chain and sprocket assembly 11, coupler shaft 21, control valve 29, and steering shaft 23 enables steering input to be transmitted from the steering column to the ram assist rack and pinion gearset 30. The ram assist rack and pinion gearset 30 is attached to the front axle 20 between the differential housing and driver side inner-C end forging. The first and second ends of the ram are secured to the one and other ends of the tie rod bar 31, and to the driver and passenger ends of the rack 32, respectively. The mid-point of the tie rod bar 31 is pivotally connected to the first end of the draglink 25 while the second end of the draglink 25 is pivotally connected to the passenger-side steering knuckle 26. The passenger-side steering knuckle 26 is pivotally connected to the first end of the tie rod 27 while the second end of the tie rod 27 is pivotally connected to the driver-side steering knuckle 28. Cooperation among the ram assist rack and pinion gearset 30, draglink 25, and tie rod 27 enables steering input to be transmitted from the ram assist rack and pinion gearset 30 to the driver-side and passenger-side steering knuckles 28 and 26. Transmission of steering input to the driver-side and passenger-side steering knuckles 28 and 26 enable the driver-side and passenger-side steering knuckles 28 and 26 to turn, and thereby turn the vehicle.

The control valve 29 is attached to the inner part of the driver frame side rather than to the ram assist rack and pinion gearset 30. Attachment to the inner part of the driver frame side defines a remote location that removes the hydraulic fluid regulating function of the control valve 29 from the ram assist rack and pinion gearset 30, and isolates the control valve 29 from the adverse conditions experienced by the ram assist rack and pinion gearset 30. The isolation maintains the precise hydraulic fluid regulating function of the control valve 29 during operation of the vehicle over rough terrain. The remote location effectively converts the ram assist rack and pinion gearset 30 into a simple mechanical device that defines a mechanically actuated analog of the full hydraulic steering ram commonly used on front solid axle four wheel drive vehicles.

The ram is activated by hydraulic fluid. Hydraulic fluid flows between the control valve 29 and ram through lines constructed of rigid metal tubing 33 and flexible rubber tubing 34. The control valve 29 regulates the flow of the hydraulic fluid to the ram. The hydraulic fluid generates hydraulic pressure in the ram which defines a hydraulic pressure force of the ram. The hydraulic pressure force is coordinated with the pinion shaft force. Coordination between the hydraulic pressure force and pinion shaft force defines a combined hydraulic pressure force and pinion shaft force, the combined hydraulic pressure force and pinion shaft force referring to a multiplied force. The multiplied force is exerted on the tie rod bar 31, and thereby results in the effortless displacement of the tie rod bar 31. The torque force from the electric motor 17 that is exerted on the output shaft 16 results in effortless rotation of the output shaft 16.

The combined effects of the effortless rotation of the output shaft 16 and effortless displacement of the tie rod bar 31 lead to effortless turning of the front wheels by the steering system comprising the augmented chain and sprocket assembly 11 and ram assist rack and pinion gearset 30. The effortless turning of the front wheels by the steering system comprising the augmented chain and sprocket assembly 11 and ram assist rack and pinion gearset 30 is similar to that by a steering system comprising a hydraulic assist rack and pinion gearset.

The steering quickener effect of the augmented chain and sprocket assembly 11 quickens the slow ratio of the ram assist rack and pinion gearset 30 such that the cooperation between the augmented chain and sprocket assembly 11 and ram assisted rack and pinion gearset 30 provides the steering system with quick steering response, the same quick steering response provided by a steering system with a quick ratio hydraulic assist rack and pinion gearset.

Given that a slow steering ratio results in negligible articulation-induced bumpsteer (max of) 0.7° during ordinary driving conditions (street or mild off-road driving conditions), then the use of the slow ratio ram assist rack and pinion gearset 30 results in negligible articulation-induced bumpsteer (max of 0.7°) during ordinary driving conditions (street or mild off-road driving conditions). Also, the ram assist rack and pinion gearset 30 invokes zero bumpsteer during suspension travel.

This way during ordinary driving conditions, the combined effects of the steering quickener augmented chain and sprocket assembly 11 and slow ratio ram assist rack and pinion gearset 30 results in a steering system with quick steering response with negligible if any bumpsteer during all phases of operation by the front suspension system.

Conclusion: during ordinary driving conditions, the combined effects of the multiplied force capabilities of the electric motor 17 and hydraulic ram, steering quickener augmented chain and sprocket assembly 11, and slow ratio ram assist rack and pinion gearset 30 result in a steering system comprising effortless and quick steering response with negligible if any bumpsteer during all phases of operation by the front suspension system.

The present invention represents an improved version of the steering system disclosed in U.S. patent application Ser. No. 17/115,573. The improvement is based on the utilization of an electric assist steering column, augmented chain and sprocket assembly 63 that lacks an electric motor 17, and hydraulic control valve 62.

For discussion purposes about hydraulic control valves, the following conventions apply: One, the hydraulic fluid circuit in any hydraulic steering system includes both high pressure and low pressure lines. The activation process involves only the high pressure lines while the low pressure lines serve only to complete the circuit by re-circulating the fluid from the gearset back to the control valve. The low pressure lines are ignored in the discussion and illustrations. Two, the hydraulic pump and lines that connect the control valve to the hydraulic pump are not shown. Three, the discussion and illustrations are simple and conceptual, and meant to convey only the principles governing the control valves and not meant as a rigorous, concise explanation of the operation of the control valves.

Referring to FIG. 15, there is an illustration of the electric assist steering column, the electric assist steering column being known in the art. For discussion purposes, the steering wheel 36 is included in the illustration. The electric assist steering column defines a steering column comprised of two parts, a steering column 35 and electric assist motor box 61, the steering column 35 representing an ordinary steering column that is included in the steering system for any vehicle. The electric assist steering column is constructed in a manner such that the front end of the steering column 35 is connected to the input shaft of the electric assist motor box 61 while the back end of the steering column 35 is connected to the steering wheel 36. The electric assist motor box 61 is the same as the electric assist motor box 22; they both act to multiply the rotational torque from steering input.

The fundamental quality of the electric assist steering column is that the rotational torque from the steering input is multiplied at the steering column 35, thereby enabling the multiplied rotational torque to be transmitted to all other components of the steering system. The driver generates steering input by turning the steering wheel 36, the steering input referring to a rotational torque. The rotational torque from the steering input is transmitted from the steering wheel 36 to the steering column 35 and then to the electric assist motor box 61. The electric assist motor box 61 multiplies the rotational torque from the steering input, which is then transmitted from the electric assist motor box 61 to all other components of the steering system. That is, the rotational torque from the steering input is multiplied at the electric assist steering column and then transmitted from the electric assist steering column to all other components of the steering system. Given that the components of the steering system include the electric assist steering column, augmented chain and sprocket assembly 63, and manual rack and pinion gearset 24 or ram assist rack and pinion gearset 30, then the multiplied rotational torque is transmitted downstream in the order: electric assist steering column, augmented chain and sprocket assembly 63, and manual rack and pinion gearset 24 or ram assist rack and pinion gearset 30.

More importantly, since the electric assist motor box 61 is part of the electric assist steering column and multiplies the rotational torque from steering input, by using the electric assist steering column, then any downstream component that multiplies the rotational torque from steering input can be removed from the steering system without interrupting the flow of multiplied rotational torque. Consider the following sequence of three examples:

Example one: in the steering system in U.S. patent application Ser. No. 17/115,573, the rotational torque from the steering input is multiplied by the electric motor 17 in the augmented chain and sprocket assembly 11 and electric assist motor box 22 such that the multiplied rotational torque is transmitted downstream in the order: augmented chain and sprocket assembly 11, electric assist motor box 22, and manual rack and pinion gearset 24 or ram assist rack and pinion gearset 30.

Example two: include the electric assist steering column in the steering system described in example one. The multiplied rotational torque is transmitted downstream in the order: electric assist steering column, augmented chain and sprocket assembly 11, electric assist motor box 22, and manual rack and pinion gearset 24 or ram assist rack and pinion gearset 30.

Example three: remove the electric motor 17 and electric assist motor box 22 from the steering system described in example two. The multiplied rotational torque is transmitted downstream in the order: electric assist steering column, augmented chain and sprocket assembly 63 (11 is converted into 63), and manual rack and pinion gearset 24 or ram assist rack and pinion gearset 30.

Conclusion from the three examples: the use of the electric assist steering column enables the electric motor 17 and electric assist motor box 22 to both be removed from the steering system without interrupting the flow of multiplied rotational torque from the electric assist steering column to the manual rack and pinion gearset 24 or ram assist rack and pinion gearset 30. In short, the use of the electric assist steering column enables the electric motor 17 and electric assist motor box 22 to both be removed from the steering system without interrupting the flow of multiplied rotational torque.

In effect, the steering system disclosed in U.S. patent application Ser. No. 17/115,573 is converted into the present steering system in two steps: Step one, the electric motor 17 is removed from the augmented chain and sprocket assembly 11 thereby converting the augmented chain and sprocket assembly 11 into the augmented chain and sprocket assembly 63. Step two, the electric assist motor box 22 is relocated from the inner part of the driver frame side to the front end of the steering column 35 thereby converting an ordinary steering column 35 into the electric assist steering column. In principle, the present steering system is the same as the steering system disclosed in U.S. patent application Ser. No. 14/115,573 except that the present steering system lacks the electric motor 17 while the steering system disclosed in U.S. patent application Ser. No. 17/115,573 includes the electric motor 17.

Given that the electric motor 17 is a mechanical device that must be purchased and maintained for operational efficiency, then the removal of the electric motor 17 from the augmented chain and sprocket assembly 63 reduces the manufacturing cost, complexity, and maintenance of the augmented chain and sprocket assembly 63 compared to that of the augmented chain and sprocket assembly 11. The augmented chain and sprocket assembly 63 is a simplified version of the augmented chain and sprocket assembly 11.

Since the augmented chain and sprocket assembly 63 is part of the present steering system while the augmented chain and sprocket assembly 11 is part of the steering system disclosed in U.S. patent application Ser. No. 17/115,573, then the simplification of the augmented chain and sprocket assembly 63 compared to the augmented chain and sprocket assembly 11 is translated to the present steering system. The present steering system is a simplified version of the steering system disclosed in U.S. patent application Ser. No. 17/115,573. The manufacturing cost, complexity, and maintenance of the present steering system is less than that of the steering system disclosed in U.S. patent application Ser. No. 17/115,573, thereby indicating that the present steering system is an improved version of the steering system disclosed in U.S. patent application Ser. No. 17/115,573.

Referring to FIG. 16, there is an illustration of the augmented chain and sprocket assembly 63. The augmented chain and sprocket assembly 63 is the same as the augmented chain and sprocket assembly 11 except that the augmented chain and sprocket assembly 63 does not include the electric motor 17 while the augmented chain and sprocket assembly 11 does include the electric motor 17. The augmented chain and sprocket assembly 63 is a steering quickener, and has an input shaft 64 and output shaft 65. The rotational torque from steering input is transmitted from the input shaft 64 to the output shaft 65 such that the rotation of the input shaft 64 causes the output shaft 65 to rotate. The quickening property is called augmentation and results from the output shaft 65 rotating at a faster rate than does the input shaft 64.

The turning of the steering wheel 36 by the driver refers to the turning of the front wheels, and the turning of the front wheels refers to a steering response by the steering system. The faster rotation of the output shaft 65 relative to the input shaft 64 acts to multiply the rotation of the steering wheel 36 by the driver. The multiplication of the rotation of the steering wheel 36 has the effect of reducing the turns that the driver must do to the steering wheel 36 in order to turn the front wheels a given amount—the greater is the multiplication of the rotation of the steering wheel 36, the quicker (faster) the steering input, the less the driver must turn the steering wheel 36 in order to turn the front wheels a given amount, and the quicker the steering response by the steering system. In short, the steering quickener augmented chain and sprocket assembly 63 multiplies the rate at which the driver turns the steering wheel 36, which refers to the multiplication of the rotation of the steering wheel 36 by the driver, which reduces the turns that the driver does to the steering wheel 36 in order to turn the front wheels. The reduction in the turns that the driver does to the steering wheel 36 in order to turn the front wheels serves to quicken the slow steering ratio of the manual rack and pinion gearset 24 or ram assist rack and pinion gearset 30, the quickening of the slow steering ratio of the manual rack and pinion gearset 24 or ram assist rack and pinion gearset 30 gives our steering system a quick steering response.

The multiplied rotation of the steering wheel 36 acts to multiply the rotation of the pinion shaft. The multiplied rotation of the pinion shaft increases the displacement of the rack 32. The increased displacement of the rack 32 leads to a quicker (faster) turn of the front wheels, which has the effect of quickening (speeding up) the slow steering ratio of the manual rack and pinion gearset 24 or ram assist rack and pinion gearset 30. The quickening of the slow steering ratio of the manual rack and pinion gearset 24 or ram assist rack and pinion gearset 30 makes the gearset behave as if it has a quick steering ratio which gives our steering system a quick steering response. The slow steering ratio of the manual rack and pinion gearset 24 or ram assist rack and pinion gearset 30 refers to a slow steering response such that the quickening of the slow steering ratio of the manual rack and pinion gearset 24 or ram assist rack and pinion gearset 30 gives our steering system a quick steering response. In short, the steering quickener augmented chain and sprocket assembly 63 quickens the slow steering ratio of the manual rack and pinion gearset 24 or ram assist rack and pinion gearset 30 and thereby gives our steering system a quick steering response.

The faster rotation of the output shaft 65 relative to the input shaft 64 means that the rotational torque that the input shaft 64 exerts on the output shaft 65 must be multiplied in order to cause the output shaft 65 to rotate. That is, augmentation of the augmented chain and sprocket assembly 63 makes rotation of the output shaft 65 by the input shaft 64 more difficult.

Referring to FIGS. 17, 18, there is an illustration of the simulated rotation of the pinion shaft. Articulation of the front axle 20 refers to the rotation of the front axle 20 about the longitudinal axis at a certain angle θ with the ground A2. The longitudinal axis refers to a line that passes through the middle of the vehicle from the front end to the back end of the vehicle. The front axle 20 can rotate either counterclockwise or clockwise such that the front axle 20 can undergo either counterclockwise or clockwise articulation at a certain angle θ with the ground A2. This way, the counterclockwise articulation of the front axle 20 (FIG. 17) or clockwise articulation of the front axle 20 (FIG. 18) when the driver does not turn the steering wheel 36 causes the rack and pinion gearset A8 to rotate while the pinion shaft A9 does not rotate. The rotation of the rack and pinion gearset A8 while the pinion shaft A9 does not rotate refers to the simulated rotation of the pinion shaft A14. The angle of the simulated rotation of the pinion shaft θ is the same as the counterclockwise or clockwise articulation of the front axle θ. The simulated rotation of the pinion shaft A14 defines a simulated pinion shaft force. The simulated pinion shaft force is exerted on the rack 32 and thereby displaces the rack 32. The displacement of the rack 32 due to the simulated pinion shaft force is an unintended displacement of the rack 32. The unintended displacement of the rack 32 causes an unintended turn of the front wheels. The unintended turn of the front wheels defines bumpsteer. That is, the displacement of the rack 32 due to the simulated pinion shaft force causes an unintended turn of the front wheels, which defines bumpsteer.

During ordinary driving conditions (i.e. street driving or mild off-road driving) of the vehicle, the front axle 20 is able to undergo small articulation. The small articulation of the front axle 20 when the driver does not turn the steering wheel 36 causes the small rotation of the rack and pinion gearset A8 while the pinion shaft A9 does not rotate. The small rotation of the rack and pinion gearset A8 while the pinion shaft A9 does not rotate refers to the small simulated rotation of the pinion shaft A14. The slow steering ratio of the rack and pinion gearset reduces the small simulated rotation of the pinion shaft A14. The reduced small simulated rotation of the pinion shaft A14 refers to a very small simulated rotation of the pinion shaft A14. The very small simulated rotation of the pinion shaft A14 defines a very small simulated pinion shaft force. The very small simulated pinion shaft force is exerted on the rack 32 and thereby causes a very small unintended displacement of the rack 32. The very small unintended displacement of the rack 32 causes a very small unintended turn of the front wheels. The very small unintended turn of the front wheels refers to very small bumpsteer, and very small bumpsteer is negligible bumpsteer.

The rack and pinion gearset A8 refers to the manual rack and pinion gearset 24 or ram assist rack and pinion gearest 30.

Referring to FIG. 19, there is an illustration of the known hydraulic control valve. Known control valves for a hydraulic ram assist rack and pinion gearset include input and output shafts 37, 38, hydraulic fluid, hydraulic fluid ports 39-42, rotary valve 43, and torsion bar 44. The input shaft 37 is connected to the steering wheel while the output shaft 38 is connected to the pinion shaft. The connections involve linkages such as steering shafts depending on the design of the steering system. The connections enable the known control valve to transmit steering input from the steering wheel to the pinion shaft. The ports 39, 40 connect the known control valve to the hydraulic pump while ports 41, 42 connect the known control valve to the hydraulic ram. The known control valve is activated by steering input, i.e. activation occurs only when the driver turns the steering wheel. Upon activation by steering input, the known control valve causes the variance of the hydraulic fluid that passes through the hydraulic ram. The variance creates the hydraulic pressure which defines the hydraulic pressure force in the hydraulic ram, which then displaces the rack. This way, the displacement of the rack due to the hydraulic pressure force occurs simultaneously with the displacement of the rack due to the pinion shaft force. The known hydraulic control valve 29 is constructed in a manner such that the displacement of the rack due to the hydraulic pressure force is the same as that due to the pinion shaft force, thereby indicating that the displacement of the rack due to the hydraulic pressure force is coordinated with that due to the pinion shaft force. The displacement of the rack due to the hydraulic pressure force is coordinated with the intended displacement of the rack. The coordinated displacements of the rack indicate that the hydraulic pressure force is coordinated with the pinion shaft force, coordination between the hydraulic pressure force and pinion shaft force indicates that the hydraulic pressure force combines with the pinion shaft force to define a single combined force. The combined force is exerted on the rack which effortlessly displaces the rack. The rack is connected to the driver-side and passenger-side steering knuckles such that the rack exerts the combined force on the driver-side and passenger-side steering knuckles, which effortlessly turns the driver-side and passenger-side steering knuckles and thereby effortlessly turns the front wheels (not shown).

The activation of the known control valve occurring only when the driver turns the steering wheel indicates that the displacement of the rack due to the hydraulic pressure force is coordinated with displacement of the rack due to the pinion shaft force only and is not coordinated with the displacement of the rack due to the simulated pinion shaft force. In short, the known control valve is not coordinated with the simulated pinion shaft force. During articulation of the front axle when the driver does not turn the steering wheel, the known control valve will not be activated to displace the rack while the simulated pinion shaft force will act to displace the rack. This non-coordination of the displacement of the rack between the hydraulic pressure force and simulated pinion shaft force will prematurely wear out or destroy a hydraulic power assist rack and pinion gearset depending on the design of the gearset.

Referring to FIG. 20, there is an illustration of our hydraulic control valve 62. Our control valve 62 includes the wires 59 and 60, hydraulic fluid, hydraulic fluid ports 39-42, solenoid coil 53, plunger 54, and electronic control module (ECM) 55, but does not include the input and output shafts 37, 38. The wire 59 connects our control valve 62 to an electronic sensor (not shown). The ports 39-40 connect our control valve 62 to the hydraulic pump while ports 41, 42 connect our control valve 62 to the hydraulic ram. In particular, our control valve 62 lacks input and output shafts 37, 38 because there is no need for them. Our control valve 62 is not activated by steering input, thus there is no need to transmit steering input through our control valve 62 via the input and output shafts 37, 38. Instead, our control valve 62 is activated by the displacement of the rack 32, the rack 32 is displaced by the pinion shaft force or simulated pinion shaft force. Upon activation by the displacement of the rack 32, our control valve 62 causes the variance of the hydraulic fluid that passes through the hydraulic ram. The variance creates the hydraulic pressure which defines the hydraulic pressure force in the hydraulic ram, which then displaces the rack 32. Displacement of the rack 32 by the hydraulic pressure force occurs when the rack 32 is simultaneously displaced by either the pinion shaft force or simulated pinion shaft force. In short, the displacement of the rack 32 due to either the pinion shaft force or simulated pinion shaft force activates our control valve 62, which generates a hydraulic pressure force in the ram, which then simultaneously displaces the rack 32. The hydraulic control valve 62 is constructed in a manner such that the displacement of the rack 32 due to the hydraulic pressure force is the same as that due to the pinion shaft force or simulated pinion shaft force, thereby indicating that the displacement of the rack 32 due to the hydraulic pressure force is coordinated with that due to the pinion shaft force or simulated pinion shaft force. The displacement of the rack 32 due to the hydraulic pressure force is coordinated with the intended or unintended displacement of the rack 32. The coordinated displacements of the rack 32 indicate that the hydraulic pressure force is coordinated with the pinion shaft force or simulated pinion shaft force, coordination between the hydraulic pressure force and pinion shaft force or simulated pinion shaft force indicates that the hydraulic pressure force combines with the pinion shaft force or simulated pinion shaft force to define a single combined force.

The combined hydraulic pressure force and pinion shaft force define a combined one force which is exerted on the rack 32 and thereby effortlessly displaces the rack 32. The rack 32 is connected to the tie rod bar 31 such that the rack 32 exerts the combined one force on the tie rod bar 31 and thereby effortlessly displaces the tie rod bar 31. The tie rod bar 31 is connected to the driver-side and passenger-side steering knuckles 28 and 26 such that the tie rod bar exerts the combined one force on the driver-side and passenger-side steering knuckles 28 and 26, which effortlessly turns the driver-side and passenger-side steering knuckles 28 and 26 and thereby effortlessly turns the front wheels.

The combined hydraulic pressure force and simulated pinion shaft force define a combined two force which is exerted on the rack 32 and thereby unintentionally displaces the rack 32. The rack 32 is connected to the tie rod bar 31 such that the rack 32 exerts the combined two force on the tie rod bar 31 and thereby unintentionally displaces the tie rod bar 31. The tie rod bar 31 is connected to the driver-side and passenger-side steering knuckles 28 and 26 such that the tie rod bar exerts the combined two force on the driver-side and passenger-side steering knuckles 28 and 26, which unintentionally turns the driver-side and passenger-side steering knuckles 28 and 26 and thereby unintentionally turns the front wheels. The unintentional turn of the front wheels refers to bumpsteer.

The activation of our control valve 62 occurring when the rack 32 is displaced due to the simulated pinion shaft force indicates that the displacement of the rack 32 due to the hydraulic pressure force is coordinated with unintentional displacement of the rack 32 due to the simulated pinion shaft force. In short, our control valve 62 is coordinated with the simulated pinion shaft force. During articulation of the front axle 20 when the steering wheel 36 is not turned our control valve 62 is activated to displace the rack 32 such that our ram assist rack and pinion gearset 30 operates as designed without any possibility of wearing out prematurely or self-destructing.

Referring to FIGS. 21, 22, there are illustrations of the rotary valve-torsion bar mechanism for the known hydraulic control valve. The activation of the known hydraulic control valve involves a mechanism called the rotary valve-torsion bar mechanism. The known control valve is a rectangular shaped housing with an inner chamber 45. The inner chamber 45 has the shape of a cylinder. The inner chamber 45 contains the rotary valve 43 and torsion bar 44. The hydraulic fluid ports 39-42 are access points in which hydraulic fluid is able to flow into or out of the known control valve. The ports 39-42 are connected to the hydraulic pump and hydraulic ram with lines, the line can be rigid metal tubing or flexible rubber tubing. The rotary valve 43 has the shape of a cylinder that is larger than the torsion bar 44. The torsion bar 44 has the shape of a rod and is attached to the rotary valve 43. The attachment positions the torsion bar 44 along the central axis of the rotary valve 43. The ends of the torsion bar 44 extend beyond the rotary valve 43 and are rotationally affixed to the top and bottom of the inner chamber 45. One end of the torsion bar 44 is connected to the input shaft 37 while the other end is connected to the output shaft 38. Steering input causes the torsion bar 44 to rotate, then the torsion bar 44 transmits the steering rotational torque force to the pinion shaft. The torsion bar 44 serves as the axis of rotation for the rotary valve 43 such that the rotary valve 43 is able to rotate within the inner chamber 45. The diameter of the rotary valve 43 is slightly smaller than the diameter of the inner chamber 45 which enables the rotary valve 43 and torsion bar 44 to easily rotate within the inner chamber 45. The rotary valve 43 has holes 46-49 and channels 50, 51 such that holes 46, 48 are connected by channel 50 while holes 47, 49 are connected by channel 51. The diameter of each hole $1_d$ is equivalent to the diameter of each port $2_d$. Each hole 46-49 is surrounded by an O-ring 52 which prevents hydraulic fluid from leaking between the rotary valve 43 and inner chamber 45.

Hydraulic fluid is able to flow through the two holes and channel. The rotary valve 43 is positioned next to the ports such that a hole is able to be aligned with a port. When the hole is aligned with the port hydraulic fluid is able to pass from the port into the hole and flow through the channel.

During rotation of the rotary valve 43, the two holes that are connected by a channel are able to be aligned with two ports, one port is connected to the pump with one line while the other port is connected to an end of the ram with another line. The alignment between the two holes and two ports enables hydraulic fluid to flow from the pump into the one port, into the one hole through the channel and out of the other hole, out of the other port, and into an end of the ram. The hydraulic fluid flow defines the hydraulic fluid variance that creates the hydraulic pressure which defines the hydraulic pressure force in an end of the ram and thereby displaces the rack. The extent that the hole aligns with the port varies in proportion to the rotation of the rotary valve 43. The alignment variance controls the hydraulic fluid flow rate such that the flow rate is proportional to the displacement of the rack due to the pinion shaft force. The flow rate controls the hydraulic pressure force such that the displacement of the rack due to the hydraulic pressure force is proportional to the displacement of the rack due to the pinion shaft force. The proportional displacements indicate that the displacement of the rack due to the hydraulic pressure force is coordinated with the displacement of the rack due to the pinion shaft force, the hydraulic pressure force is coordinated with the pinion shaft force, and the hydraulic pressure force combines with the pinion shaft force. The combined hydraulic pressure force and pinion shaft force define a single combined force that is exerted on the rack which effortlessly displaces the rack. The rack is connected to the driver-side and passenger-side steering knuckles such that the rack exerts the combined force on the driver-side and passenger-side steering knuckles, which effortlessly turns the driver-side and passenger-side steering knuckles and thereby effortlessly turns the front wheels.

During a right turn, steering input causes the torsion bar 44 to rotate in one direction, e.g. counterclockwise, thereby causing the rotary valve 43 to also rotate counterclockwise. The counterclockwise rotation of the torsion bar causes the pinion shaft to rotate counterclockwise. The counterclockwise rotation of the pinion shaft exerts a pinion shaft force on the rack that displaces the rack to the right. The counterclockwise rotation of the rotary valve 43 serves to align the holes 46, 48 with ports 39, 41. Hydraulic fluid flows from the pump into port 39, through the holes 46, 48 and channel 50, out of port 41, and into the first end of the ram. The flow generates the hydraulic pressure which defines the hydraulic pressure force in the first end of the ram. The hydraulic pressure force in the first end of the ram displaces the rack to the right. The right displacement of the rack due to the hydraulic pressure force is coordinated with the right displacement of the rack due to the pinion shaft force thereby indicating that the hydraulic pressure force is coordinated with the pinion shaft force such that the hydraulic pressure force combines with the pinion shaft force. The combined force is exerted on the rack which effortlessly displaces the rack to the right, and thereby forces the driver-side and passenger-side steering knuckles to effortlessly turn to the right. The effortless right turn of the driver-side and passenger-side steering knuckles makes the front wheels effortlessly turn to the right.

During a left turn, steering input causes the torsion bar 44 to rotate in one direction, e.g. clockwise, thereby causing the rotary valve 43 to also rotate clockwise. The clockwise rotation of the torsion bar causes the pinion shaft to rotate clockwise. The clockwise rotation of the pinion shaft exerts a pinion shaft force on the rack which displaces the rack to the left. The clockwise rotation of the rotary valve 43 serves to align the holes 47, 49 with ports 40, 42. Hydraulic fluid flows from the pump into port 40, through the holes 47, 49 and channel 51, out of port 42, and into the second end of the ram. The flow generates the hydraulic pressure which defines the hydraulic pressure force in the second end of the ram. The hydraulic pressure force in the second end of the ram displaces the rack to the left. The left displacement of the rack due to the hydraulic pressure force is coordinated with the left displacement of the rack due to the pinion shaft force thereby indicating that the hydraulic pressure force is coordinated with the pinion shaft force such that the hydraulic pressure force combines with the pinion shaft force. The combined force is exerted on the rack which effortlessly displaces the rack to the left, and thereby forces the driver-side and passenger-side steering knuckles to effortlessly turn to the left. The effortless left turn of the driver-side and passenger-side steering knuckles makes the front wheels effortlessly turn to the left.

Referring to FIGS. 23, 24, there are illustrations of the solenoid valve-plunger mechanism for our hydraulic control valve 62. The activation of our hydraulic control valve 62 involves a mechanism called the solenoid valve-plunger mechanism; the mechanism paralleling a type used in some aircraft. The control valve 62 is a rectangular shaped housing with an inner chamber 56. The inner chamber 56 has the shape of a cylinder with smaller diameter top and bottom sections and a larger diameter middle section. The inner chamber 56 contains the solenoid coil 53 and plunger 54 with the solenoid coil 53 located in the middle section. Like the known control valve, the hydraulic fluid ports 39-42 are access points in which hydraulic fluid is able to flow into or out of the control valve 62. The ports 39-42 are connected to the hydraulic pump and hydraulic ram with lines, the line can be rigid metal tubing 33 or flexible rubber tubing 34. The solenoid coil 53 is a coil of wire that is coiled up into the shape of a cylinder. The plunger 54 is a magnetically sensitive steel rod with two grooves 57, 58 machined about the plunger's circumference. One groove is the upper groove 57 while the other groove is the lower groove 58. The machining about the plunger's circumference gives each groove 57, 58 a circular U-shape. The U-shape comprises two straight open sides and a closed curved side. The two straight open sides are separated by a distance such that the distance refers to a diameter for the groove $3_d$. The diameter for the groove $3_d$ is equivalent to the diameter of each port $2_d$. The diameter of the plunger 54 is slightly smaller than the diameters of both the top and bottom sections of the inner chamber 56 and solenoid coil 53 such that the plunger 54 is able to be located within both the top and bottom sections of the inner chamber 56 and solenoid coil 53. The ends of the plunger 54 extend beyond the solenoid coil 53 and into the top and bottom sections of the inner chamber 56. The slight difference between the diameters of the plunger 54 and both the top and bottom sections of the inner chamber 56 and solenoid coil 53 enables the plunger 54 to easily slide within both the top and bottom sections of the inner chamber 56 and solenoid coil 53. Each groove 57, 58 is bordered by O-rings 52 which prevents hydraulic fluid from leaking between the plunger 54 and top and bottom sections of the inner chamber 56. The ECM 55 is connected with the wire 59 to an electronic sensor (not shown) that is located in the ram assist rack and pinion gearset 30. The electronic sensor detects the displacement of the rack 32 due to the pinion shaft force or simulated pinion shaft force. Upon detection, the electronic sensor sends an electronic signal to the ECM 55. The ECM 55 transforms the signal into a "positive or negative" electric current. The ECM 55 is connected to the solenoid coil 53 with wires 60 such that the current passes through the solenoid coil 53. The current creates a magnetic field in the solenoid coil 53. The magnetic field defines a magnetic force which is exerted on the plunger 54 thereby causing the plunger 54 to slide within both the top and bottom sections of the inner chamber 56 and solenoid coil 53. The ECM 55 adjusts the strength of the current in proportion to the displacement of the rack 32 due to the pinion shaft force or simulated pinion shaft force. The magnetic field is proportional to the strength of the current such that the plunger 54 slides in proportion to the strength of the current.

Hydraulic fluid is able to flow through the groove in the plunger 54. The plunger 54 is positioned next to the ports such that the groove is able to be aligned with the port. When the groove is aligned with the port hydraulic fluid is able to pass from the port and through the groove. The circular shape of the groove enables the groove to remain aligned with the port regardless of the rotational disposition of the plunger 54. During the sliding of the plunger 54, the groove is able to be aligned with two ports, one port is connected to the pump with one line while the other port is connected to an end of the ram with another line. The alignment between the groove and two ports enables hydraulic fluid to flow from the pump into the one port, through the groove, out of the other port, and into an end of the ram. The hydraulic fluid flow defines the hydraulic fluid variance that creates the hydraulic pressure which defines the hydraulic pressure force in an end of the ram and thereby displaces the rack 32. The extent that the groove aligns with the two ports varies in proportion to the strength of the current. The alignment variance controls the hydraulic fluid flow rate such that the flow rate is proportional to the displacement of the rack 32 due to the pinion shaft force or simulated pinion shaft force. The flow rate controls the hydraulic pressure force such that the displacement of the rack 32 due to the hydraulic pressure force is proportional to the displacement of the rack 32 due to the pinion shaft force or simulated pinion shaft force. The proportional displacements indicate that the displacement of the rack 32 due to the hydraulic pressure force is coordinated with the displacement of the rack 32 due to the pinion shaft force or simulated pinion shaft force, the hydraulic pressure force is coordinated with the pinion shaft force or simulated pinion shaft force, and the hydraulic pressure force combines with the pinion shaft force or simulated pinion shaft force.

The combined hydraulic pressure force and pinion shaft force define the combined one force that is exerted on the rack 32 which effortlessly displaces the rack 32. The rack 32 is connected to the tie rod bar 31 and the tie rod bar 31 is connected to the driver-side and passenger-side steering knuckles 28 and 26 such that the rack 32 exerts the combined one force on the tie rod bar 31 and the tie rod bar 31 exerts the combined one force on the driver-side and passenger-side steering knuckles 28 and 26, which effortlessly turns the driver-side and passenger-side steering knuckles 28 and 26 and thereby effortlessly turns the front wheels.

The combined hydraulic pressure force and simulated pinion shaft force define the combined two force that is exerted on the rack 32 which unintentionally displaces the rack 32. The rack 32 is connected to the tie rod bar 31 and the tie rod bar 31 is connected to the driver-side and passenger-side steering knuckles 28 and 26 such that the rack 32 exerts the combined two force on the tie rod bar 31 and the tie rod bar 31 exerts the combined two force on the driver-side and passenger-side steering knuckles 28 and 26, which unintentionally turns the driver-side and passenger-side steering knuckles 28 and 26 and thereby unintentionally turns the front wheels.

During a right turn, steering input causes the pinion shaft to rotate in one direction, e.g. counterclockwise. The counterclockwise rotation of the pinion shaft defines the pinion shaft force, the pinion shaft force is exerted on the rack 32 which displaces the rack 32 to the right. Also, the counterclockwise articulation of the front axle 20 when the driver does not turn the steering wheel 36 causes a simulated rotation of the pinion shaft in one direction, e.g. counterclockwise. The counterclockwise simulated rotation of the pinion shaft defines the simulated pinion shaft force, the simulated pinion shaft force is exerted on the rack 32 which unintentionally displaces the rack 32 to the right. In either case the right displacement of the rack 32 is detected by the electronic sensor which signals the ECM 55. The ECM 55 transforms the signal into e.g. a "positive" current. The "positive" current creates a magnetic field within the solenoid coil 53 that forces the plunger 54 to slide in one direction, e.g. up. The upward slide of the plunger 54 serves to align the upper groove 57 with ports 39, 41. Hydraulic fluid flows from the pump into port 39, through the upper groove 57, out of port 41, and into the first end of the ram. The flow generates the hydraulic pressure which defines the hydraulic pressure force in the first end of the ram. The hydraulic pressure force in the first end of the ram displaces the rack 32 to the right. The right displacement of the rack 32 due to the hydraulic pressure force is coordinated with the right displacement of the rack 32 due to the pinion shaft force or simulated pinion shaft force thereby indicating that the hydraulic pressure force is coordinated with the pinion shaft force or simulated pinion shaft force such that the hydraulic pressure force combines with the pinion shaft force or simulated pinion shaft force, respectively.

The combined hydraulic pressure force and pinion shaft force define the combined one force. The combined one force is exerted on the rack 32 and the rack 32 exerts the combined one force on the tie rod bar 31, the tie rod bar 31 exerts the combined one force on the driver-side and passenger-side steering knuckles 28 and 26 which effortlessly turns the driver-side and passenger-side steering knuckles 28 and 26 to the right, the effortless right turn of the driver-side and passenger-side steering knuckles 28 and 26 makes the front wheels effortlessly turn to the right.

The combined hydraulic pressure force and simulated pinion shaft force define the combined two force. The combined two force is exerted on the rack 32 and the rack 32 exerts the combined two force on the tie rod bar 31, the tie rod bar 31 exerts the combined two force on the driver-side and passenger-side steering knuckles 28 and 26 which unintentionally turns the driver-side and passenger-side steering knuckles 28 and 26 to the right, the unintentional right turn of the driver-side and passenger-side steering knuckles 28 and 26 makes the front wheels unintentionally turn to the right.

During a left turn, steering input causes the pinion shaft to rotate in one direction, e.g. clockwise. The clockwise rotation of the pinion shaft defines the pinion shaft force, the pinion shaft force is exerted on the rack 32 which displaces the rack 32 to the left. Also, the clockwise articulation of the front axle 20 when the driver does not turn the steering wheel 36 causes a simulated rotation of the pinion shaft in one direction, e.g. clockwise. The clockwise simulated rotation of the pinion shaft defines the simulated pinion shaft force, the simulated pinion shaft force is exerted on the rack 32 which unintentionally displaces the rack 32 to the left. In either case the left displacement of the rack 32 is detected by the electronic sensor which signals the ECM 55. The ECM 55 transforms the signal into e.g. a "negative" current. The "negative" current creates a magnetic field within the solenoid coil 53 that forces the plunger 54 to slide in one direction, e.g. down. The downward slide of the plunger 54 serves to align the lower groove 58 with ports 40, 42. Hydraulic fluid flows from the pump into port 40, through the lower groove 58, out of port 42, and into the second end of the ram. The flow generates the hydraulic pressure which defines the hydraulic pressure force in the second end of the ram. The hydraulic pressure force in the second end of the ram displaces the rack 32 to the left. The left displacement of the rack 32 due to the hydraulic pressure force is coordinated with the left displacement of the rack 32 due to the pinion shaft force or simulated pinion shaft force thereby indicating that the hydraulic pressure force is coordinated with the pinion shaft force or simulated pinion shaft force such that the hydraulic pressure force combines with the pinion shaft force or simulated pinion shaft force, respectively.

The combined hydraulic pressure force and pinion shaft force define the combined one force. The combined one force is exerted on the rack 32 and the rack 32 exerts the combined one force on the tie rod bar 31, the tie rod bar 31 exerts the combined one force on the driver-side and passenger-side steering knuckles 28 and 26 which effortlessly turns the driver-side and passenger-side steering knuckles 28 and 26 to the left, the effortless left turn of the driver-side and passenger-side steering knuckles 28 and 26 makes the front wheels effortlessly turn to the left.

The combined hydraulic pressure force and simulated pinion shaft force define the combined two force. The combined two force is exerted on the rack 32 and the rack 32 exerts the combined two force on the tie rod bar 31, the tie rod bar 31 exerts the combined two force on the driver-side and passenger-side steering knuckles 28 and 26 which unintentionally turns the driver-side and passenger-side steering knuckles 28 and 26 to the left, the unintentional left turn of the driver-side and passenger-side steering knuckles 28 and 26 makes the front wheels unintentionally turn to the left.

Referring to FIG. 23, there is an illustration of the solenoid valve-plunger mechanism, which includes the ECM 55. The ECM 55 is able to adjust the strength of the electric current that passes through the solenoid coil 53, and thereby the strength of the magnetic field. The adjustment of the magnetic field strength by the ECM 55 governs the amount that the plunger 54 slides within the solenoid coil 53, which controls the fluid variance and thereby the hydraulic pressure force exerted by the ram. In effect the ECM 55 adjusts the strength of the electric current in order to control the hydraulic pressure force that the ram exerts on the rack 32 then steering knuckles in order to turn the front wheels. The ECM is able to adjust the current to a great or small strength.

The displacement of the rack 32 due to the hydraulic pressure force causes the turning of the front wheels such that the ease of turning the front wheels is proportional to the hydraulic pressure force that is exerted on the rack 32.

The great strength of the current by the ECM 55 refers to the exertion of a great hydraulic pressure force on the rack 32, the exertion of the great hydraulic pressure force on the rack 32 causes an easy displacement of the rack 32, and the easy displacement of the rack 32 causes an easy turning of the front wheels. In short the exertion of the great hydraulic pressure force on the rack 32 causes the easy turning of the front wheels.

The small strength of the current by the ECM 55 refers to the exertion of a small hydraulic pressure force on the rack 32, the exertion of the small hydraulic pressure force on the rack 32 causes an uneasy displacement of the rack 32, and the uneasy displacement of the rack 32 causes an uneasy turning of the front wheels. In short the exertion of the small hydraulic pressure force on the rack 32 causes the uneasy turning of the front wheels.

The turning the steering wheel 36 by the driver refers to the turning of the front wheels, the turning of the front wheels refers to a steering response by the steering system, the steering system is able to have a light or heavy steering response, and the lightness of the steering response by the steering system refers to an ease of turning the steering wheel 36.

The exertion of the great hydraulic pressure force on the rack 32 causes the easy turning of the front wheels, the easy turning of the front wheels refers to a light turning of the steering wheel 36 and thereby the light steering response. In short the exertion of the great hydraulic pressure force on the rack 32 causes the easy turning of the front wheels, which refers to the light turning of the steering wheel 36 and thereby the light steering response.

The exertion of the small hydraulic pressure force on the rack 32 causes the uneasy turning of the front wheels, the uneasy turning of the front wheels refers to a heavy turning of the steering wheel 36 and thereby the heavy steering response. In short the exertion of the small hydraulic pressure force on the rack 32 causes the uneasy turning of the front wheels, which refers to the heavy turning of the steering wheel 36 and thereby the heavy steering response.

The rotational torque due to steering input is defined by the muscular exertion that the driver puts on the steering wheel 36 in order to turn the steering wheel 36, the muscular exertion that the driver puts on the steering wheel 36 in order to turn the steering wheel 36 defines the effort that the driver exerts on the steering wheel 36 in order to turn the steering wheel 36, the effort that the driver exerts on the steering wheel 36 in order to turn the steering wheel 36 refers to the ease of turning the steering wheel 36.

The ECM 55 is programmable. The ECM 55 is able to be uploaded with variable steering response software. The variable steering response software instructs the ECM 55 to generate a great hydraulic pressure force at slow speeds thereby giving a light steering response, and to generate a small hydraulic pressure force at high speeds thereby giving a heavy steering response—the greater the hydraulic pressure force, the easier to turn the steering wheel and vehicle, and the lighter the steering response. At slow speeds, light steering is beneficial because it enables the driver to easily turn the vehicle when parking or making sharp turns. At high speeds, light steering is problematic because it removes feedback and the driver tends to oversteer the vehicle. Instead at high speeds, heavy steering is beneficial because it maintains feedback and gives the driver greater control of the vehicle. The lightness or ease of turning the steering wheel is referred to as feedback. Feedback is reflected in the driver's ability to sense the amount of front wheel adhesion with the road and direction of the front wheels. Feedback gives the driver an understanding of the relationship between the front wheels and road, and thereby enables the driver to control the vehicle, especially during turns. The variable steering response software can be written such that the ECM 55 yields the type of feedback that the driver prefers.

Referring to FIG. 25, there is an illustration of the first particular arrangement of the steering system in the present invention. The steering system includes the manual rack and pinion gearset 24, augmented chain and sprocket assembly 63, electric assist steering column, and associated linkages. The linkages include the steering shaft 23, draglink 25, and tie rod 27. The front end of the steering column 35 is connected to the input shaft of the electric assist motor box 61 while the back end of the steering column 35 is connected to the steering wheel 36. Secured to the back-side of the firewall 10 is the electric assist motor box 61, the electric assist motor box 61 being oriented such that the output shaft of the electric assist motor box 61 is aligned with the input shaft 64. Secured to the front-side of the firewall 10 is the augmented chain and sprocket assembly 63, the augmented chain and sprocket assembly 63 being vertically oriented such that the one rounded end is at the top while the second rounded end is at the bottom. The input shaft 64 is directed backward towards the electric assist motor box 61 and is pivotally connected to the output shaft of the electric assist motor box 61 while the output shaft 65 is directed forward towards the front axle 20 and is pivotally connected to the back end of the steering shaft 23. The front end of the steering shaft 23 is pivotally connected to the pinion shaft of the manual rack and pinion gearset 24.

Cooperation among the electric assist motor box 61, augmented chain and sprocket assembly 63, and steering shaft 23 enables steering input to be transmitted from the steering column 35 to the manual rack and pinion gearset 24. The manual rack and pinion gearset 24 is attached to the front axle 20 between the differential housing and driver side inner-C end forging. The end of the rack is pivotally connected to the first end of the draglink 25 while the second end of the draglink 25 is pivotally connected to the passenger-side steering knuckle 26. The passenger-side steering knuckle 26 is pivotally connected to the first end of the tie rod 27 while the second end of the tie rod 27 is pivotally connected to the driver-side steering knuckle 28. Cooperation among the manual rack and pinion gearset 24, draglink 25, and tie rod 27 enables steering input to be transmitted from the manual rack and pinion gearset 24 to the driver-side and passenger-side steering knuckles 28 and 26. Transmission of steering input to the driver-side and passenger-side steering knuckles 28 and 26 enables the driver-side and passenger-side steering knuckles 28 and 26 to turn, and thereby turn the front wheels.

The electric assist motor box 61 multiplies the rotational torque from the steering input supplied by the driver. The rotational torque is multiplied at the steering column 35 such that the multiplied rotational torque is transmitted from the electric assist motor box 61 to the augmented chain and sprocket assembly 63, and from the augmented chain and sprocket assembly 63 to the manual rack and pinion gearset 24. This way, the multiplied rotational torque is transmitted from the electric assist motor box 61 to the input shaft 64, from the input shaft 64 to the output shaft 65, and from the output shaft 65 to the pinion shaft; specifically, the multiplied rotational torque is exerted on the output shaft 65 and on the pinion shaft. The multiplied rotational torque that is exerted on the output shaft 65 results in effortless rotation of the output shaft 65. The effortless rotation of the output shaft 65 makes the turning of the steering wheel 36 by the driver effortless. The multiplied rotational torque that is exerted on the pinion shaft refers to a multiplied pinion shaft force, which is exerted on the rack by the pinion shaft during the meshing process. The rack exerts the multiplied pinion shaft force on the driver-side and passenger-side steering knuckles 28 and 26. The multiplied pinion shaft force that is exerted on the driver-side and passenger-side steering knuckles 28 and 26 makes the turning of the driver-side and passenger-side steering knuckles 28 and 26 effortless and thereby the turning of the front wheels effortless.

The combination of the effortless turning of the steering wheel 36 by the driver and effortless turning of the front wheels defines the steering system comprising the electric assist steering column, augmented chain and sprocket assembly 63, and manual rack and pinion gearset 24 as an effortless steering system. The steering quickener augmented chain and sprocket assembly 63 quickens the slow steering ratio of the manual rack and pinion gearset 24 such that the combined effects of the steering quickener augmented chain and sprocket assembly 63 and slow ratio manual rack and pinion gearset 24 results in a steering system with quick steering response with negligible if any bumpsteer during all phases of operation by the front suspension system during ordinary driving conditions. The cooperative operation between the steering quickener augmented chain and sprocket assembly 63 and slow ratio manual rack and pinion gearset 24 defines our integrated steering quickener-slow steering ratio design and refers to the effortless, quick turning, and negligible bumpsteer operation of the steering system comprising the electric assist steering column, augmented chain and sprocket assembly 63, and manual rack and pinion gearset 24, which define it as an effortless steering system with quick steering response and negligible bumpsteer.

Referring to FIG. 26, there is an illustration of the second particular arrangement of the steering system in the present invention. The steering system includes the ram assist rack and pinion gearset 30, augmented chain and sprocket assembly 63, electric assist steering column, hydraulic control valve 62, and associated linkages. The linkages include a steering shaft 23, draglink 25, and tie rod 27. Components of the ram assist rack and pinion gearset 30 include the rack 32 and tie rod bar 31. The front end of the steering column 35 is connected to the input shaft of the electric assist motor box 61 while the back end of the steering column 35 is connected to the steering wheel 36. Secured to the back-side of the firewall 10 is the electric assist motor box 61, the electric assist motor box 61 being oriented such that the output shaft of the electric assist motor box 61 is aligned with the input shaft 64. Secured to the front-side of the firewall 10 is the augmented chain and sprocket assembly 63, the augmented chain and sprocket assembly 63 being vertically oriented such that the one rounded end is at the top while the second rounded end is at the bottom. The input shaft 64 is directed backward towards the electric assist motor box 61 and is pivotally connected to the output shaft of the electric assist motor box 61. The output shaft 65 is directed forward towards the front axle 20 and is pivotally connected to the back end of the steering shaft 23 while the front end of the steering shaft 23 is pivotally connected to the pinion shaft of the ram assist rack and pinion gearset 30.

Cooperation among the electric assist motor box 61, augmented chain and sprocket assembly 63, and steering shaft 23 enables steering input to be transmitted from the steering column 35 to the ram assist rack and pinion gearset 30. The ram assist rack and pinion gearset 30 is attached to the front axle 20 between the differential housing and driver side inner-C end forging. The first and second ends of the ram are secured to the one and other ends of the tie rod bar 31, and to the driver and passenger ends of the rack 32, respectively. The mid-point of the tie rod bar 31 is pivotally connected to the first end of the draglink 25 while the second end of the draglink 25 is pivotally connected to the passenger-side steering knuckle 26. The passenger-side steering knuckle 26 is pivotally connected to the first end of the tie rod 27 while the second end of the tie rod 27 is pivotally connected to the driver-side steering knuckle 28. Cooperation among the ram assist rack and pinion gearset 30, draglink 25, and tie rod 27 enables steering input to be transmitted from the ram assist rack and pinion gearset 30 to the driver-side and passenger-side steering knuckles 28 and 26. Transmission of steering input to the driver-side and passenger-side steering knuckles 28 and 26 enable the driver-side and passenger-side steering knuckles 28 and 26 to turn, and thereby turn the front wheels.

The rotational torque from the steering input that is exerted on the pinion shaft refers to a pinion shaft force, which is exerted on the rack by the pinion shaft during the meshing process. The pinion shaft force that is exerted on the rack results in displacement of the rack.

The electric assist motor box 61 multiplies the rotational torque from the steering input at the steering column 35. Then the multiplied rotational torque is transmitted from the electric assist motor box 61 to the augmented chain and sprocket assembly 63, and from the augmented chain and sprocket assembly 63 to the ram assist rack and pinion gearset 30. This way, the multiplied rotational torque is transmitted from the electric assist motor box 61 to the input shaft 64, from the input shaft 64 to the output shaft 65, and from the output shaft 65 to the pinion shaft; specifically, the multiplied rotational torque is exerted on the output shaft 65. The multiplied rotational torque that is exerted on the output shaft 65 results in effortless rotation of the output shaft 65. The effortless rotation of the output shaft 65 makes the turning of the steering wheel 36 by the driver effortless.

The control valve 62 is attached to the inner part of the driver frame side rather than to the ram assist rack and pinion gearset 30. The control valve 62 regulates the flow of the hydraulic fluid to the ram. Hydraulic fluid flows between the control valve 62 and ram through lines constructed of rigid metal tubing 33 and flexible rubber tubing 34. The hydraulic fluid generates hydraulic pressure which defines a hydraulic pressure force in the ram. The hydraulic pressure force is exerted on the rack 32, which displaces the rack 32. The hydraulic fluid regulating function in the control valve 62 is coordinated with the displacement of the rack 32 due to the pinion shaft force, which indicates that the hydraulic pressure force is coordinated with the pinion shaft force. Coordination between the hydraulic pressure force and pinion shaft force defines a combined hydraulic pressure force and pinion shaft force that is exerted on the rack 32. The combined hydraulic pressure force and pinion shaft force that is exerted on the rack 32 is also exerted on the tie rod bar 31. The combined hydraulic pressure force and pinion shaft force that is exerted on the tie rod bar 31 refer to the combined one force that is exerted on the tie rod bar 31. The tie rod bar 31 exerts the combined one force on the driver-side and passenger-side steering knuckles 28 and 26. The combined one force that is exerted on the driver-side and passenger-side steering knuckles 28 and 26 makes the turning of the driver-side and passenger-side steering knuckles 28 and 26 effortless and thereby the turning of the front wheels effortless.

The combination of the effortless turning of the steering wheel 36 by the driver and effortless turning of the front wheels defines the steering system comprising the electric assist steering column, augmented chain and sprocket assembly 63, and ram assist rack and pinion gearset 30 as an effortless steering system. The steering quickener augmented chain and sprocket assembly 63 quickens the slow steering ratio of the ram assist rack and pinion gearset 30 such that the combined effects of the steering quickener augmented chain and sprocket assembly 63 and slow ratio ram assist rack and pinion gearset 30 results in a steering system with quick steering response with negligible if any bumpsteer during all phases of operation by the front suspension system during ordinary driving conditions. The cooperative operation between the steering quickener augmented chain and sprocket assembly 63 and slow ratio ram assist rack and pinion gearset 30 defines our integrated steering quickener-slow steering ratio design and refers to the effortless, quick turning, and negligible bumpsteer operation of the steering system comprising the electric assist steering column, augmented chain and sprocket assembly 63, and ram assist rack and pinion gearset 30, which define it as an effortless steering system with quick steering response and negligible bumpsteer.

While the invention has been illustrated and described as embodied in a vehicle steering system, it is not intended to be limited to the details shown, since it will be understood that various omissions, modifications, substitutions and changes in the forms and details of the device illustrated and in its operation can be made by those skilled on the art without departing in any way from the scope and spirit of the present invention.

What is claimed is:

1. A steering system for a vehicle comprising:
    an electric assist steering column, wherein the electric assist steering column multiplies a steering input torque;
    an augmented chain and sprocket assembly having an input shaft and an output shaft, the input shaft is coupled to the electric assist steering column, and wherein the augmented chain and sprocket assembly multiplies a steering input rotational speed;
    a steering shaft coupled to the output shaft of the augmented chain and sprocket assembly;
    a rack and pinion gearset having a pinion and a rack, the pinion is coupled to the steering shaft, wherein the pinion shaft exerts the multiplied steering input torque at the multiplied steering input rotational speed to the rack to displace the rack linearly at a rack and pinion gearset slow steering ratio;
    a steering wheel attached to the electric assist steering column to receive a steering input having the steering input rotational torque and the steering input rotational speed;
    wherein the electric assist steering column multiplies the steering input rotational torque and the augmented chain and sprocket assembly multiplies the steering input rotational speed and transfers the multiplied steering input rotational torque and the steering input rotational speed through the steering shaft to the rack and pinion gearset having a slow steering ratio to provide a quick steering response to the steering system with negligible bump steer during articulation of the steering system.

2. The steering system of claim 1 further comprising a rack and pinion gearset assist mechanism connected to the rack and pinion gearset, wherein the rack and pinion gearset assist mechanism generates additional torque to the rack and pinion gearset in response to the displacement of the rack and pinion gear set.

3. The steering system of claim 2, wherein the rack and pinion gearset is a manual rack and pinon gear set.

4. The steering system of claim 3, wherein the rack and pinion gearset is a ram assist rack and pinion gears set.

5. The steering system of claim 4, wherein the rack and pinion gearset assist mechanism is a hydraulic control valve fluidly connected to the ram assist rack and pinion gears set that generates a hydraulic control valve hydraulic pressure to the ram assist rack and pinon gears to generate the additional torque to the rack and pinion gearset in response to the displacement of the rack.

6. A steering system for a vehicle comprising:
an electric assist steering column comprising a steering column having a front end and a back end and an electric assist motor box having an input shaft and an output shaft, the front end of the steering column is coupled to the input shaft of the electric assist motor box, wherein the electric assist motor box multiplies a rotational torque input from the front end of the steering column to the output shaft of the electric assist motor box;
an augmented chain and sprocket assembly having an augmentation device with an input shaft and an output shaft and the input shaft of the augmented chain and sprocket assembly is coupled to the output shaft to the electric assist motor box, wherein the augmentation device increases the rotation of the output shaft at an augmentation ratio of the rotation of the input shaft;
a steering shaft with a front end and a back end, the front end of the steering shaft coupled to the output shaft of the augmented chain and sprocket assembly;
a rack and pinion gearset having a pinion shaft and a rack, the pinion shaft is coupled to the back end of the steering shaft, wherein the pinion shaft exerts a rotational torque on the rack at a rack and pinion gearset slow steering ratio to displace the rack linearly;
a steering wheel attached to the back end of the steering column to receive a steering input having a steering input rotational torque and a steering input rotational speed;
wherein the electric assist steering column multiplies the steering input rotational torque and the augmented chain and sprocket assembly multiplies the steering input rotational speed and transfers the multiplied steering input rotational torque and the steering input rotational speed through the steering shaft to the rack and pinion gearset having a slow steering ratio to provide a quick steering response to the steering system with negligible bump steer during articulation of the steering system.

7. The steering system of claim 6 further comprising a rack and pinion gearset assist mechanism connected to the rack and pinion gearset, wherein the rack and pinion gearset assist mechanism generates additional torque to the rack and pinion gearset in response to the displacement of the rack.

8. The steering system of claim 7, wherein the rack and pinion gearset is a manual rack and pinon gear set.

9. The steering system of claim 8, wherein the rack and pinion gearset is a ram assist rack and pinon gear set and the rack and pinion gearset assist mechanism is a hydraulic control valve fluidly connected to the ram assist rack and pinon gear set that generates a hydraulic control valve hydraulic pressure to the ram assist rack and pinon gears to generate the additional torque to the rack and pinion gearset in response to the displacement of the rack.

10. A steering system for a vehicle having a frame with respective frame sides and suspended above a solid front axle and a rear axle, the steering system comprising:
a rack and pinion gearset, the rack and pinion gearset is attached to the front axle and has a slow steering ratio, the rack and pinion gearset includes a rack and a pinion shaft;
an augmented chain and sprocket assembly, the augmented chain and sprocket assembly includes a housing, a large sprocket, a small sprocket, a chain, an input shaft, and an output shaft, the input shaft and the output shaft protrude through opposite sides of the housing thereby the input shaft and the output shafts;
an electric assist steering column, the electric assist steering column includes a steering column having a front end and a back end and an electric assist motor box having an input shaft and an output shaft;
a steering shaft having a front end and a back end;
a draglink having a first end and second end;
a tie rod having a first end and a second end, the tie rod first end is pivotally connected to a passenger-side steering knuckle while the tie rod second end is pivotally connected to a driver-side steering knuckle;
wherein a driver is able to turn or not turn a steering wheel, the turning of the steering wheel by the driver defines a steering input, the steering input refers to a rotational torque, the steering input is transmitted to the pinion shaft such that the steering input exerts the rotational torque on the pinion shaft, the rotational torque that is exerted on the pinion shaft causes the pinion shaft to rotate and refers to a pinion shaft force, the pinion shaft force is able to be exerted on the rack which displaces the rack, and the steering input is transmitted from the steering wheel through the steering system to a front wheels thereby causing the front wheels to turn;
wherein the turning of the steering wheel by the driver refers to the turning of the front wheels, the turning of the front wheels refers to a steering response by the steering system, the steering system is able to have a light steering response or a heavy steering response, the light steering response by the steering system refers to an ease of turning the steering wheel;
wherein the augmented chain and sprocket assembly is able to act as a steering quickener, the steering quickener augmented chain and sprocket assembly multiplies a rate at which the driver turns the steering wheel, the multiplication of the rate at which the driver turns the steering wheel refers to the multiplication of the turning of the steering wheel by the driver, the multiplication of the turning of the steering wheel by the driver reduces the turns that the driver does to the steering wheel in order to turn the front wheels, the reduction in the turns that the driver does to the steering wheel in order to turn the front wheels serves to quicken the slow steering ratio of the rack and pinion gearset, that is the steering quickener augmented chain and sprocket assembly quickens the slow steering ratio of the rack and pinion gearset, the quickening of the slow steering ratio of the rack and pinion gearset makes the rack and pinion gearset behave as if the rack and pinion gearset has a quick steering ratio which gives the steering system a quick steering response;
wherein the solid front axle is able to undergo an articulation, the articulation of the solid front axle refers to the solid front axle rotating about a longitudinal axis, the longitudinal axis refers to a line passing through a middle of the vehicle from a front end to a back end, the articulation of the solid front axle causes the rack and pinion gearset to also rotate about the longitudinal axis, when the driver does not turn the steering wheel the pinion shaft does not rotate, the articulation of the solid front axle while the driver does not turn the steering wheel causes the rotation of the rack and pinion while the pinion shaft does not rotate, the rotation of the rack and pinion gearset while the pinion shaft does not rotate causes a simulated rotation of the pinion shaft, the simulated rotation of the pinion shaft defines a simulated pinion shaft force, the simulated pinion shaft force is able to be exerted on the rack and thereby displaces the rack, the displacement of the rack due to the simulated pinion shaft force is an unintended displacement of the rack, the unintended displacement of the rack causes an unintended turn of the front wheels, the unintended turn of the front wheels defines a bumpsteer;

wherein during a street driving or mild off-road driving of the vehicle the solid front axle is able to undergo a small articulation, the small articulation of the solid front axle while the driver does not turn the steering wheel causes a small rotation of the rack and pinion gearset while the pinion shaft does not rotate, the small rotation of the rack and pinion gearset while the pinion shaft does not rotate causes a small simulated rotation of the pinion shaft, the small simulated rotation of the pinion shaft is reduced by the slow steering ratio of the rack and pinion gearset, the reduced small simulated rotation of the pinion shaft refers to a very small simulated rotation of the pinion shaft, the very small simulated rotation of the pinion shaft defines a very small simulated pinion shaft force, the very small simulated pinion shaft force is exerted on the rack and thereby causes a very small unintended displacement of the rack, the very small unintended displacement of the rack causes a very small unintended turn of the front wheels, the very small unintended turn of the front wheels refers to a very small bumpsteer, and very small bumpsteer is negligible bumpsteer.

11. The steering system of claim 10, further comprises:
a hydraulic control valve, the hydraulic control valve includes a hydraulic fluid, a plurality of electric wires, a plurality of hydraulic fluid ports, a solenoid coil, a plunger, and an electronic control module;
a hydraulic pump;
wherein the rack and pinion gearset is a ram assist rack and pinion further comprising a tie rod bar having a first end, a second end and a midpoint between the tie rod first end and the tie rod second end, wherein the pinion shaft is a ram having a first end and a second end and the rack has driver-side end and a passenger-side end; and
a fluid connection connecting the hydraulic control valve to the hydraulic pump and the ram, the fluid connection enables the hydraulic fluid to flow between the hydraulic control valve, the hydraulic pump and the ram.

12. The steering system of claim 11, wherein the hydraulic control valve regulates the flow of hydraulic fluid to the ram, the regulation of the flow occurs when the control valve is activated, the control valve is activated by the displacement of the rack, the rack is able to be displaced by the pinion shaft force or simulated pinion shaft force;
wherein the activation causes a variance in the hydraulic fluid that flows to the ram, the variance creates a hydraulic pressure which defines a hydraulic pressure force in the ram, the hydraulic pressure force is exerted on the rack which displaces the rack, the displacement of the rack due to the hydraulic pressure force occurs when the rack is simultaneously displaced due to the pinion shaft force or simulated pinion shaft force.

13. The steering system of claim 12, wherein the simultaneous displacements of the rack due to the hydraulic pressure force and pinion shaft force indicate that the displacement of the rack due to the hydraulic pressure force is coordinated with the displacement of the rack due to the pinion shaft force, the coordinated displacements of the rack indicate that the hydraulic pressure force is coordinated with the pinion shaft force, the coordination between the hydraulic pressure force and pinion shaft force indicates that the hydraulic pressure force combines with the pinion shaft force, the combined hydraulic pressure force and pinion shaft force define a combined one force, the combined one force is exerted on the rack which effortlessly displaces the rack;
wherein the rack is connected to the tie rod bar such that the rack exerts the combined one force on the tie rod bar and thereby effortlessly displaces the tie rod bar, the tie rod bar is connected to the driver-side and passenger-side steering knuckles such that the tie rod bar exerts the combined one force on the driver-side and passenger-side steering knuckles, which effortlessly turns the driver-side and passenger-side steering knuckles and thereby effortlessly turns the front wheels.

14. The steering system of claim 12, wherein the simultaneous displacements of the rack due to the hydraulic pressure force and simulated pinion shaft force indicate that the displacement of the rack due to the hydraulic pressure force is coordinated with the unintentional displacement of the rack due to the simulated pinion shaft force, the coordinated displacements of the rack indicate that the hydraulic pressure force is coordinated with the simulated pinion shaft force, coordination between the hydraulic pressure force and simulated pinion shaft force indicates that the hydraulic pressure force combines with the simulated pinion shaft force, the combined hydraulic pressure force and simulated pinion shaft force define a combined two force, the combined two force is exerted on the rack which unintentionally displaces the rack;
wherein the rack is connected to the tie rod bar such that the rack exerts the combined two force on the tie rod bar and thereby unintentionally displaces the tie rod bar, the tie rod bar is connected to the driver-side and passenger-side steering knuckles such that the tie rod bar exerts the combined two force on the driver-side and passenger-side steering knuckles, which unintentionally turns the driver-side and passenger-side steering knuckles and thereby unintentionally turns the front wheels, the unintentional turn of the front wheels refers to bumpsteer.

15. The steering system of claim 12, further comprising a solenoid valve-plunger mechanism, wherein the hydraulic control valve includes a rectangular shaped housing with an inner chamber, the hydraulic control valve inner chamber has the shape of a cylinder with a smaller diameter top section and a smaller diameter bottom section and a larger diameter middle section, the hydraulic control valve inner chamber contains the solenoid coil and a plunger with the solenoid coil located in the larger diameter middle section;
wherein the plurality of hydraulic fluid ports are access points in which the hydraulic fluid is able to flow into or out of the hydraulic control valve, a first hydraulic line connects a first port of the plurality of hydraulic fluid ports to the pump, a second hydraulic line connects a second port of the plurality of hydraulic fluid ports to the pump, a third hydraulic line connects a third port of the plurality of hydraulic fluid ports to the first end of the ram, and a fourth hydraulic line connects a fourth port of the plurality of hydraulic fluid ports to the second end of the ram;

wherein the solenoid coil is a coil of wire that is coiled up into the shape of a cylinder, the plunger is a magnetically sensitive steel rod with a circumference, the plunger is machined with two grooves about the circumference, the first groove is an upper groove while the second groove is a lower groove, the upper groove or the lower groove has a circular U-shape, the U-shape comprises two straight open sides and a closed curved side, the two straight open sides are separated by a distance such that the distance refers to a diameter for the upper or lower groove, the diameter for the upper or lower groove is equivalent to the diameter of each port;

wherein the solenoid coil and plunger each have a diameter, the diameter of the plunger is slightly smaller than the diameters of both the smaller diameter top section and smaller diameter bottom section of the inner chamber and diameter of the solenoid coil, the slightly smaller diameter of the plunger enables the plunger to be located and easily slide within the smaller diameter top section and smaller diameter bottom section of the inner chamber and solenoid coil, the slide by the plunger is able to be up or down;

wherein the upper or lower groove is bordered by O-rings which prevent hydraulic fluid from leaking between the plunger and the smaller diameter top section and smaller diameter bottom section of the inner chamber;

wherein the plurality of electrical wires connect the electronic control module to an electronic sensor that is located in the ram assist rack and pinion gearset and to the solenoid coil, the electronic sensor detects the displacement of the rack due to the pinion shaft force or simulated pinion shaft force, upon detection the electronic sensor sends an electronic signal to the electronic control module, the electronic control module transforms the signal into a positive or negative electric current which is passed through the solenoid coil, the current creates a magnetic field in the solenoid coil, the magnetic field defines a magnetic force which is exerted on the plunger thereby causing the plunger to slide within the smaller diameter top section and smaller diameter bottom section of the inner chamber and solenoid coil;

wherein the electronic control module adjusts the strength of the current in proportion to the displacement of the rack due to the pinion shaft force or simulated pinion shaft force, the magnetic field is proportional to the strength of the current such that the plunger slides in proportion to the strength of the current;

wherein the hydraulic fluid is able to flow through the upper or lower groove in the plunger, the plunger is positioned next to the plurality of hydraulic fluid ports such that the upper or lower groove is able to be aligned with the plurality of hydraulic fluid ports, the circular shape of the upper or lower groove enables the upper or lower groove to remain aligned with the plurality of hydraulic fluid ports regardless of the rotational disposition of the plunger, the alignment enables the hydraulic fluid to flow from the plurality of hydraulic fluid ports and through the upper or lower groove;

wherein the sliding of the plunger enables the upper or lower groove to align with two ports of the plurality of hydraulic fluid ports, one of the two ports is connected to the pump with the first or second hydraulic line while the other of the two ports is connected to the ram with the third or fourth hydraulic line, the alignment between the upper or lower groove and two ports of the plurality of hydraulic fluid ports enables the hydraulic fluid to flow from the pump into the one of the two ports, through the upper or lower groove, out of the other of the two ports of the plurality of hydraulic fluid ports, and into the ram, the hydraulic fluid flow defines the hydraulic fluid variance that creates the hydraulic pressure which defines the hydraulic pressure force in the ram and thereby displaces the rack;

wherein the extent that the upper or lower groove aligns with the two ports varies in proportion to the strength of the current, the alignment variance controls the hydraulic fluid flow rate such that the flow rate is proportional to the displacement of the rack due to the pinion shaft force or simulated pinion shaft force, the flow rate controls the hydraulic pressure force such that the displacement of the rack due to the hydraulic pressure force is proportional to the displacement of the rack due to the pinion shaft force or simulated pinion shaft force, the proportional displacements due to the hydraulic pressure force and pinion shaft force or simulated pinion shaft force indicate that the displacement of the rack due to the hydraulic pressure force is coordinated with the displacement of the rack due to the pinion shaft force or simulated pinion shaft force, that the hydraulic pressure force is coordinated with the pinion shaft force or simulated pinion shaft force, and that the hydraulic pressure force combines with the pinion shaft force or simulated pinion shaft force;

wherein the combined hydraulic pressure force and pinion shaft force define the combined one force, the combined one force is exerted on the rack which effortlessly displaces the rack, the rack is connected to the tie rod bar and the tie rod bar is connected to the driver-side and passenger-side steering knuckles such that the rack exerts the combined one force on the tie rod bar and the tie rod bar exerts the combined one force on the driver-side and passenger-side steering knuckles, which effortlessly turns the driver-side and passenger-side steering knuckles and thereby effortlessly turns the front wheels;

wherein the combined hydraulic pressure force and simulated pinion shaft force define a combined two force, the combined two force is exerted on the rack which unintentionally displaces the rack, the rack is connected to the tie rod bar and the tie rod bar is connected to the driver-side and passenger-side steering knuckles such that the rack exerts the combined two force on the tie rod bar and the tie rod bar exerts the combined two force on the driver-side and passenger-side steering knuckles, which unintentionally turns the driver-side and passenger-side steering knuckles and thereby unintentionally turns the front wheels.

16. The steering system of claim 15, wherein during a right turn, the steering input causes the pinion shaft to rotate in one direction for example counterclockwise, the counterclockwise rotation of the pinion shaft defines the pinion shaft force, the pinion shaft force is exerted on the rack which displaces the rack to the right, the right displacement of the rack is detected by the electronic sensor which signals the electronic control module, the electronic control module transforms the signal into for example the positive current, the positive current creates the magnetic field within the solenoid coil that forces the plunger to slide for example up, the upward slide of the plunger serves to align the upper groove with the first port of the plurality of hydraulic fluid ports that is connected to the pump and the third port of the plurality of hydraulic fluid ports that is connected to the first end of the ram, the connections enable the hydraulic fluid to flow from the pump, into the first port of the plurality of hydraulic fluid ports, through the upper groove, out of the third port of the plurality of hydraulic fluid ports, and into the first end of the ram, the flow generates the hydraulic pressure which defines the hydraulic pressure force in the first end of the ram, the hydraulic pressure force in the first end of the ram displaces the rack to the right;

wherein the right displacement of the rack due to the hydraulic pressure force is coordinated with the right displacement of the rack due to the pinion shaft force thereby indicating that the hydraulic pressure force is coordinated with the pinion shaft force such that the hydraulic pressure force combines with the pinion shaft force, the combined hydraulic pressure force and pinion shaft force define the combined one force, the combined one force is exerted on the rack and the rack exerts the combined one force on the tie rod bar, the tie rod bar exerts the combined one force on the driver-side and passenger-side steering knuckles which effortlessly turns the driver-side and passenger-side steering knuckles to the right, the effortless right turn of the driver-side and passenger-side steering knuckles makes the front wheels effortlessly turn to the right.

17. The steering system of claim 15, wherein a counterclockwise articulation of the front axle when the driver does not turn the steering wheel causes the simulated rotation of the pinion shaft in one direction for example counterclockwise, the counterclockwise simulated rotation of the pinion shaft defines the simulated pinion shaft force, the simulated pinion shaft force is exerted on the rack which unintentionally displaces the rack to the right, the unintentional right displacement of the rack is detected by the electronic sensor which signals the electronic control module, the electronic control module transforms the signal into for example the positive current, the positive current creates the magnetic field within the solenoid coil that forces the plunger to slide for example up, the upward slide of the plunger seives to align the upper groove with the first port of the plurality of hydraulic fluid ports that is connected to the pump and the third port of the plurality of hydraulic fluid ports that is connected to the first end of the ram, the connections enable hydraulic fluid to flow from the pump, into the first port of the plurality of hydraulic fluid ports, through the upper groove, out of the third port of the plurality of hydraulic fluid ports, and into the first end of the ram, the flow generates the hydraulic pressure which defines the hydraulic pressure force in the first end of the ram, the hydraulic pressure force in the first end of the ram displaces the rack to the right;

wherein the right displacement of the rack due to the hydraulic pressure force is coordinated with the unintentional right displacement of the rack due to the simulated pinion shaft force thereby indicating that the hydraulic pressure force is coordinated with the simulated pinion shaft force such that the hydraulic pressure force combines with the simulated pinion shaft force, the combined hydraulic pressure force and simulated pinion shaft force define the combined two force, the combined two force is exerted on the rack and the rack exerts the combined two force on the tie rod bar, the tie rod bar exerts the combined two force on the driver-side and passenger-side steering knuckles which unintentionally turns the driver-side and passenger-side steering knuckles to the right, the unintentional right turn of the driver-side and passenger-side steering knuckles makes the front wheels unintentionally turn to the right.

18. The steering system of claim 15, wherein during a left turn, the steering input causes the pinion shaft to rotate in one direction for example clockwise, the clockwise rotation of the pinion shaft defines the pinion shaft force, the pinion shaft force is exerted on the rack which displaces the rack to the left, the left displacement of the rack is detected by the electronic sensor which signals the electronic control module, the electronic control module transforms the signal into for example the negative current, the negative current creates the magnetic field within the solenoid coil that forces the plunger to slide for example down, the downward slide of the plunger serves to align the lower groove with the second port of the plurality of hydraulic fluid ports that is connected to the pump and the fourth port of the plurality of hydraulic fluid ports that is connected to the second end of the ram, the connections enable hydraulic fluid to flow from the pump, into the second port of the plurality of hydraulic fluid ports, through the lower groove, out of the fourth port of the plurality of hydraulic fluid ports, and into the second end of the ram, the flow generates the hydraulic pressure which defines the hydraulic pressure force in the second end of the ram, the hydraulic pressure force in the second end of the ram displaces the rack to the left;

wherein the left displacement of the rack due to the hydraulic pressure force is coordinated with the left displacement of the rack due to the pinion shaft force thereby indicating that the hydraulic pressure force is coordinated with the pinion shaft force such that the hydraulic pressure force combines with the pinion shaft force, the combined hydraulic pressure force and pinion shaft force define the combined one force, the combined one force is exerted on the rack and the rack exerts the combined one force on the tie rod bar, the tie rod bar exerts the combined one force on the driver-side and passenger-side steering knuckles which effortlessly turns the driver-side and passenger-side steering knuckles to the left, the effortless left turn of the driver-side and passenger-side steering knuckles makes the front wheels effortlessly turn to the left.

19. The steering system of claim 15, wherein a clockwise articulation of the front axle when the driver does not turn the steering wheel causes the simulated rotation of the pinion shaft in one direction for example clockwise, the clockwise simulated rotation of the pinion shaft defines the simulated pinion shaft force, the simulated pinion shaft force is exerted on the rack which unintentionally displaces the rack to the left, the unintentional left displacement of the rack is detected by the electronic sensor which signals the electronic control module, the electronic control module transforms the signal into for example the negative current, the negative current creates the magnetic field within the solenoid coil that forces the plunger to slide for example down, the downward slide of the plunger serves to align the lower groove with the second port of the plurality of hydraulic fluid ports that is connected to the pump and the fourth port of the plurality of hydraulic fluid ports that is connected to the second end of the ram, the connections enable hydraulic fluid to flow from the pump, into the second port of the plurality of hydraulic fluid ports, through the lower groove, out of the fourth port of the plurality of hydraulic fluid ports, and into the second end of the ram, the flow generates the hydraulic pressure which defines the hydraulic pressure force in the second end of the ram, the hydraulic pressure force in the second end of the ram displaces the rack to the left;

wherein the left displacement of the rack due to the hydraulic pressure force is coordinated with the unintentional left displacement of the rack due to the simulated pinion shaft force thereby indicating that the hydraulic pressure force is coordinated with the simulated pinion shaft force such that the hydraulic pressure force combines with the simulated pinion shaft force, the combined hydraulic pressure force and simulated pinion shaft force define the combined two force, the combined two force is exerted on the rack and the rack exerts the combined two force on the tie rod bar, the tie rod bar exerts the combined two force on the driver-side and passenger-side steering knuckles which unintentionally turns the driver-side and passenger-side steering knuckles to the left, the unintentional left turn of the driver-side and passenger-side steering knuckles makes the front wheels unintentionally turn to the left.

20. The steering system of claim 15, wherein the electronic control module is able to adjust the strength of the electric current that passes through the solenoid coil, and thereby the strength of the magnetic field, the adjustment of the magnetic field strength by the electronic control module governs the amount that the plunger slides within the solenoid coil, which controls the fluid variance and thereby the hydraulic pressure force exerted by the ram, in effect the electronic control module adjusts the strength of the electric current in order to control the hydraulic pressure force that the ram exerts on the rack which causes the front wheels to turn, the electronic control module is able to adjust the current to a great or small strength;

wherein the displacement of the rack due to the hydraulic pressure force causes the turning of the front wheels such that an ease of turning the front wheels is proportional to the hydraulic pressure force that is exerted on the rack;

wherein the great strength of the current by the electronic control module refers to the exertion of a great hydraulic pressure force on the rack, the exertion of the great hydraulic pressure force on the rack causes an easy displacement of the rack, the easy displacement of the rack causes an easy turning of the front wheels, in short the exertion of the great hydraulic pressure force on the rack causes the easy turning of the front wheels, the easy turning of the front wheels due to the exertion of the great hydraulic pressure force on the rack refers to a light turning of the steering wheel and thereby the light steering response, in short the exertion of the great hydraulic pressure force on the rack causes the easy turning of the front wheels, which refers to the light turning of the steering wheel and thereby the light steering response;

wherein the small strength of the current by the electronic control module refers to the exertion of a small hydraulic pressure force on the rack, the exertion of the small hydraulic pressure force on the rack causes an uneasy displacement of the rack, the uneasy displacement of the rack causes an uneasy turning of the front wheels, in short the exertion of the small hydraulic pressure force on the rack causes the uneasy turning of the front wheels, the uneasy turning of the front wheels due to the exertion of the small hydraulic pressure force on the rack refers to a heavy turning of the steering wheel and thereby the heavy steering response, in short the exertion of the small hydraulic pressure force on the rack causes the uneasy turning of the front wheels, which refers to the heavy turning of the steering wheel and thereby the heavy steering response;

wherein the rotational torque due to the steering input is defined by a muscular exertion that the driver puts on the steering wheel in order to turn the steering wheel, the muscular exertion that the driver puts on the steering wheel in order to turn the steering wheel defines an effort that the driver exerts on the steering wheel in order to turn the steering wheel, the effort that the driver exerts on the steering wheel in order to turn the steering wheel refers to the ease of turning the steering wheel;

wherein the electronic control module is programmable, the electronic control module is able to be uploaded with variable steering response software, the variable steering response software enables the hydraulic pressure force that is exerted on the rack to change in proportion to a speed of the vehicle, the variable steering response software instructs the electronic control module to generate the great hydraulic pressure force at a slow speed thereby giving the light steering response, and to generate the small hydraulic pressure force at a high speed thereby giving the heavy steering response;

wherein the lightness or ease of turning the steering wheel is referred to as a feedback, the feedback gives the driver an understanding of a relationship between the front wheels and a road and thereby enables the driver to control the vehicle, the variable steering response software can be written such that the electronic control module yields a type of feedback that the driver prefers.

* * * * *

UNITED STATES PATENT AND TRADEMARK OFFICE
CERTIFICATE OF CORRECTION

| | | |
|---|---|---|
| PATENT NO. | : 12,344,332 B2 | Page 1 of 1 |
| APPLICATION NO. | : 17/731641 | |
| DATED | : July 1, 2025 | |
| INVENTOR(S) | : Ronald S. Bandy | |

It is certified that error appears in the above-identified patent and that said Letters Patent is hereby corrected as shown below:

In the Claims

Claim 3, Column 45, Line 2, change "manual rack and pinon gear set" to --manual rack and pinion gear set--.

Claim 4, Column 45, Line 4, change "ram assist rack and pinon gears set" to --ram assist rack and pinion gears set--.

Claim 5, Column 45, Lines 7 and 9, change both occurrences of "ram assist rack and pinon gears" to --ram assist rack and pinion gears--.

Claim 8, Column 45, Line 59, change "manual rack and pinon gear set" to --manual rack and pinion gear set--.

Claim 9, Column 45, Line 62, change "ram assist rack and pinon gear set" to --ram assist rack and pinion gear set--.

Claim 9, Column 45, Line 65, change "ram assist rack and pinon gears" to --ram assist rack and pinion gears--.

Claim 10, Column 47, Line 40, change "and very small" to --and the very small--.

Claim 17, Column 15, Line 47, change "the plunger seives to" to --the plunger serves to--.

Signed and Sealed this
Twenty-first Day of October, 2025

John A. Squires
*Director of the United States Patent and Trademark Office*